United States Patent
Kortylewski et al.

(10) Patent No.: US 12,472,209 B2
(45) Date of Patent: Nov. 18, 2025

(54) NEURAL STEM CELL DELIVERY OF THERAPEUTIC AGENTS

(71) Applicant: City of Hope, Duarte, CA (US)

(72) Inventors: Marcin Tomasz Kortylewski, Monrovia, CA (US); Karen Aboody, Arcadia, CA (US); Alexandra Jacqueline Annala, Pasadena, CA (US); Mohamed Hammad, Alhambra, CA (US)

(73) Assignee: CITY OF HOPE, Duarte, CA (US)

( * ) Notice: Subject to any disclaimer, the term of this patent is extended or adjusted under 35 U.S.C. 154(b) by 584 days.

(21) Appl. No.: 16/999,459

(22) Filed: Aug. 21, 2020

(65) Prior Publication Data

US 2021/0077535 A1    Mar. 18, 2021

Related U.S. Application Data

(60) Provisional application No. 62/889,799, filed on Aug. 21, 2019.

(51) Int. Cl.
*A61K 35/30* (2015.01)
*A61P 35/00* (2006.01)
*C12N 5/0797* (2010.01)
*C12N 15/113* (2010.01)

(52) U.S. Cl.
CPC ............. *A61K 35/30* (2013.01); *A61P 35/00* (2018.01); *C12N 5/0623* (2013.01); *C12N 15/1138* (2013.01); *C12N 2310/11* (2013.01); *C12N 2310/17* (2013.01)

(58) Field of Classification Search
None
See application file for complete search history.

(56) References Cited

U.S. PATENT DOCUMENTS 9,976,147 B2 *    5/2018    Kortylewski ......... C07H 21/04

FOREIGN PATENT DOCUMENTS

| WO | WO-2011/097480 A1 | 8/2011 |
| WO | WO 12/161806 | * 11/2012 |
| WO | WO-2016/123556 A1 | 8/2016 |
| WO | WO-2017/117275 A1 | 7/2017 |
| WO | WO-2019/213173 A1 | 11/2019 |

OTHER PUBLICATIONS

Aboody et al., Science Translation Medicine, 2013, 5: 1-11,.*
Zhang et al., Blood, 2016, 127: 1687-1700.*
El-Andaloussi et al., Glia, 2006, 54: 526-535; Abstract.*
Webb et al., Translational Stroke Research, Dec. 2017, 9: 530-539.*
Sutaria et al., Pharm. Res., 2017, 34: 1053-1066.*
Guzylak-Piriou et al., Immunology, 2004, 112: 28-37.*
Munagala, Cancer Letters, Nov. 18, 2015, 371: 48-61.*
Kahraman, Thesis, Mar. 2016, Abstract.*
Yu, Nat. Rev. Cancer, 2009, 9: 1-29.*
Li, Cell. Mol. Biol., 2016, 62: 68-73.*
Ohno, Int. J. Sci., 2016, 17: 1-19.*
Moreira, Clin. Cancer Res., 2018, 24: 5948-5962.*
Diwan, Drug Delivery, 2004, Abstract.*
Chakraborty, A. et al. (Jun. 1, 2017, e-published May 10, 2017). "The Role of NMDA Receptors in Neural Stem Cell Proliferation and Differentiation," *Stem Cells Dev* 26(11):798-807.
Hung, M.E. et al. (May 13, 2016). "A platform for actively loading cargo RNA to elucidate limiting steps in EV-mediated delivery," *J Extracell Vesicles* 5:31027.
Ji, R. et al. (Dec. 16, 2014). "TAM receptors support neural stem cell survival, proliferation and neuronal differentiation," *PLoS One* 9(12):e115140.
Kortylewski, M. et al. (Dec. 2005, e-published Nov. 20, 2005). "Inhibiting Stat3 signaling in the hematopoietic system elicits multicomponent antitumor immunity," *Nature Medicine* 11(12):1314-1321.
Liao, R. et al. (Mar. 5, 2019, e-published Feb. 7, 2019). "Histamine H1 Receptors in Neural Stem Cells Are Required for the Promotion of Neurogenesis Conferred by H3 Receptor Antagonism following Traumatic Brain Injury," *Stem Cell Reports* 12(3): 532-544.
McCulloh, C.J. et al. (Jun. 2018, e-published Mar. 14, 2018). "Treatment of experimental necrotizing enterocolitis with stem cell-derived exosomes," *J Pediatr Surg* 53(6):1215-1220.
Mooney, R. et al. (2018). "Concise Review: Neural Stem Cell-Mediated Targeted Cancer Therapies," *Stem Cells Translational Medicine* 7:740-747.
Rong, Y. et al. (Apr. 18, 2019). "Neural stem cell-derived small extracellular vesicles attenuate apoptosis and neuroinflammation after traumatic spinal cord injury by activating autophagy," *Cell Death Dis* 310(5):340.
Somiya, M. et al. (2017). "Drug delivery application of extracellular vesicles; insight into production, drug loading, targeting, and pharmacokinetics," *AIMS Bioengineering* 4(1):73-92.
Tominaga, N. et al. (Dec. 1, 2015, e-published Oct. 19, 2015). "A novel platform for cancer therapy using extracellular vesicles," *Adv Drug Deliv Rev* 95:50-55.
Vogel, A. et al. (Dec. 2018, e-published Nov. 22, 2018). "Neural stem cell derived extracellular vesicles: Attributes and prospects for treating neurodegenerative disorders," *EBioMedicine* 38:273-282.
Vouri, M. et al. (Jun. 30, 2015). "Small molecule inhibition of Axl receptor tyrosine kinase potently suppresses multiple malignant properties of glioma cells," *Oncotarget* 6(18):16183-16197.
Webb, R.L. et al. (May 2018, e-published Apr. 12, 2018). "Human Neural Stem Cell Extracellular Vesicles Improve Recovery in a Porcine Model of Ischemic Stroke," *Stroke* 49(5):1248-1256.

(Continued)

*Primary Examiner* — Ileana Popa
(74) *Attorney, Agent, or Firm* — MINTZ, LEVIN, COHN, FERRIS, GLOVSKY AND POPEO, P.C.

(57) ABSTRACT

The disclosure provides, inter alia, neural stem cells comprising exogenous nucleotides, vesicles comprising exogenous nucleotides, and methods for treating diseases and disorders, such as cancer, neurodegenerative diseases, inflammatory diseases, and viral diseases, using the neural stem cells, vesicles, and pharmaceutical compositions comprising them.

23 Claims, 23 Drawing Sheets

Specification includes a Sequence Listing.

(56) References Cited

OTHER PUBLICATIONS

Fuhrmann et al., "Active loading into extracellular vesicles significantly improves the cellular uptake and photodynamic effect of porphyrins," J Control Release, 2015, vol. 205, pp. 35-44.

* cited by examiner

FIG. 2A  FIG. 2B  FIG. 2C
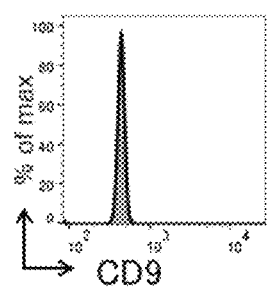
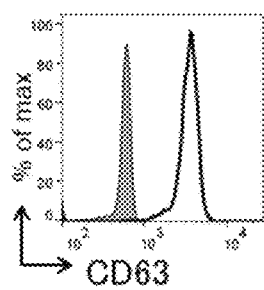
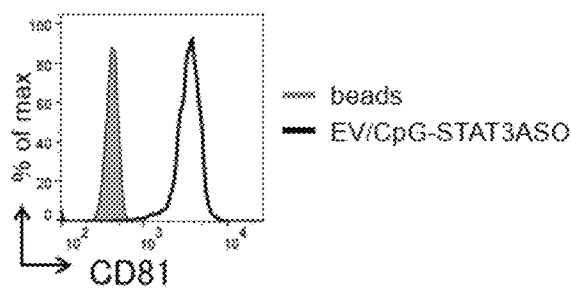
FIG. 2D  FIG. 2E
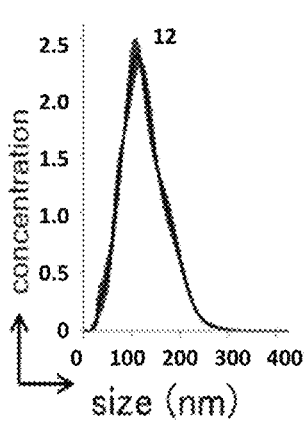
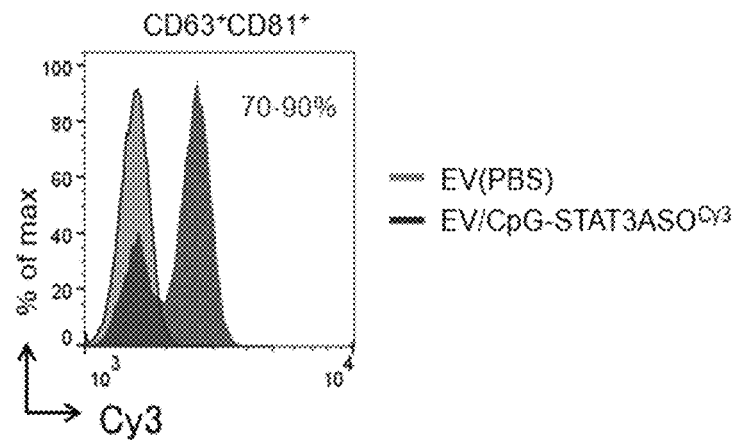

P value=0.315

P value=0.929

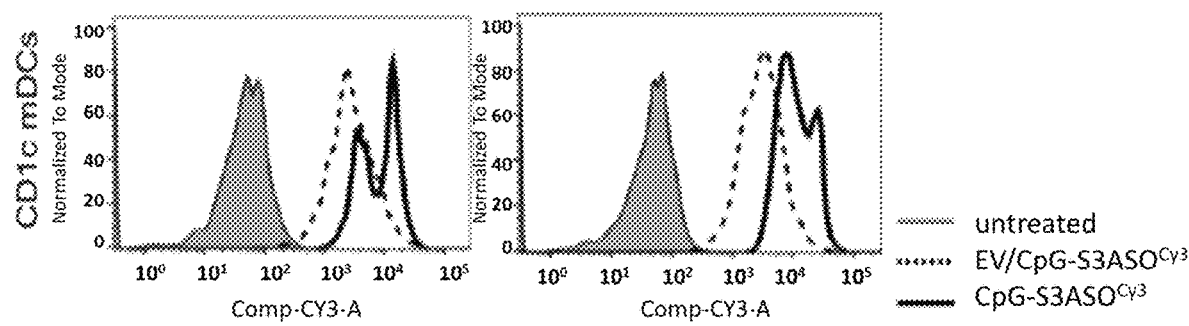
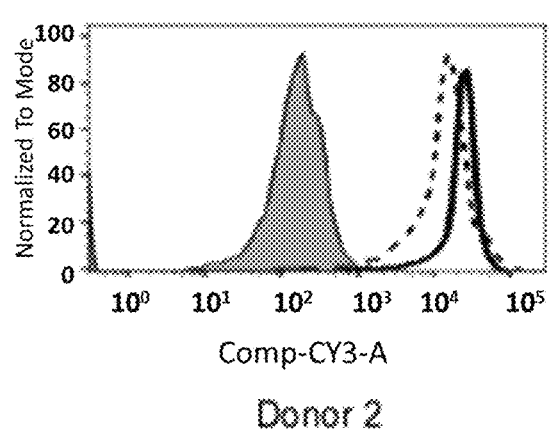
FIG. 10A Donor 1
FIG. 10B Donor 2
FIG. 10C Donor 1
FIG. 10D Donor 2

FIG. 11
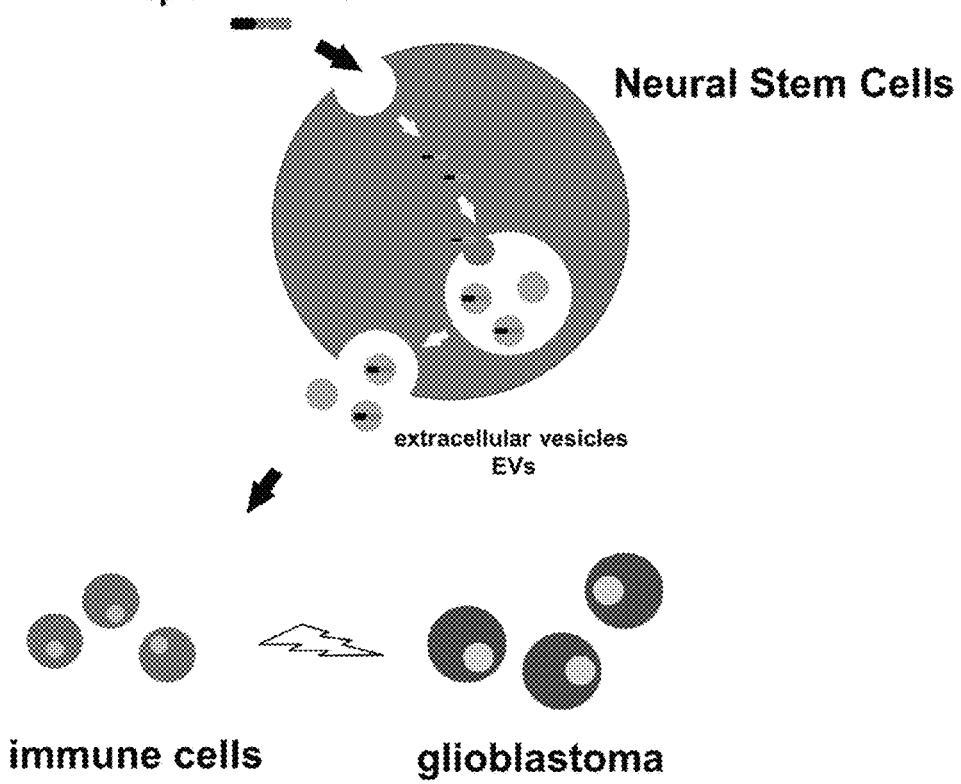
FIG. 12A
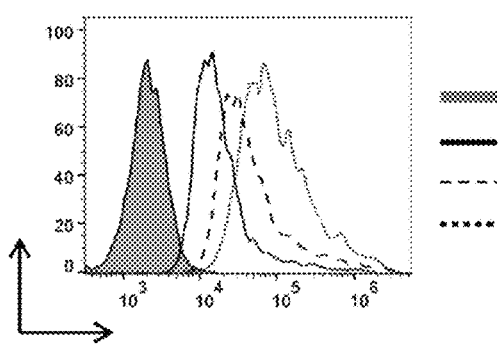
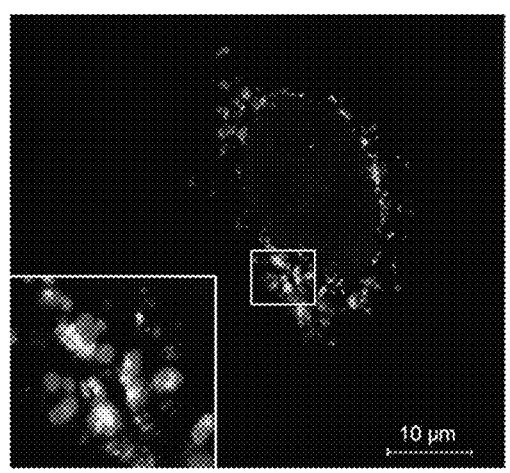
CpG-STAT3ASO$^{cy3}$ CD63 Hoechst

SEQUENCE LISTING

<160> NUMBER OF SEQ ID NOS: 35

<210> SEQ ID NO 1
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 ASO1
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: modified_base
<222> LOCATION: (21)..(21)
<223> OTHER INFORMATION: cm
<220> FEATURE:
<221> NAME/KEY: modified_base
<222> LOCATION: (22)..(22)
<223> OTHER INFORMATION: tm
<220> FEATURE:
<221> NAME/KEY: modified_base
<222> LOCATION: (23)..(23)
<223> OTHER INFORMATION: 2'-O-Methyladenosine
<220> FEATURE:
<221> NAME/KEY: modified_base
<222> LOCATION: (34)..(34)
<223> OTHER INFORMATION: 2'-O-Methyladenosine
<220> FEATURE:
<221> NAME/KEY: modified_base
<222> LOCATION: (35)..(35)
<223> OTHER INFORMATION: gm
<220> FEATURE:
<221> NAME/KEY: modified_base
<222> LOCATION: (36)..(36)
<223> OTHER INFORMATION: cm

<400> SEQUENCE: 1
ggtgcatcga tgcagggggg ctatttggat gtcagc          36

<210> SEQ ID NO 2
<211> LENGTH: 40
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 ASO2

-continued

```
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: cm
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
<223> OTHER INFORMATION: 2'-O-methyladenosine
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: gm
<220> FEATURE:
<221> NAME/KEY: misc_feature
<222> LOCATION: (24)..(25)
<223> OTHER INFORMATION: phosphorothioation
<220> FEATURE:
<221> NAME/KEY: modified_base
<222> LOCATION: (24)..(24)
<223> OTHER INFORMATION: cm
<220> FEATURE:
<221> NAME/KEY: misc_feature
<222> LOCATION: (25)..(26)
<223> OTHER INFORMATION: phosphorothioation
<220> FEATURE:
<221> NAME/KEY: modified_base
<222> LOCATION: (25)..(25)
<223> OTHER INFORMATION: 2'-O-methyladenosine
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
```

```
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(36)
<223> OTHER INFORMATION: 2'-O-methyladenosine
<220> FEATURE:
<221> NAME/KEY: misc_feature
<222> LOCATION: (37)..(38)
<223> OTHER INFORMATION: phosphorothioation
<220> FEATURE:
<221> NAME/KEY: modified_base
<222> LOCATION: (37)..(39)
<223> OTHER INFORMATION: gm
<220> FEATURE:
<221> NAME/KEY: misc_feature
<222> LOCATION: (38)..(39)
<223> OTHER INFORMATION: phosphorothioation
<220> FEATURE:
<221> NAME/KEY: modified_base
<222> LOCATION: (40)..(40)
<223> OTHER INFORMATION: 2'-O-methyladenosine

<400> SEQUENCE: 2
ggtgcatcga tgcagggggg cagcagatca agtccaggga                              40

<210> SEQ ID NO 3
<211> LENGTH: 40
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 ASO3
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
```

```
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(24)
<223> OTHER INFORMATION: tm
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: modified_base
<222> LOCATION: (25)..(25)
<223> OTHER INFORMATION: gm
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
```

```
<222> LOCATION: (34)..(35)
<223> OTHER INFORMATION: phosphorothioation
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(37)
<223> OTHER INFORMATION: cm
<220> FEATURE:
<221> NAME/KEY: misc_feature
<222> LOCATION: (37)..(38)
<223> OTHER INFORMATION: phosphorothioation
<220> FEATURE:
<221> NAME/KEY: misc_feature
<222> LOCATION: (38)..(39)
<223> OTHER INFORMATION: phosphorothioation
<220> FEATURE:
<221> NAME/KEY: modified_base
<222> LOCATION: (38)..(38)
<223> OTHER INFORMATION: 2'-O-Methyladenosine
<220> FEATURE:
<221> NAME/KEY: modified_base
<222> LOCATION: (39)..(39)
<223> OTHER INFORMATION: cm
<220> FEATURE:
<221> NAME/KEY: modified_base
<222> LOCATION: (40)..(40)
<223> OTHER INFORMATION: tm

<400> SEQUENCE: 3
ggtgcatcga tgcagggggg ttttgcatga tgtaaccact                         40

<210> SEQ ID NO 4
<211> LENGTH: 38
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 ASO4
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
```

```
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: 2'-O-Methyladenosine
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
<223> OTHER INFORMATION: tm
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: cm
<220> FEATURE:
<221> NAME/KEY: misc_feature
<222> LOCATION: (24)..(25)
<223> OTHER INFORMATION: phosphorothioation
<220> FEATURE:
<221> NAME/KEY: modified_base
<222> LOCATION: (24)..(26)
<223> OTHER INFORMATION: 2'-O-Methyladenosine
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: modified_base
<222> LOCATION: (27)..(27)
<223> OTHER INFORMATION: gm
<220> FEATURE:
<221> NAME/KEY: misc_feature
<222> LOCATION: (28)..(29)
<223> OTHER INFORMATION: phosphorothioation
<220> FEATURE:
<221> NAME/KEY: modified_base
<222> LOCATION: (28)..(28)
<223> OTHER INFORMATION: tm
<220> FEATURE:
<221> NAME/KEY: misc_feature
<222> LOCATION: (29)..(30)
<223> OTHER INFORMATION: phosphorothioation
<220> FEATURE:
<221> NAME/KEY: modified_base
<222> LOCATION: (29)..(29)
<223> OTHER INFORMATION: cm
<220> FEATURE:
<221> NAME/KEY: misc_feature
<222> LOCATION: (30)..(31)
<223> OTHER INFORMATION: phosphorothioation
<220> FEATURE:
<221> NAME/KEY: modified_base
<222> LOCATION: (30)..(30)
<223> OTHER INFORMATION: 2'-O-Methyladenosine
<220> FEATURE:
<221> NAME/KEY: misc_feature
<222> LOCATION: (31)..(32)
<223> OTHER INFORMATION: phosphorothioation
<220> FEATURE:
<221> NAME/KEY: modified_base
<222> LOCATION: (31)..(31)
<223> OTHER INFORMATION: tm
<220> FEATURE:
```

<221> NAME/KEY: misc_feature
<222> LOCATION: (32)..(33)
<223> OTHER INFORMATION: phosphorothioation
<220> FEATURE:
<221> NAME/KEY: modified_base
<222> LOCATION: (32)..(33)
<223> OTHER INFORMATION: cm
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: modified_base
<222> LOCATION: (34)..(34)
<223> OTHER INFORMATION: tm
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(36)
<223> OTHER INFORMATION: gm
<220> FEATURE:
<221> NAME/KEY: modified_base
<222> LOCATION: (37)..(37)
<223> OTHER INFORMATION: 2'-O-Methyladenosine
<220> FEATURE:
<221> NAME/KEY: modified_base
<222> LOCATION: (38)..(38)
<223> OTHER INFORMATION: gm

<400> SEQUENCE: 4
ggtgcatcga tgcagggggg atcaaagtca tcctggag                   38

<210> SEQ ID NO 5
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 LNA ASO1
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:

<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 5
ggtgcatcga tgcaggggggg gcaacctgac tttagt                              36

<210> SEQ ID NO 6
<211> LENGTH: 36
<212> TYPE: DNA
<213> ORGANISM: Artificial sequence
<220> FEATURE:
<223> OTHER INFORMATION: Synthetic polynucleotide -continued

```
<220> FEATURE:
<221> NAME/KEY: misc_feature
<223> OTHER INFORMATION: CpG(A)-ODN-STAT3 LNA ASO2
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
```

```
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 6
ggtgcatcga tgcagggggg gattctgcta atgacg                                36

<210> SEQ ID NO 7
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 LNA ASO3
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
```

```
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 7
ggtgcatcga tgcagggggg tgacgggtct gaagtt                                    36

<210> SEQ ID NO 8
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 LNA ASO4
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
```

```
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 8
ggtgcatcga tgcagggggg agatagcaga agtagg                                    36

<210> SEQ ID NO 9
```

```
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: CpG(A)-ODN-STAT3 LNA ASO5
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
```

```
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 9
ggtgcatcga tgcagggggg gtcaatgcac acttta                                36

<210> SEQ ID NO 10
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: GpC(A)-ODN-STAT3 ASO1
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: cm
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
```

```
<223> OTHER INFORMATION: tm
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: 2'-O-Methyladenosine
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: modified_base
<222> LOCATION: (34)..(34)
<223> OTHER INFORMATION: 2'-O-Methyladenosine
<220> FEATURE:
<221> NAME/KEY: modified_base
<222> LOCATION: (35)..(35)
<223> OTHER INFORMATION: gm
<220> FEATURE:
<221> NAME/KEY: modified_base
<222> LOCATION: (36)..(36)
<223> OTHER INFORMATION: cm

<400> SEQUENCE: 10
ggtgcatgca tgcagggggg ctatttggat gtcagc                            36

<210> SEQ ID NO 11
<211> LENGTH: 40
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
```

```
<223> OTHER INFORMATION: GpC(A)-ODN-STAT3 ASO2
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: cm
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
<223> OTHER INFORMATION: 2'-O-Methyladenosine
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: gm
<220> FEATURE:
<221> NAME/KEY: misc_feature
<222> LOCATION: (24)..(25)
<223> OTHER INFORMATION: phosphorothioation
<220> FEATURE:
<221> NAME/KEY: modified_base
<222> LOCATION: (24)..(24)
<223> OTHER INFORMATION: cm
<220> FEATURE:
<221> NAME/KEY: misc_feature
<222> LOCATION: (25)..(26)
<223> OTHER INFORMATION: phosphorothioation
<220> FEATURE:
<221> NAME/KEY: modified_base
<222> LOCATION: (25)..(25)
<223> OTHER INFORMATION: 2'-O-Methyladenosine
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
```

```
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(36)
<223> OTHER INFORMATION: 2'-O-Methyladenosine
<220> FEATURE:
<221> NAME/KEY: misc_feature
<222> LOCATION: (37)..(38)
<223> OTHER INFORMATION: phosphorothioation
<220> FEATURE:
<221> NAME/KEY: modified_base
<222> LOCATION: (37)..(39)
<223> OTHER INFORMATION: gm
<220> FEATURE:
<221> NAME/KEY: misc_feature
<222> LOCATION: (38)..(39)
<223> OTHER INFORMATION: phosphorothioation
<220> FEATURE:
<221> NAME/KEY: modified_base
<222> LOCATION: (40)..(40)
<223> OTHER INFORMATION: 2'-O-Methyladenosine

<400> SEQUENCE: 11
ggtgcatgca tgcagggggg cagcagatca agtccaggga                          40

<210> SEQ ID NO 12
<211> LENGTH: 40
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: GpC(A)-ODN-STAT3 ASO3
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
```

```
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(24)
<223> OTHER INFORMATION: tm
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: modified_base
<222> LOCATION: (25)..(25)
<223> OTHER INFORMATION: gm
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
```

```
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(37)
<223> OTHER INFORMATION: cm
<220> FEATURE:
<221> NAME/KEY: misc_feature
<222> LOCATION: (37)..(38)
<223> OTHER INFORMATION: phosphorothioation
<220> FEATURE:
<221> NAME/KEY: misc_feature
<222> LOCATION: (38)..(39)
<223> OTHER INFORMATION: phosphorothioation
<220> FEATURE:
<221> NAME/KEY: modified_base
<222> LOCATION: (38)..(38)
<223> OTHER INFORMATION: 2'-O-Methyladenosine
<220> FEATURE:
<221> NAME/KEY: modified_base
<222> LOCATION: (39)..(39)
<223> OTHER INFORMATION: cm
<220> FEATURE:
<221> NAME/KEY: modified_base
<222> LOCATION: (40)..(40)
<223> OTHER INFORMATION: tm

<400> SEQUENCE: 12
ggtgcatgca tgcaggggg ttttgcatga tgtaaccact                             40

<210> SEQ ID NO 13
<211> LENGTH: 38
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: GpC(A)-ODN-STAT3 ASO4
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
```

```
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: 2'-O-Methyladenosine
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
<223> OTHER INFORMATION: tm
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: cm
<220> FEATURE:
<221> NAME/KEY: misc_feature
<222> LOCATION: (24)..(25)
<223> OTHER INFORMATION: phosphorothioation
<220> FEATURE:
<221> NAME/KEY: modified_base
<222> LOCATION: (24)..(26)
<223> OTHER INFORMATION: 2'-O-Methyladenosine
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: modified_base
<222> LOCATION: (27)..(27)
<223> OTHER INFORMATION: gm
<220> FEATURE:
<221> NAME/KEY: misc_feature
<222> LOCATION: (28)..(29)
<223> OTHER INFORMATION: phosphorothioation
<220> FEATURE:
<221> NAME/KEY: modified_base
<222> LOCATION: (28)..(28)
<223> OTHER INFORMATION: tm
<220> FEATURE:
<221> NAME/KEY: misc_feature
<222> LOCATION: (29)..(30)
<223> OTHER INFORMATION: phosphorothioation
<220> FEATURE:
<221> NAME/KEY: modified_base
<222> LOCATION: (29)..(29)
<223> OTHER INFORMATION: cm
<220> FEATURE:
<221> NAME/KEY: misc_feature
<222> LOCATION: (30)..(31)
<223> OTHER INFORMATION: phosphorothioation
<220> FEATURE:
<221> NAME/KEY: modified_base
<222> LOCATION: (30)..(30)
<223> OTHER INFORMATION: 2'-O-Methyladenosine
<220> FEATURE:
<221> NAME/KEY: misc_feature
<222> LOCATION: (31)..(32)
<223> OTHER INFORMATION: phosphorothioation
<220> FEATURE:
<221> NAME/KEY: modified_base
<222> LOCATION: (31)..(31)
<223> OTHER INFORMATION: tm
```

```
<220> FEATURE:
<221> NAME/KEY: misc_feature
<222> LOCATION: (32)..(33)
<223> OTHER INFORMATION: phosphorothioation
<220> FEATURE:
<221> NAME/KEY: modified_base
<222> LOCATION: (32)..(33)
<223> OTHER INFORMATION: cm
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: modified_base
<222> LOCATION: (34)..(34)
<223> OTHER INFORMATION: tm
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(36)
<223> OTHER INFORMATION: gm
<220> FEATURE:
<221> NAME/KEY: modified_base
<222> LOCATION: (37)..(37)
<223> OTHER INFORMATION: 2'-O-Methyladenosine
<220> FEATURE:
<221> NAME/KEY: modified_base
<222> LOCATION: (38)..(38)
<223> OTHER INFORMATION: gm

<400> SEQUENCE: 13
ggtgcatgca tgcagggggg atcaaagtca tcctggag                          38

<210> SEQ ID NO 14
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: GpC(A)-ODN-STAT3 LNA ASO1
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
```

```
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 14
ggtgcatgca tgcagggggg gcaacctgac tttagt                                      36

<210> SEQ ID NO 15
<211> LENGTH: 36
<212> TYPE: DNA
<213> ORGANISM: Artificial sequence
<220> FEATURE:
```

```
<223> OTHER INFORMATION: Synthetic polynucleotide
<220> FEATURE:
<221> NAME/KEY: misc_feature
<223> OTHER INFORMATION: GpC(A)-ODN-STAT3 LNA ASO2
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
```

```
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 15
ggtgcatgca tgcaggggggg gattctgcta atgacg                                 36

<210> SEQ ID NO 16
<211> LENGTH: 36
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: GpC(A)-ODN-STAT3 LNA ASO3
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: misc_feature
<222> LOCATION: (21)..(23)
<223> OTHER INFORMATION: locked nucleic acid
<220> FEATURE:
<221> NAME/KEY: misc_feature
<222> LOCATION: (22)..(23)
<223> OTHER INFORMATION: phosphorothioation
<220> FEATURE:
<221> NAME/KEY: misc_feature
<222> LOCATION: (23)..(24)
<223> OTHER INFORMATION: phosphorothioation
<220> FEATURE:
<221> NAME/KEY: misc_feature
<222> LOCATION: (24)..(25)
```

```
<223> OTHER INFORMATION: phosphorothioation
<220> FEATURE:
<221> NAME/KEY: misc_feature
<222> LOCATION: (25)..(26)
<223> OTHER INFORMATION: phosphorothioation
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (34)..(36)
<223> OTHER INFORMATION: locked nucleic acid

<400> SEQUENCE: 16
ggtgcatgca tgcagggggg tgacgggtct gaagtt                              36

<210> SEQ ID NO 17
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: cm
<220> FEATURE:
<221> NAME/KEY: modified_base
<222> LOCATION: (2)..(2)
<223> OTHER INFORMATION: tm
<220> FEATURE:
<221> NAME/KEY: modified_base
<222> LOCATION: (3)..(3)
<223> OTHER INFORMATION: 2'-O-Methyladenosine
<220> FEATURE:
<221> NAME/KEY: modified_base
<222> LOCATION: (13)..(13)
<223> OTHER INFORMATION: cm
<220> FEATURE:
<221> NAME/KEY: modified_base
<222> LOCATION: (14)..(14)
<223> OTHER INFORMATION: 2'-O-Methyladenosine
<220> FEATURE:
<221> NAME/KEY: modified_base
```

```
<222> LOCATION: (15)..(15)
<223> OTHER INFORMATION: gm
<220> FEATURE:
<221> NAME/KEY: modified_base
<222> LOCATION: (16)..(16)
<223> OTHER INFORMATION: cm

<400> SEQUENCE: 17
ctatttggat gtcagc                                                     16

<210> SEQ ID NO 18
<211> LENGTH: 20
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: cm
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: modified_base
<222> LOCATION: (2)..(2)
<223> OTHER INFORMATION: 2'-O-Methyladenosine
<220> FEATURE:
<221> NAME/KEY: misc_feature
<222> LOCATION: (3)..(4)
<223> OTHER INFORMATION: phosphorothioation
<220> FEATURE:
<221> NAME/KEY: modified_base
<222> LOCATION: (3)..(3)
<223> OTHER INFORMATION: gm
<220> FEATURE:
<221> NAME/KEY: misc_feature
<222> LOCATION: (4)..(5)
<223> OTHER INFORMATION: phosphorothioation
<220> FEATURE:
<221> NAME/KEY: modified_base
<222> LOCATION: (4)..(4)
<223> OTHER INFORMATION: cm
<220> FEATURE:
<221> NAME/KEY: misc_feature
<222> LOCATION: (5)..(6)
<223> OTHER INFORMATION: phosphorothioation
<220> FEATURE:
<221> NAME/KEY: modified_base
<222> LOCATION: (5)..(5)
<223> OTHER INFORMATION: 2'-O-Methyladenosine
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
```

<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (16)..(16)
<223> OTHER INFORMATION: 2'-O-Methyladenosine
<220> FEATURE:
<221> NAME/KEY: misc_feature
<222> LOCATION: (17)..(18)
<223> OTHER INFORMATION: phosphorothioation
<220> FEATURE:
<221> NAME/KEY: modified_base
<222> LOCATION: (17)..(19)
<223> OTHER INFORMATION: gm
<220> FEATURE:
<221> NAME/KEY: misc_feature
<222> LOCATION: (18)..(19)
<223> OTHER INFORMATION: phosphorothioation
<220> FEATURE:
<221> NAME/KEY: modified_base
<222> LOCATION: (20)..(20)
<223> OTHER INFORMATION: 2'-O-Methyladenosine

<400> SEQUENCE: 18
cagcagatca agtccaggga                                          20

<210> SEQ ID NO 19
<211> LENGTH: 20
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(4)
<223> OTHER INFORMATION: tm
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation

```
<220> FEATURE:
<221> NAME/KEY: modified_base
<222> LOCATION: (5)..(5)
<223> OTHER INFORMATION: gm
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (16)..(17)
<223> OTHER INFORMATION: cm
<220> FEATURE:
<221> NAME/KEY: misc_feature
<222> LOCATION: (17)..(18)
<223> OTHER INFORMATION: phosphorothioation
<220> FEATURE:
<221> NAME/KEY: modified_base
<222> LOCATION: (17)..(17)
<223> OTHER INFORMATION: 2'-O-Methyladenosine
<220> FEATURE:
<221> NAME/KEY: misc_feature
<222> LOCATION: (18)..(19)
<223> OTHER INFORMATION: phosphorothioation
<220> FEATURE:
<221> NAME/KEY: modified_base
<222> LOCATION: (19)..(19)
<223> OTHER INFORMATION: cm
<220> FEATURE:
<221> NAME/KEY: modified_base
<222> LOCATION: (20)..(20)
<223> OTHER INFORMATION: tm

<400> SEQUENCE: 19
ttttgcatga tgtaaccact                                              20

<210> SEQ ID NO 20
```

```
<211> LENGTH: 18
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: 2'-O-Methyladenosine
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: modified_base
<222> LOCATION: (2)..(2)
<223> OTHER INFORMATION: tm
<220> FEATURE:
<221> NAME/KEY: misc_feature
<222> LOCATION: (3)..(4)
<223> OTHER INFORMATION: phosphorothioation
<220> FEATURE:
<221> NAME/KEY: modified_base
<222> LOCATION: (3)..(3)
<223> OTHER INFORMATION: cm
<220> FEATURE:
<221> NAME/KEY: misc_feature
<222> LOCATION: (4)..(5)
<223> OTHER INFORMATION: phosphorothioation
<220> FEATURE:
<221> NAME/KEY: modified_base
<222> LOCATION: (4)..(6)
<223> OTHER INFORMATION: 2'-O-Methyladenosine
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: modified_base
<222> LOCATION: (7)..(7)
<223> OTHER INFORMATION: gm
<220> FEATURE:
<221> NAME/KEY: misc_feature
<222> LOCATION: (8)..(9)
<223> OTHER INFORMATION: phosphorothioation
<220> FEATURE:
<221> NAME/KEY: modified_base
<222> LOCATION: (8)..(8)
<223> OTHER INFORMATION: tm
<220> FEATURE:
<221> NAME/KEY: misc_feature
<222> LOCATION: (9)..(10)
<223> OTHER INFORMATION: phosphorothioation
<220> FEATURE:
<221> NAME/KEY: modified_base
<222> LOCATION: (9)..(9)
<223> OTHER INFORMATION: cm
<220> FEATURE:
<221> NAME/KEY: misc_feature
<222> LOCATION: (10)..(11)
<223> OTHER INFORMATION: phosphorothioation
<220> FEATURE:
<221> NAME/KEY: modified_base
<222> LOCATION: (10)..(10)
<223> OTHER INFORMATION: 2'-O-Methyladenosine
<220> FEATURE:
<221> NAME/KEY: misc_feature
```

-continued

```
<222> LOCATION: (11)..(12)
<223> OTHER INFORMATION: phosphorothioation
<220> FEATURE:
<221> NAME/KEY: modified_base
<222> LOCATION: (11)..(11)
<223> OTHER INFORMATION: tm
<220> FEATURE:
<221> NAME/KEY: misc_feature
<222> LOCATION: (12)..(13)
<223> OTHER INFORMATION: phosphorothioation
<220> FEATURE:
<221> NAME/KEY: modified_base
<222> LOCATION: (12)..(13)
<223> OTHER INFORMATION: cm
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: modified_base
<222> LOCATION: (14)..(14)
<223> OTHER INFORMATION: tm
<220> FEATURE:
<221> NAME/KEY: misc_feature
<222> LOCATION: (15)..(16)
<223> OTHER INFORMATION: phosphorothioation
<220> FEATURE:
<221> NAME/KEY: modified_base
<222> LOCATION: (15)..(16)
<223> OTHER INFORMATION: gm
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (17)..(17)
<223> OTHER INFORMATION: 2'-O-Methyladenosine
<220> FEATURE:
<221> NAME/KEY: modified_base
<222> LOCATION: (18)..(18)
<223> OTHER INFORMATION: gm

<400> SEQUENCE: 20
atcaaagtca tcctggag                                                 18

<210> SEQ ID NO 21
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
```

```
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 21
gcaacctgac tttagt                                                    16

<210> SEQ ID NO 22
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
```

```
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 22
gattctgcta atgacg                                                    16

<210> SEQ ID NO 23
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
```

```
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 23
tgacgggtct gaagtt                                                       16

<210> SEQ ID NO 24
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
```

```
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 24
agatagcaga agtagg                                                 16

<210> SEQ ID NO 25
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
```

```
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 25
gtcaatgcac acttta                                                       16

<210> SEQ ID NO 26
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: cm
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: modified_base
<222> LOCATION: (2)..(2)
<223> OTHER INFORMATION: tm
<220> FEATURE:
<221> NAME/KEY: misc_feature
<222> LOCATION: (3)..(4)
<223> OTHER INFORMATION: phosphorothioation
<220> FEATURE:
<221> NAME/KEY: modified_base
<222> LOCATION: (3)..(3)
<223> OTHER INFORMATION: 2'-O-Methyladenosine
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
```

```
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: modified_base
<222> LOCATION: (14)..(14)
<223> OTHER INFORMATION: 2'-O-Methyladenosine
<220> FEATURE:
<221> NAME/KEY: modified_base
<222> LOCATION: (15)..(15)
<223> OTHER INFORMATION: gm
<220> FEATURE:
<221> NAME/KEY: modified_base
<222> LOCATION: (16)..(16)
<223> OTHER INFORMATION: cm

<400> SEQUENCE: 26
ctatttggat gtcagc                                                     16

<210> SEQ ID NO 27
<211> LENGTH: 20
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: cm
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: modified_base
<222> LOCATION: (2)..(2)
<223> OTHER INFORMATION: 2'-O-Methyladenosine
<220> FEATURE:
<221> NAME/KEY: misc_feature
<222> LOCATION: (3)..(4)
<223> OTHER INFORMATION: phosphorothioation
<220> FEATURE:
<221> NAME/KEY: modified_base
<222> LOCATION: (3)..(3)
```

-continued

```
<223> OTHER INFORMATION: gm
<220> FEATURE:
<221> NAME/KEY: misc_feature
<222> LOCATION: (4)..(5)
<223> OTHER INFORMATION: phosphorothioation
<220> FEATURE:
<221> NAME/KEY: modified_base
<222> LOCATION: (4)..(4)
<223> OTHER INFORMATION: cm
<220> FEATURE:
<221> NAME/KEY: misc_feature
<222> LOCATION: (5)..(6)
<223> OTHER INFORMATION: phosphorothioation
<220> FEATURE:
<221> NAME/KEY: modified_base
<222> LOCATION: (5)..(5)
<223> OTHER INFORMATION: 2'-O-Methyladenosine
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (16)..(16)
<223> OTHER INFORMATION: 2'-O-Methyladenosine
<220> FEATURE:
<221> NAME/KEY: misc_feature
<222> LOCATION: (17)..(18)
<223> OTHER INFORMATION: phosphorothioation
<220> FEATURE:
<221> NAME/KEY: modified_base
<222> LOCATION: (17)..(19)
<223> OTHER INFORMATION: gm
<220> FEATURE:
<221> NAME/KEY: misc_feature
<222> LOCATION: (18)..(19)
<223> OTHER INFORMATION: phosphorothioation
<220> FEATURE:
<221> NAME/KEY: modified_base
```

```
<222> LOCATION: (20)..(20)
<223> OTHER INFORMATION: 2'-O-Methyladenosine

<400> SEQUENCE: 27
cagcagatca agtccaggga                                          20

<210> SEQ ID NO 28
<211> LENGTH: 20
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(4)
<223> OTHER INFORMATION: tm
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: modified_base
<222> LOCATION: (5)..(5)
<223> OTHER INFORMATION: gm
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
```

```
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (16)..(17)
<223> OTHER INFORMATION: cm
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: modified_base
<222> LOCATION: (18)..(18)
<223> OTHER INFORMATION: 2'-O-Methyladenosine
<220> FEATURE:
<221> NAME/KEY: modified_base
<222> LOCATION: (19)..(19)
<223> OTHER INFORMATION: cm
<220> FEATURE:
<221> NAME/KEY: modified_base
<222> LOCATION: (20)..(20)
<223> OTHER INFORMATION: tm

<400> SEQUENCE: 28
ttttgcatga tgtaaccact                                               20

<210> SEQ ID NO 29
<211> LENGTH: 18
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: 2'-O-Methyladenosine
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: modified_base
<222> LOCATION: (2)..(2)
<223> OTHER INFORMATION: tm
<220> FEATURE:
<221> NAME/KEY: misc_feature
<222> LOCATION: (3)..(4)
<223> OTHER INFORMATION: phosphorothioation
<220> FEATURE:
<221> NAME/KEY: modified_base
<222> LOCATION: (3)..(3)
<223> OTHER INFORMATION: cm
<220> FEATURE:
<221> NAME/KEY: misc_feature
<222> LOCATION: (4)..(5)
<223> OTHER INFORMATION: phosphorothioation
<220> FEATURE:
<221> NAME/KEY: modified_base
<222> LOCATION: (4)..(6)
<223> OTHER INFORMATION: 2'-O-Methyladenosine
<220> FEATURE:
<221> NAME/KEY: misc_feature
<222> LOCATION: (5)..(6)
<223> OTHER INFORMATION: phosphorothioation
```

-continued

```
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: modified_base
<222> LOCATION: (7)..(7)
<223> OTHER INFORMATION: gm
<220> FEATURE:
<221> NAME/KEY: misc_feature
<222> LOCATION: (8)..(9)
<223> OTHER INFORMATION: phosphorothioation
<220> FEATURE:
<221> NAME/KEY: modified_base
<222> LOCATION: (8)..(8)
<223> OTHER INFORMATION: tm
<220> FEATURE:
<221> NAME/KEY: misc_feature
<222> LOCATION: (9)..(10)
<223> OTHER INFORMATION: phosphorothioation
<220> FEATURE:
<221> NAME/KEY: modified_base
<222> LOCATION: (9)..(9)
<223> OTHER INFORMATION: cm
<220> FEATURE:
<221> NAME/KEY: misc_feature
<222> LOCATION: (10)..(11)
<223> OTHER INFORMATION: phosphorothioation
<220> FEATURE:
<221> NAME/KEY: modified_base
<222> LOCATION: (10)..(10)
<223> OTHER INFORMATION: 2'-O-Methyladenosine
<220> FEATURE:
<221> NAME/KEY: misc_feature
<222> LOCATION: (11)..(12)
<223> OTHER INFORMATION: phosphorothioation
<220> FEATURE:
<221> NAME/KEY: modified_base
<222> LOCATION: (11)..(11)
<223> OTHER INFORMATION: tm
<220> FEATURE:
<221> NAME/KEY: misc_feature
<222> LOCATION: (12)..(13)
<223> OTHER INFORMATION: phosphorothioation
<220> FEATURE:
<221> NAME/KEY: modified_base
<222> LOCATION: (12)..(13)
<223> OTHER INFORMATION: cm
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: modified_base
<222> LOCATION: (14)..(14)
<223> OTHER INFORMATION: tm
<220> FEATURE:
<221> NAME/KEY: misc_feature
<222> LOCATION: (15)..(16)
<223> OTHER INFORMATION: phosphorothioation
<220> FEATURE:
<221> NAME/KEY: modified_base
<222> LOCATION: (15)..(16)
<223> OTHER INFORMATION: gm
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (17)..(17)
```

<223> OTHER INFORMATION: 2'-O-Methyladenosine
<220> FEATURE:
<221> NAME/KEY: modified_base
<222> LOCATION: (18)..(18)
<223> OTHER INFORMATION: gm

<400> SEQUENCE: 29
atcaaagtca tcctggag                                                   18

<210> SEQ ID NO 30
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 30
gcaacctgac tttagt                                                      16

<210> SEQ ID NO 31
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 31
gattctgcta atgacg                                                          16

<210> SEQ ID NO 32
<211> LENGTH: 16
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<222> LOCATION: (1)..(3)
<223> OTHER INFORMATION: locked nucleic acid
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (14)..(16)
<223> OTHER INFORMATION: locked nucleic acid

<400> SEQUENCE: 32
tgacgggtct gaagtt                                                          16

```
<210> SEQ ID NO 33
<211> LENGTH: 40
<212> TYPE: DNA
<213> ORGANISM: Artificial sequence
<220> FEATURE:
<223> OTHER INFORMATION: Synthetic polynucleotide
<220> FEATURE:
<221> NAME/KEY: misc_feature
<223> OTHER INFORMATION: Human CpG-STAT3ASO - (CpG-D19 ODN + human STAT3
      ASO targeting sequence)
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: cm
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
<223> OTHER INFORMATION: 2'-O-Methyladenosine
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: gm
<220> FEATURE:
<221> NAME/KEY: misc_feature
<222> LOCATION: (24)..(25)
<223> OTHER INFORMATION: phosphorothioation
<220> FEATURE:
<221> NAME/KEY: modified_base
<222> LOCATION: (24)..(24)
<223> OTHER INFORMATION: cm
<220> FEATURE:
<221> NAME/KEY: misc_feature
<222> LOCATION: (25)..(26)
```

<223> OTHER INFORMATION: phosphorothioation
<220> FEATURE:
<221> NAME/KEY: modified_base
<222> LOCATION: (25)..(25)
<223> OTHER INFORMATION: 2'-O-Methyladenosine
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(36)
<223> OTHER INFORMATION: 2'-O-Methyladenosine
<220> FEATURE:
<221> NAME/KEY: misc_feature
<222> LOCATION: (37)..(38)
<223> OTHER INFORMATION: phosphorothioation
<220> FEATURE:
<221> NAME/KEY: modified_base
<222> LOCATION: (37)..(39)
<223> OTHER INFORMATION: gm
<220> FEATURE:
<221> NAME/KEY: misc_feature
<222> LOCATION: (38)..(39)
<223> OTHER INFORMATION: phosphorothioation
<220> FEATURE:
<221> NAME/KEY: modified_base
<222> LOCATION: (40)..(40)
<223> OTHER INFORMATION: 2'-O-Methyladenosine

<400> SEQUENCE: 33
ggtgcatcga tgcaggggggg cagcagatca agtccaggga            40

<210> SEQ ID NO 34
<211> LENGTH: 40
<212> TYPE: DNA
<213> ORGANISM: Artificial sequence

```
<220> FEATURE:
<223> OTHER INFORMATION: Synthetic polynucleotide
<220> FEATURE:
<221> NAME/KEY: misc_feature
<223> OTHER INFORMATION: Mouse CpG-STAT3ASO - (CpG1668 ODN + mouse STAT3
      ASO targeting sequence)
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: misc_feature
<222> LOCATION: (3)..(4)
<223> OTHER INFORMATION: phosphorothioation
<220> FEATURE:
<221> NAME/KEY: misc_feature
<222> LOCATION: (4)..(5)
<223> OTHER INFORMATION: phosphorothioation
<220> FEATURE:
<221> NAME/KEY: misc_feature
<222> LOCATION: (5)..(6)
<223> OTHER INFORMATION: phosphorothioation
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: misc_feature
<222> LOCATION: (17)..(18)
<223> OTHER INFORMATION: phosphorothioation
<220> FEATURE:
<221> NAME/KEY: misc_feature
<222> LOCATION: (18)..(19)
<223> OTHER INFORMATION: phosphorothioation
<220> FEATURE:
```

```
<221> NAME/KEY: misc_feature
<222> LOCATION: (19)..(20)
<223> OTHER INFORMATION: phosphorothioation
<220> FEATURE:
<221> NAME/KEY: misc_feature
<222> LOCATION: (20)..(21)
<223> OTHER INFORMATION: (C3)5
<220> FEATURE:
<221> NAME/KEY: misc_feature
<222> LOCATION: (21)..(22)
<223> OTHER INFORMATION: phosphorothioation
<220> FEATURE:
<221> NAME/KEY: modified_base
<222> LOCATION: (21)..(21)
<223> OTHER INFORMATION: gm
<220> FEATURE:
<221> NAME/KEY: misc_feature
<222> LOCATION: (22)..(23)
<223> OTHER INFORMATION: phosphorothioation
<220> FEATURE:
<221> NAME/KEY: modified_base
<222> LOCATION: (22)..(22)
<223> OTHER INFORMATION: 2'-O-Methyladenosine
<220> FEATURE:
<221> NAME/KEY: misc_feature
<222> LOCATION: (23)..(24)
<223> OTHER INFORMATION: phosphorothioation
<220> FEATURE:
<221> NAME/KEY: modified_base
<222> LOCATION: (23)..(23)
<223> OTHER INFORMATION: cm
<220> FEATURE:
<221> NAME/KEY: misc_feature
<222> LOCATION: (24)..(25)
<223> OTHER INFORMATION: phosphorothioation
<220> FEATURE:
<221> NAME/KEY: modified_base
<222> LOCATION: (24)..(24)
<223> OTHER INFORMATION: tm
<220> FEATURE:
<221> NAME/KEY: misc_feature
<222> LOCATION: (25)..(26)
<223> OTHER INFORMATION: phosphorothioation
<220> FEATURE:
<221> NAME/KEY: modified_base
<222> LOCATION: (25)..(25)
<223> OTHER INFORMATION: cm
<220> FEATURE:
<221> NAME/KEY: misc_feature
<222> LOCATION: (26)..(27)
<223> OTHER INFORMATION: phosphorothioation
<220> FEATURE:
<221> NAME/KEY: misc_feature
<222> LOCATION: (27)..(28)
<223> OTHER INFORMATION: phosphorothioation
<220> FEATURE:
<221> NAME/KEY: misc_feature
<222> LOCATION: (28)..(29)
<223> OTHER INFORMATION: phosphorothioation
<220> FEATURE:
<221> NAME/KEY: misc_feature
<222> LOCATION: (29)..(30)
<223> OTHER INFORMATION: phosphorothioation
<220> FEATURE:
<221> NAME/KEY: misc_feature
<222> LOCATION: (30)..(31)
<223> OTHER INFORMATION: phosphorothioation
<220> FEATURE:
<221> NAME/KEY: misc_feature
<222> LOCATION: (31)..(32)
<223> OTHER INFORMATION: phosphorothioation
<220> FEATURE:
<221> NAME/KEY: misc_feature
<222> LOCATION: (32)..(33)
<223> OTHER INFORMATION: phosphorothioation
<220> FEATURE:
<221> NAME/KEY: misc_feature
<222> LOCATION: (33)..(34)
<223> OTHER INFORMATION: phosphorothioation
```

```
<220> FEATURE:
<221> NAME/KEY: misc_feature
<222> LOCATION: (34)..(35)
<223> OTHER INFORMATION: phosphorothioation
<220> FEATURE:
<221> NAME/KEY: misc_feature
<222> LOCATION: (35)..(36)
<223> OTHER INFORMATION: phosphorothioation
<220> FEATURE:
<221> NAME/KEY: misc_feature
<222> LOCATION: (36)..(37)
<223> OTHER INFORMATION: phosphorothioation
<220> FEATURE:
<221> NAME/KEY: modified_base
<222> LOCATION: (36)..(36)
<223> OTHER INFORMATION: cm
<220> FEATURE:
<221> NAME/KEY: misc_feature
<222> LOCATION: (37)..(38)
<223> OTHER INFORMATION: phosphorothioation
<220> FEATURE:
<221> NAME/KEY: modified_base
<222> LOCATION: (37)..(38)
<223> OTHER INFORMATION: gm
<220> FEATURE:
<221> NAME/KEY: misc_feature
<222> LOCATION: (38)..(39)
<223> OTHER INFORMATION: phosphorothioation
<220> FEATURE:
<221> NAME/KEY: misc_feature
<222> LOCATION: (39)..(40)
<223> OTHER INFORMATION: phosphorothioation
<220> FEATURE:
<221> NAME/KEY: modified_base
<222> LOCATION: (39)..(39)
<223> OTHER INFORMATION: cm
<220> FEATURE:
<221> NAME/KEY: modified_base
<222> LOCATION: (40)..(40)
<223> OTHER INFORMATION: tm

<400> SEQUENCE: 34
tccatgacgt tcctgatgct gactcttgca ggaatcggct                             40

<210> SEQ ID NO 35
<211> LENGTH: 20
<212> TYPE: DNA
<213> ORGANISM: Artificial sequence
<220> FEATURE:
<223> OTHER INFORMATION: Synthetic polynucleotide
<220> FEATURE:
<221> NAME/KEY: modified_base
<222> LOCATION: (1)..(1)
<223> OTHER INFORMATION: gm
<220> FEATURE:
<221> NAME/KEY: misc_feature
<222> LOCATION: (1)..(2)
<223> OTHER INFORMATION: phosphorothioation
<220> FEATURE:
<221> NAME/KEY: misc_feature
<222> LOCATION: (2)..(3)
<223> OTHER INFORMATION: phosphorothioation
<220> FEATURE:
<221> NAME/KEY: modified_base
<222> LOCATION: (2)..(2)
<223> OTHER INFORMATION: 2'-O-Methyladenosine
<220> FEATURE:
<221> NAME/KEY: misc_feature
<222> LOCATION: (3)..(4)
<223> OTHER INFORMATION: phosphorothioation
<220> FEATURE:
<221> NAME/KEY: modified_base
<222> LOCATION: (3)..(3)
<223> OTHER INFORMATION: cm
<220> FEATURE:
<221> NAME/KEY: misc_feature
<222> LOCATION: (4)..(5)
```

```
<223> OTHER INFORMATION: phosphorothioation
<220> FEATURE:
<221> NAME/KEY: modified_base
<222> LOCATION: (4)..(4)
<223> OTHER INFORMATION: tm
<220> FEATURE:
<221> NAME/KEY: misc_feature
<222> LOCATION: (5)..(6)
<223> OTHER INFORMATION: phosphorothioation
<220> FEATURE:
<221> NAME/KEY: modified_base
<222> LOCATION: (5)..(5)
<223> OTHER INFORMATION: cm
<220> FEATURE:
<221> NAME/KEY: misc_feature
<222> LOCATION: (6)..(7)
<223> OTHER INFORMATION: phosphorothioation
<220> FEATURE:
<221> NAME/KEY: misc_feature
<222> LOCATION: (7)..(8)
<223> OTHER INFORMATION: phosphorothioation
<220> FEATURE:
<221> NAME/KEY: misc_feature
<222> LOCATION: (8)..(9)
<223> OTHER INFORMATION: phosphorothioation
<220> FEATURE:
<221> NAME/KEY: misc_feature
<222> LOCATION: (9)..(10)
<223> OTHER INFORMATION: phosphorothioation
<220> FEATURE:
<221> NAME/KEY: misc_feature
<222> LOCATION: (10)..(11)
<223> OTHER INFORMATION: phosphorothioation
<220> FEATURE:
<221> NAME/KEY: misc_feature
<222> LOCATION: (11)..(12)
<223> OTHER INFORMATION: phosphorothioation
<220> FEATURE:
<221> NAME/KEY: misc_feature
<222> LOCATION: (12)..(13)
<223> OTHER INFORMATION: phosphorothioation
<220> FEATURE:
<221> NAME/KEY: misc_feature
<222> LOCATION: (13)..(14)
<223> OTHER INFORMATION: phosphorothioation
<220> FEATURE:
<221> NAME/KEY: misc_feature
<222> LOCATION: (14)..(15)
<223> OTHER INFORMATION: phosphorothioation
<220> FEATURE:
<221> NAME/KEY: misc_feature
<222> LOCATION: (15)..(16)
<223> OTHER INFORMATION: phosphorothioation
<220> FEATURE:
<221> NAME/KEY: misc_feature
<222> LOCATION: (16)..(17)
<223> OTHER INFORMATION: phosphorothioation
<220> FEATURE:
<221> NAME/KEY: modified_base
<222> LOCATION: (16)..(16)
<223> OTHER INFORMATION: cm
<220> FEATURE:
<221> NAME/KEY: misc_feature
<222> LOCATION: (17)..(18)
<223> OTHER INFORMATION: phosphorothioation
<220> FEATURE:
<221> NAME/KEY: modified_base
<222> LOCATION: (17)..(18)
<223> OTHER INFORMATION: gm
<220> FEATURE:
<221> NAME/KEY: misc_feature
<222> LOCATION: (18)..(19)
<223> OTHER INFORMATION: phosphorothioation
<220> FEATURE:
<221> NAME/KEY: misc_feature
<222> LOCATION: (19)..(20)
<223> OTHER INFORMATION: phosphorothioation
<220> FEATURE:
<221> NAME/KEY: modified_base
```

```
<222> LOCATION: (19)..(19)
<223> OTHER INFORMATION: cm
<220> FEATURE:
<221> NAME/KEY: modified_base
<222> LOCATION: (20)..(20)
<223> OTHER INFORMATION: tm

<400> SEQUENCE: 35
gactcttgca ggaatcggct                                              20
```

NEURAL STEM CELL DELIVERY OF THERAPEUTIC AGENTS

CROSS-REFERENCE TO RELATED APPLICATIONS

This application claims priority to U.S. Application No. 62/889,799 filed Aug. 21, 2019, the disclosure of which is incorporated by reference herein in its entirety.

STATEMENT AS TO RIGHTS TO INVENTIONS MADE UNDER FEDERALLY SPONSORED RESEARCH AND DEVELOPMENT

This invention was made with government support under grant nos. CA197359 and CA215183 awarded by the National Institutes of Health. The government has certain rights in the invention.

REFERENCE TO A "SEQUENCE LISTING," A TABLE, OR A COMPUTER PROGRAM LISTING APPENDIX SUBMITTED AS AN ASCII FILE

The Sequence Listing written in file 048440-732001US_SequenceListing_ST25.txt, created Nov. 5, 2020, 71,057 bytes, machine format IBM-PC, MS Windows operating system, is hereby incorporated by reference.

BACKGROUND

Neural stem cells (NSCs) have inherent tumor-tropic properties that can be exploited for targeted delivery of anti-cancer agents to invasive and metastatic tumors. NSCs can overcome the major obstacles limiting the efficacy of current treatments through their abilities to cross the blood brain barrier, to target therapeutic agents to primary and invasive tumor foci throughout the brain, and to minimize toxicity to normal tissues by acting as a local platform for tumor treatment. For use as delivery vehicles, NSCs have been engineered to express a variety of anti-cancer agents, including prodrug-activating enzymes, apoptosis-inducing agents, antibodies, and oncolytic viruses. NSCs engineered to express various anti-cancer agents and injected intracerebrally exert significant therapeutic efficacy in preclinical brain tumor models of orthotopic glioma, medulloblastoma, melanoma brain metastases, and breast cancer brain metastases. In addition, intravenously administered, genetically engineered NSCs target tumors and are therapeutically effective in mouse models of disseminated neuroblastoma and primary and metastatic breast cancer. These observations suggest that the potential clinical applications of NSC-mediated cancer treatment may be quite extensive. Accordingly, the disclosure is directed to new compositions and methods to treat cancer and other diseases by exploiting neural stem cells.

BRIEF SUMMARY

The disclosure provides neural stem cells comprising exogenous nucleic acids, wherein the exogenous nucleic acids comprise a neural stem cell-loading sequence bonded to an immunostimulatory sequence via a linking group. In aspects, the neural stem cell-loading sequence comprises a Toll-like receptor 3-binding nucleic acid sequence, a Toll-like receptor 9-binding nucleic acid sequence, or a combination of thereof. In aspects, the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence, or a combination of two or more thereof. In aspects, the linking group comprises a substituted heteroalkylene, such as an internal C3 spacer modification. In aspects, the exogenous nucleic acid comprises any one of SEQ ID NOS:1-16, 33 and 34. In embodiments, the disclosure provides pharmaceutical compositions comprising an effective amount of the neural stems and a pharmaceutically acceptable excipient. In embodiments, the disclosure provides methods of treating cancer, inflammatory diseases, and neurodegenerative diseases by administering to patients an effective amount of the neural stem cells described herein.

The disclosure provides neural stem cells comprising vesicles, wherein the vesicles comprise exogenous nucleic acids, wherein the exogenous nucleic acids comprise a neural stem cell-loading sequence bonded to an immunostimulatory sequence via a linking group. In aspects, the neural stem cell-loading sequence comprises a Toll-like receptor 3-binding nucleic acid sequence, a Toll-like receptor 9-binding nucleic acid sequence, or a combination thereof. In aspects, the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence. In aspects, the linking group comprises a substituted heteroalkylene, such as an internal C3 spacer modification. In aspects, the exogenous nucleic acid comprises any one of SEQ ID NOS:1-16, 33, and 34. In embodiments, the disclosure provides pharmaceutical compositions comprising an effective amount of the neural stems and a pharmaceutically acceptable excipient. In embodiments, the disclosure provides methods of treating cancer, inflammatory diseases, and neurodegenerative diseases by administering to patients an effective amount of the neural stem cells described herein.

The disclosure provides vesicles comprising exogenous nucleic acids, wherein the exogenous nucleic acids comprise a neural stem cell-loading sequence bonded to an immunostimulatory sequence via a linking group. In aspects, the neural stem cell-loading sequence comprises a Toll-like receptor 3-binding nucleic acid sequence, a Toll-like receptor 9-binding nucleic acid sequence, or a combination thereof. In aspects, the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence. In aspects, the linking group comprises a substituted heteroalkylene, such as an internal C3 spacer modification. In aspects, the exogenous nucleic acid comprises any one of SEQ ID NOS:1-16, 33, and 34. In embodiments, the disclosure provides pharmaceutical compositions comprising an effective amount of the vesicles and a pharmaceutically acceptable excipient. In embodiments, the disclosure provides methods of treating cancer, inflammatory diseases, and neurodegenerative diseases by administering to patients an effective amount of the vesicles described herein.

These and other embodiments and aspects of the disclosure are described herein.

BRIEF DESCRIPTION OF THE DRAWINGS

FIGS. 2A-2E show flow cytometry analyses of NSC-derived extracellular vesicles. NSCs were treated with 500 nM of CpG-STAT3 ASO for 48 hours. EVs were isolated through immunoprecipitation with anti-CD63 beads and analyzed for exosomes-specific antigens (FIGS. 2A-2C). The size and percentage of EVs loaded with Cy3-labeled oligonucleotide are shown in FIGS. 2D-2E.

FIG. 9A is a graph illustrating concentration and size of EVs isolated from cultured media of NSCs measured with NanoSight3000. FIG. 9B shows flow cytometry data analyzing exosomes-specific antigens CD63 and CD81 on EVs. NSCs were treated with 500 nM of CpG-STAT3ASO$^{Cy3}$ for 48 hours, then EVs were isolated, immunoprecipitated with anti-CD63 beads and analyzed. FIG. 9C is flow cytometry data assessing percentage of Cy3-labeled oligonucleotide loading. NSCs were treated with 500 nM of CpG-STAT3ASO$^{Cy3}$ for 48 hours, then EVs were isolated, immunoprecipitated with anti-CD63 beads and analyzed. IL12A mRNA level was measured by qPCR. FIGS. 9D-9E is flow cytometry data showing uptake of naked or encapsulated CpG-STAT3ASO$^{Cy3}$ (FIG. 9D) and a bar graph showing IL12A mRNA levels measured by qPCR (FIG. 9E). Human mDC cells were incubated with naked or encapsulated CpG-STAT3ASO$^{Cy3}$ for 24 h. FIG. 9F is an image of brain tissue where NSCs preloaded for 24 h with CpG-STAT3ASO$^{Cy3}$ were intracranially injected to syngeneic GL261 glioma tumors. After 24 h mice were sacrificed, and whole-brain sections were subsequently stained for microglia cells marker (Iba-1) and images were acquired on Zeiss LSM confocal microscope.

FIGS. 10A-10G show targeting and activation of human dendritic cells using EV-encapsulated CpG-STAT3 ASO. FIGS. 10A-10D show the uptake of the fluorescently labeled naked CpG-STAT3 ASO and EV-encapsulated CpG-STAT3 ASO after 4 hours of incubation at 10 nM with primary human PBMCs, where the results are from two different blood donors after gating for CD1c+ monocyte-derived dendritic cells and CD303+ plasmacytoid dendritic cells. FIG. 10E shows STAT3 knock-down in human dendritic cells treated with empty NSC-derived EVs, EV-encapsulated CpG-STAT3 ASO, or naked CpG-STAT3 ASO using 125 nM concentrations and 24 hours incubation in vitro, where the results are quantitative real-time PCR. FIGS. 10F-10G show immunostimulation of human dendritic cells by EV, EV-encapsulated CpG-STAT3 ASO, and naked CpG-STAT3 ASO in vitro. Human immune cells were incubated with 125 nM of the indicated reagents for 24 hours before RNA isolation and the analysis of IL12A expression (normalized to ACTB).

FIG. 11 shows a graphical abstract. NSCs uptake and internalize CpG-STAT3ASO without any formulation needed. Loaded cells are injected intracranially, where indicate chemotaxis toward glioblastoma tumor site. CpG-STAT3ASO in being encapsulated into extracellular vesicles (EVs) and released to the tumor microenvironment. Immune cells, such as DCs and macrophages uptake EV(CpG-STAT3ASO), resulting in triggering TLR9 signaling and inhibiting STAT3 expression. As a result, APCs maturation and activation provide an antitumor immune response against glioblastoma.

FIGS. 12A-12C show NSCs secrete exosomes loaded with CpG-STAT3ASO. FIG. 12A: NSC cells were treated with 500 nM of CpG-STAT3ASO$_{y3}$ for indicated time, then uptake was assessed using flow cytometry (left panel). Similarly, NSCs were treated with 250 nM of CpG-STAT3ASO$_{\alpha y3}$ for 3 h to examine intracellular colocalization of oligonucleotide and CD63 exosome marker using confocal microscopy (right panel). FIG. 12B: Previously isolated EVs were immunoprecipitated on anti-CD63 beads, then expression of surface antigens specific for exosomes was assessed by flow cytometry. FIG. 12C: NSCs were treated with 204 of CpG-STAT3ASO$_{y3}$ for 24 h, then medium was replaced. After 48 h EVs were isolated from culture media. Size and concentration of isolated vesicles were measured with NanoSight NS300 (left panel), whereas EVs' images were recorder using transmission electron microscope (right panel).

FIG. 13A: NSCs were treated with indicated does of CpG-STAT3ASO$_{y3}$ for 24 h, then medium was replaced with fresh one. After additional 48 h EVs were isolated from culture media and immunoprecipitated on anti-CD63 beads. Percentage of loaded (Cy3 positive) CD63$^+$CD81$^+$ EVs was assessed by flow cytometry. FIG. 13B: Similarly, NSCs were treated for 24 h with 5 μM of CpG-STAT3ASO$^C_{y3}$, then medium was replaced and EVs were isolated at indicated time points followed by flow analysis. FIG. 13C: EVs' protein amount was assessed with BCA assay, while molecular mass of encapsulated ODNs was quantified by fluorescent read at length 564 nm. Both results were normalized to amount produced by $10^6$ cells.

FIG. 14A: Mouse bone marrow-derived macrophages were differentiated in a presence of M-CSF for 6 days. Next, cells were treated with indicated doses of EVs. After 24 h cells were gently detached and analyzed using FLOW cytometry. Dot blots show CD11b$^+$ population. CpG-STAT3ASO (CSI3) was used as a control in concentration of 250 nM, whereas LPS 100 ng/ml. Graphs represent mean +SD. FIG. 14B: RAWblue reporter cells were treated with indicated doses of EVs for 24 h, then TLR9 activation was measured by SEAP detection using spectrometer. CpG-STAT3ASO (CSI3) was used as a control in concentration of 250 nM. FIG. 14C: DCs were differentiated from hPBMC in a presence of IL-4 and GM-CSF. Next, mDC cells were incubated with 200 μg/ml of empty EV or encapsulated with CpG-STAT3ASO for 24 h. Interleukin 12 (left panel) and STAT3 mRNA level (right panel) were measured by qPCR. CpG-STAT3ASO was used as a control in concentration of 500 nM and 1000 nM respectively. Shown are representative results from 2 donors, graphs represent mean +SD.

FIG. 15A: NSCs preloaded for 24 h with CpG-STAT3ASO$^{C}_{y3}$ were injected intracranially to syngeneic GL261 glioma tumors. After 24 h mice were euthanized, and single cell brain suspension was analyzed with flow cytometry. Uptake of EV(CpG-STAT3ASO$^{C}_{y3}$) was measured in microglia, macrophage and MDCS residue in glioblastoma microenvironment. Graphs show mean±SEM (n=3). FIG. 15B: Similarly, NSCs were preloaded with CpG-STAT3ASO (without Cy3 fluorochrome) then injected intracranially. Brain cells were isolated after 48 h, then frequency of macrophage occurrence in TME was calculated as the percentage of CD11b$^+$ F4/80$^+$ and CD11b$^+$CD45$^{hi}$ cells. FIG. 15C: Macrophage activation was shown as an MFI percentage of MHCII$^{hi}$ and CD40, CD80 or CD86 respectively. Graphs show means±SEM (n=5).

FIG. 18A: NSCs were treated with indicated doses of CpG-STAT3ASO for 24 h, then medium was replaced with fresh one for additional 12 h. Next, cells were harvested and analyzed for viability using flow cytometry. FIG. 18B: NSCs were treated as above for 24 h, then migration was assessed using Transwell assay. Graphs represent means±SEM.

FIG. 20A: EVs analysis by including CD63 and CD81 expression markers (supports FIG. 13A). FIG. 20B: Analysis of distant immune population within mouse brain (supports FIG. 16).

DETAILED DESCRIPTION

Definitions

Figure 1A:
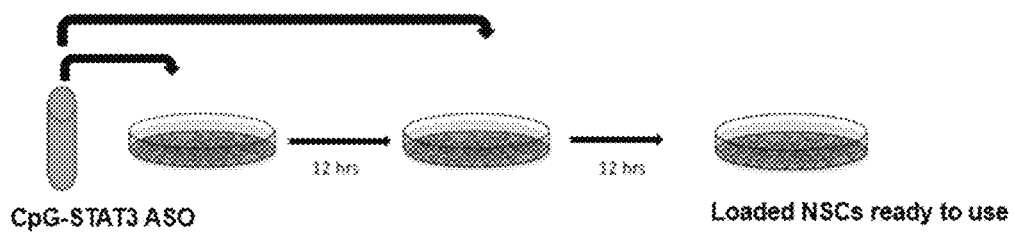
FIGS. 1A-1B show CpG STAT3 ASO loading into NSCs (FIG. 1A) and NSCs uptake CpG-STAT3 antisense oligonucleotides (ASOs) through scavenger receptor-mediated endocytosis and continuously released EVs containing the CpG-STAT3 ASOs for 2-3 days (FIG. 1B). STAT3-ASO inhibit the immune tolerance while TLR9 activation will cause a proinflammatory response.

Unless defined otherwise, technical and scientific terms used herein have the same meaning as commonly understood by a person of ordinary skill in the art. See, e.g., Singleton et al., Dictionary of Microbiology and Molecular Biology, 2nd ed., J. Wiley & Sons (New York, NY 1994); Sambrook et al., Molecular Cloning, A Laboratory Manual, Cold Springs Harbor Press (Cold Springs Harbor, N Y 1989). Any methods, devices and materials similar or equivalent to those described herein can be used in the practice of this disclosure. The following definitions are provided to facilitate understanding of certain terms used frequently herein and are not meant to limit the scope of the present disclosure.

A "cell" refers to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaryotic cells. Prokaryotic cells include but are not limited to bacteria. Eukaryotic cells include but are not limited to yeast cells and cells derived from plants and animals, for example mammalian (e.g. human) cells. Cells may be useful when they are naturally nonadherent or have been treated not to adhere to surfaces, for example by trypsinization.

A "stem cell" is a cell characterized by the ability of self-renewal through mitotic cell division and the potential to differentiate into a tissue or an organ. Among mammalian stem cells, embryonic stem cells (ES cells) and somatic stem cells (e.g., HSC) can be distinguished. Embryonic stem cells reside in the blastocyst and give rise to embryonic tissues, whereas somatic stem cells reside in adult tissues for the purpose of tissue regeneration and repair.

A "neural stem cell" refers to a stem cell capable to self-renew through mitotic cell division and to differentiate into a neural cell (e.g., glia cell, neuron, astrocyte, oligodendrocyte). In aspects, the neural stem cell is a human neural stem cell. In aspects, the neural stem cell is a human leukocyte antigen (HLA) II-negative neural stem cell. In aspects, the neural stem cell is NE-4C (ATCC® CRL-2925™). In aspects, the neural stem cell is NE-GFP-4C (ATCC® CRL-2926™). In aspects, the neural stem cell is ReNcell® by MilliporeSigma. In aspects, the neural stem cell is an HB1.F3 neural stem cell. In aspects, the neural stem cell is an HB1.F3.CD21 neural stem cell. See, e.g., Cellosaurus at Accession No. CVCL_LJ45; Li et al, Stem Cell Reports, 7:483-495 (2016); Aboody et al, Sci. Transl. Med., 5(184):1-25 (2013).

The term "human leukocyte antigen II" or "human leukocyte antigen II protein" as used herein refers to any of the recombinant or naturally-occurring forms of human leukocyte antigen II (HLA II) also known as MHC class II human leukocyte antigen or human leukocyte antigen class II, or variants or homologs thereof that maintain human leukocyte antigen II activity (e.g., within at least 50%, 80%, 90%, 95%, 96%, 97%, 98%, 99% or 100% activity compared to Human Leukocyte Antigen II). In aspects, the variants or homologs have at least 90%, 95%, 96%, 97%, 98%, 99% or 100% amino acid sequence identity across the whole sequence or a portion of the sequence (e.g., a 50, 100, 150 or 200 continuous amino acid portion) compared to a naturally occurring human leukocyte antigen II. In aspects, the human leukocyte antigen II protein is substantially identical to the protein identified by the NCBI reference number GI: 122206, or a variant or homolog having substantial identity thereto. In aspects, the human leukocyte antigen II protein is substantially identical to the protein identified by the NCBI reference number GI: 451344622, or a variant or homolog having substantial identity thereto. In aspects, the human leukocyte antigen II protein is substantially identical to the protein identified by the NCBI reference number GI: 290457643, or a variant or homolog having substantial identity thereto. In embodiments, the human leukocyte antigen II protein is substantially identical to the protein identified by the NCBI reference number GI: 545422, or a variant or homolog having substantial identity thereto.

The term "allogenic neural stem cells" refers to neural stem cells that are taken from a donor, manipulated (e.g., contacted with an exogenous nucleic acid as described herein), and then administered to a patient who is different from the donor to treat a disease (e.g., cancer, neurodegenerative disease).

The term "autologous neural stem cells" refers to neural stem cells that are taken from a patient, manipulated (e.g., contacted with an exogenous nucleic acid as described herein), and then administered to the same patient to treat a disease (e.g., cancer, neurodegenerative disease).

The term "culture" or "cell culture" means the maintenance of cells, for example neural stem cells, in an artificial, in vitro environment. A "cell culture system" is used herein to refers to culture conditions in which a population of cells (e.g., neural stem cells) may be contacted with exogenous nucleic acids under conditions which allow for the exogenous polypeptide to enter into the neural stem cells, e.g., via endocytosis. "Culture medium" is used herein to refer to a nutrient solution for the culturing, growth, or proliferation of cells.

The term "exogenous" refers to a molecule or substance (e.g., a nucleic acid) that originates from outside a given cell or organism. For example, an "exogenous nucleic acid" as referred to herein is a nucleic acid that does not originate from the cell or organism. The term "endogenous nucleic acid" refers to a nucleic acid that is native to, or originates within, a given cell or organism.

The term "neural stem cell-loading sequence" refers to a nucleic acid that can enter a neural stem cell when placed in contact with the neural stem cell, e.g., in a cell culture system. Without intending to be bound by any theory, the nucleic acid binds to a receptor on the surface of the neural stem cell which then provides passage (e.g., via endocytosis) of the nucleic acid into the cytoplasm of the cell. Exemplary neural stem cell-loading sequences include any nucleic acid that is capable of binding to a neural cell surface receptor, such as Toll-like receptor 3-binding nucleic acid sequence, a Toll-like receptor 9-binding nucleic acid sequence, and the like.

The term "immunostimulatory sequence" refers to a nucleic acid that can directly or indirectly stimulate an immune response in a patient. Exemplary nucleic acids that can directly or indirectly stimulate an immune response in a patient include a STAT-inhibiting nucleic acid sequence (e.g., a STAT3-inhibiting nucleic acid sequence), a Toll like receptor 7/8-activating nucleic acid sequence, a STING receptor-activating nucleic acid sequence, a RIG-1 receptor-activating nucleic acid sequence, and the like.

The term "linking group" refers to any moiety capable of covalently bonding a neural stem-cell loading sequence to an immunostimulatory sequence. Exemplary linking groups include a covalent bond, a nucleic acid sequence, a DNA sequence, substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, or combinations of two or more thereof.

The term "internal C3 unit" or "internal C3 spacer modification" refers to a moiety of the following structure:

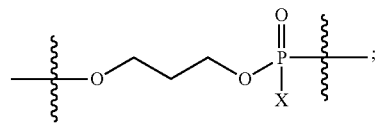

wherein each X is independently —OH or O⁻.

The term "terminal C3 unit" or "terminal C3 spacer modification" refers to a moiety of the following structure:

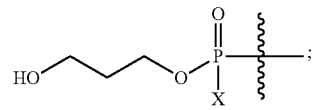

wherein each X is independently —OH or O⁻.

The term "STAT" or "STAT transcription factor" are used interchangeably and refer to a "Signal transducer and activator of transcription" protein and homologs thereof (e.g. STAT1, STAT2, STAT3, STAT4, STAT5A, STAT5B, STAT6, STAT7, STAT8, STAT7/8, STAT9). In aspects, "STAT transcription factor" refers to a human protein. Included in the term "STAT transcription factor" are the wildtype and mutant forms of the protein. In aspects, "STAT transcription factor" refers to the wildtype protein. In aspects, "STAT transcription factor" refers to a mutant protein. "Phosphorylated STAT" refers to a STAT protein that is phosphorylated and activated by the phosphorylation. In aspects, activation of a STAT transcription factor means the STAT is capable of activating transcription.

The term "STAT4" refers to a "Signal transducer and activator of transcription 4" protein and homologs thereof. In aspects, "STAT4" refers to the protein associated with Entrez Gene 6775, OMIM 600558, UniProt Q14765, and/or RefSeq (protein) NP_001230764. In aspects, the reference numbers immediately above refer to the protein, and associated nucleic acids, known as of the date of filing of this application.

The term "STAT5A" refers to a "Signal transducer and activator of transcription 5A" protein and homologs thereof. In aspects, "STAT5A" refers to the protein associated with Entrez Gene 6776, OMIM 601511, UniProt P42229, and/or RefSeq (protein) NP_003143. In aspects, the reference numbers immediately above refer to the protein, and associated nucleic acids, known as of the date of filing of this application.

The term "STAT5B" refers to a "Signal transducer and activator of transcription 5B" protein and homologs thereof. In aspects, "STAT5B" refers to the protein associated with Entrez Gene 6777, OMIM 604260, UniProt P51692, and/or RefSeq (protein) NP_036580. In aspects, the reference numbers immediately above refer to the protein, and associated nucleic acids, known as of the date of filing of this application.

The term "STAT6" refers to a "Signal transducer and activator of transcription 6" protein and homologs thereof. In aspects, "STAT6" refers to the protein associated with Entrez Gene 6778, OMIM 601512, UniProt P42226, and/or RefSeq (protein) NP_001171549. In aspects, the reference numbers immediately above refer to the protein, and associated nucleic acids, known as of the date of filing of this application.

A "STAT3" or "STAT3 protein" refers to any of the recombinant or naturally-occurring forms of the Signal transducer and activator of transcription 3 (STAT3) protein or variants or homologs thereof that maintain STAT3 protein activity (e.g. within at least 50%, 80%, 90%, 95%, 96%, 97%, 98%, 99% or 100% activity compared to STAT3). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring STAT3 polypeptide. In aspects, the STAT3 protein is substantially identical to the protein identified by the NCBI reference number GI: 47458820, or a variant or homolog having substantial identity thereto. In aspects, the STAT3 protein is substantially identical to the protein identified by the NCBI reference number GI: 1610577068, or a variant or homolog having substantial identity thereto. In aspects, the STAT3 protein is substantially identical to the protein identified by the NCBI reference number GI: 1610577050, or a variant or homolog having substantial identity thereto. "Phosphorylated STAT3" refers to a STAT3 protein that is phosphorylated and activated by the phosphorylation. In aspects, a phosphorylated STAT3 is phosphorylated on tyrosine 705 or the residue corresponding to tyrosine 705 in homologs. In aspects, activation of STAT3 means the STAT3 is capable of activating transcription.

The terms "STAT3 gene" or "STAT3 sequence" as used herein refer to the genetically engineered gene or variants thereof that code for an STAT3 polypeptide capable of maintaining the activity of the STAT3 polypeptide (e.g., within at least 50%, 80%, 90%, 95%, 96%, 97%, 98%, 99% or 100% activity compared to the STAT3 polypeptide). In aspects, the variants or homologs have at least 90%, 95%, 96%, 97%, 98%, 99% or 100% nucleic acid sequence identity across the whole sequence or a portion of the sequence (e.g., a 50, 100, 150 or 200 continuous nucleic acid portion) compared to the STAT3 sequence. In aspects, STAT3 is substantially identical to the nucleic acid sequence identified by Accession No. NG_007370 or a variant or homolog having substantial identity thereto.

The term "STAT-inhibiting nucleic acid sequence" refers to a nucleic acid sequence capable of inhibiting STAT (e.g. STAT1, STAT2, STAT3, STAT4, STAT5A, STAT5B, STAT6, STAT7, STAT8, STAT7/8, STAT9). In aspects the STAT-inhibiting nucleic acid sequence is a STAT3-inhibiting nucleic acid sequence. In aspects, a STAT3-inhibiting nucleic acid sequence (e.g. including phosphodiester linkages and/or phosphodiester derivative linkages) comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35.

The term "STING" or "Stimulator of Interferon Genes" refers to any of the recombinant or naturally-occurring forms of the Stimulator of Interferon Genes (STING) protein or variants or homologs thereof that maintain STING protein activity (e.g. within at least 50%, 80%, 90%, 95%, 96%, 97%, 98%, 99% or 100% activity compared to STING). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring STING polypeptide. In aspects, the STING protein is substantially identical to or identical to the protein identified by UniProtKB reference number Q86WV6, or a variant or homolog having substantial identity thereto.

A "STING receptor-activating nucleic acid sequence" refers to a nucleic acid capable of activating a STING (STimulator of INterferon Genes) receptor. Exemplary nucleic acids that are capable of activating a STING receptor include cGAMP (e.g., 3'3'-cGAMP, 2'3'-cGAMP, biphosphorothioate analogs of 2'3'-cGAMP); c-di-CMP (e.g., c-di-GMP; 2'3'-ci-di-GMP); c-di-AMP (e.g., c-di-AMP, 2'3'-c-di-AMP, bisphosphorothioate analogs of 2'3'-ci-di-AMP); c-AIMP (e.g., cAIMP, difluor and/or bisphosphorothioate analogs of cAIMP), an analog of any one of the foregoing, and the like.

The term "RIG-1" or "RIG-1-like" or "Retinoic Acid-Inducible Gene" refers to any of the recombinant or naturally-occurring forms of the Retinoic Acid-Inducible Gene (RIG-1) protein or variants or homologs thereof that maintain RIG-1 protein activity (e.g. within at least 50%, 80%, 90%, 95%, 96%, 97%, 98%, 99% or 100% activity compared to RIG-1). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring RIG-1 polypeptide. In aspects, the RIG-1 protein is substantially identical to or identical to the protein identified by UniProtKB reference number 095786, or a variant or homolog having substantial identity thereto. In aspects, the RIG-1 protein is substantially identical to or identical to the protein identified by NCBI GI #27881482, NCBI GeneID 23586, or NCBI Accession #NP_055129.2, or a variant or homolog having substantial identity to any of the foregoing.

A "RIG-1 receptor-activating nucleic acid sequence" refers to a nucleic acid capable of activating a RIG-1 receptor. Exemplary nucleic acids that are capable of activating a RIG-1 receptor include dsRNA (e.g., 5'triphosphate double stranded RNA (5'ppp-dsRNA), polyinosinic:polycytidylic acid (poly(I:C)), poly(dA:dT), and the like).

The term "Toll-like receptor 7" or "TLR7" refers to any of the recombinant or naturally-occurring forms of the TLR7 protein or variants or homologs thereof that maintain TLR7 protein activity (e.g. within at least 50%, 80%, 90%, 95%, 96%, 97%, 98%, 99% or 100% activity compared to the TLR7 receptor). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring TLR7 receptor polypeptide. In aspects, the TLR7 receptor protein is substantially identical to or identical to the protein identified by UniProtKB reference number Q9NYK1, or a variant or homolog having substantial identity thereto.

The term "Toll-like receptor 8" or "TLR8" refers to any of the recombinant or naturally-occurring forms of the TLR8 protein or variants or homologs thereof that maintain TLR8 protein activity (e.g. within at least 50%, 80%, 90%, 95%, 96%, 97%, 98%, 99% or 100% activity compared to the TLR8 receptor). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring TLR8 receptor polypeptide. In aspects, the TLR8 receptor protein is substantially identical to or identical to the protein identified by UniProtKB reference number Q495P7, or a variant or homolog having substantial identity thereto.

A "Toll like receptor 7/8-activating nucleic acid sequence" refers to a nucleic acid capable of activating Toll-like receptor 7 and/or Toll-like receptor 8. Exemplary nucleic acids capable of activating Toll-like receptor 7 and/or Toll-like receptor 8 include ssRNA (e.g., SSRNA with 6 UUGU repeats available as ORN06/LyoVec™ from InvivoGen; RNA homopolymer available as ssPolyU Naked or ssPolyU/LyoVec™ from InvivoGen; HIV-1 LTR derived ssRNA available as ssRNA40/LyoVec™ from InvivoGen, and the like), thymidine homopolymer ODN (e.g., Poly(dT) available from InvivoGen), guanosine analogs (e.g., loxoribine available from InvivoGen), and the like.

The term "Toll-like receptor 3" or "TLR3" refers to any of the recombinant or naturally-occurring forms of the TLR3 protein or variants or homologs thereof that maintain TLR3 protein activity (e.g. within at least 50%, 80%, 90%, 95%, 96%, 97%, 98%, 99% or 100% activity compared to the TLR3 receptor). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring TLR3 receptor polypeptide. In aspects, the TLR3 receptor protein is substantially identical to or identical to the protein identified by UniProtKB reference number 015455, or a variant or homolog having substantial identity thereto.

A "Toll-like receptor 3-binding nucleic acid sequence" refers to a nucleic acid capable of binding to Toll-like receptor 3. Exemplary nucleic acids include dsRNA (e.g., polyadenylic-polyuridylic acid (Poly(A:U)), polyinosine-polycytidylic acid (Poly(I:C)), and the like.

The term "Toll-like receptor 9" or "TLR9" refers to any of the recombinant or naturally-occurring forms of the TLR9 protein or variants or homologs thereof that maintain TLR9 protein activity (e.g. within at least 50%, 80%, 90%, 95%, 96%, 97%, 98%, 99% or 100% activity compared to the TLR9 receptor). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring TLR9 receptor polypeptide. In aspects, the TLR9 receptor protein is substantially identical to or identical to the protein identified by UniProtKB reference number Q9NR96, or a variant or homolog having substantial identity thereto.

A "toll-like receptor 9-binding nucleic acid sequence" refers to a nucleic acid capable of binding to toll like receptor 9. Exemplary nucleic acids include CpG oligodeoxynucleotides.

The term "CpG oligodeoxynucleotide" or "CpG ODN" refers to a 5' C nucleotide connected to a 3' G nucleotide through a phosphodiester internucleotide linkage or a phosphodiester derivative internucleotide linkage. In aspects, a CpG ODN includes a phosphodiester internucleotide linkage. In aspects, a CpG ODN includes a phosphodiester derivative internucleotide linkage.

The term "Class A CpG ODN" or "A-class CpG ODN" or "D-type CpG ODN" or "Class A CpG DNA sequence" refers to a CpG motif including oligodeoxynucleotide including one or more of poly-G sequence at the 5', 3', or both ends; an internal palindrome sequence including CpG motif; or one or more phosphodiester derivatives linking deoxynucleotides. In aspects, a Class A CpG ODN includes poly-G sequence at the 5', 3', or both ends; an internal palindrome sequence including CpG motif; and one or more phosphodiester derivatives linking deoxynucleotides. In aspects, the phosphodiester derivative is phosphorothioate Examples of Class A CpG ODNs include ODN D19, ODN 1585, ODN 2216, and ODN 2336, the sequences of which are known in the art.

The term "Class B CpG ODN" or "B-class CpG ODN" or "K-type CpG ODN" or "Class B CpG DNA sequence" refers to a CpG motif including oligodeoxynucleotide including one or more of a 6mer motif including a CpG motif; phosphodiester derivatives linking all deoxynucleotides. In aspects, a Class B CpG ODN includes one or more copies of a 6mer motif including a CpG motif and phosphodiester derivatives linking all deoxynucleotides. In aspects, the phosphodiester derivative is phosphorothioate. In aspects, a Class B CpG ODN includes one 6mer motif including a CpG motif. In aspects, a Class B CpG ODN includes two copies of a 6mer motif including a CpG motif. In aspects, a Class B CpG ODN includes three copies of a 6mer motif including a CpG motif. In aspects, a Class B CpG ODN includes four copies of a 6mer motif including a CpG motif. Examples of Class B CpG ODNs include ODN 1668, ODN 1826, ODN 2006, ODN 2007, ODN BW006, and ODN D-SL01, the sequences of which are known in the art.

The term "Class C CpG ODN" or "C-class CpG ODN" or "C-type CpG DNA sequence" refers to an oligodeoxynucleotide including a palindrome sequence including a CpG motif and phosphodiester derivatives (phosphorothioate) linking all deoxynucleotides. Examples of Class C CpG ODNs include ODN 2395, ODN M362, and ODN D-SL03, the sequences of which are known in the art.

As may be used herein, the terms "nucleic acid," "nucleic acid molecule," "nucleic acid oligomer," "oligonucleotide," "nucleic acid sequence," "nucleic acid fragment" and "polynucleotide" are used interchangeably and are intended to include, but are not limited to, a polymeric form of nucleotides covalently linked together that may have various lengths, either deoxyribonucleotides or ribonucleotides, or analogs, derivatives or modifications thereof. Different polynucleotides may have different three-dimensional structures, and may perform various functions, known or unknown. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer. Polynucleotides useful in the methods of the disclosure may comprise natural nucleic acid sequences and variants thereof, artificial nucleic acid sequences, or a combination of such sequences.

An "antisense nucleic acid" as referred to herein is a nucleic acid (e.g., DNA or RNA molecule) that is complementary to at least a portion of a specific target nucleic acid and is capable of reducing transcription of the target nucleic acid (e.g. mRNA from DNA), reducing the translation of the target nucleic acid (e.g. mRNA), altering transcript splicing (e.g. single stranded morpholino oligo), or interfering with the endogenous activity of the target nucleic acid. See, e.g., Weintraub, Scientific American, 262:40 (1990). Typically, synthetic antisense nucleic acids (e.g. oligonucleotides) are generally between 15 and 25 bases in length. Thus, antisense nucleic acids are capable of hybridizing to (e.g. selectively hybridizing to) a target nucleic acid. In aspects, the antisense nucleic acid hybridizes to the target nucleic acid in vitro. In aspects, the antisense nucleic acid hybridizes to the target nucleic acid in a cell. In embodiments, the antisense nucleic acid hybridizes to the target nucleic acid in an organism. In aspects, the antisense nucleic acid hybridizes to the target nucleic acid under physiological conditions. Antisense nucleic acids may comprise naturally occurring nucleotides or modified nucleotides such as, e.g., phosphorothioate, methylphosphonate, and anomeric sugar-phosphate, backbone-modified nucleotides.

In the cell, the antisense nucleic acids hybridize to the corresponding RNA forming a double-stranded molecule. The antisense nucleic acids interfere with the endogenous behavior of the RNA and inhibit its function relative to the absence of the antisense nucleic acid. Furthermore, the double-stranded molecule may be degraded via the RNAi pathway. The use of antisense methods to inhibit the in vitro translation of genes is well known in the art (Marcus-Sakura, Anal. Biochem., 172:289, (1988)). Further, antisense molecules which bind directly to the DNA may be used. Antisense nucleic acids may be single or double stranded nucleic acids. Non-limiting examples of antisense nucleic acids include siRNAs (including their derivatives or precursors, such as nucleotide analogs), short hairpin RNAs (shRNA), micro RNAs (miRNA), saRNAs (small activating RNAs) and small nucleolar RNAs (snoRNA) or certain of their derivatives or pre-cursors.

A polynucleotide is typically composed of a specific sequence of four nucleotide bases: adenine (A); cytosine (C); guanine (G); and thymine (T) (uracil (U) for thymine (T) when the polynucleotide is RNA). Thus, the term "polynucleotide sequence" is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

"Conservatively modified variants" applies to both amino acid and nucleic acid sequences. With respect to particular nucleic acid sequences, "conservatively modified variants" refers to those nucleic acids that encode identical or essentially identical amino acid sequences. Because of the degeneracy of the genetic code, a number of nucleic acid sequences will encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid which encodes a polypeptide is implicit in each described sequence.

"Nucleic acid" refers to nucleotides (e.g., deoxyribonucleotides or ribonucleotides) and polymers thereof in either single-, double- or multiple-stranded form, or complements thereof; or nucleosides (e.g., deoxyribonucleosides or ribonucleosides). In aspects, "nucleic acid" does not include nucleosides. The terms "polynucleotide," "oligonucleotide," "oligo" or the like refer, in the usual and customary sense, to a linear sequence of nucleotides. The term "nucleoside" refers, in the usual and customary sense, to a glycosylamine including a nucleobase and a five-carbon sugar (ribose or deoxyribose). Non limiting examples, of nucleosides include, cytidine, uridine, adenosine, guanosine, thymidine and inosine. The term "nucleotide" refers, in the usual and customary sense, to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA. Examples of nucleic acid, e.g. polynucleotides, contemplated herein include any types of RNA, e.g. mRNA, siRNA, miRNA, and guide RNA and any types of DNA, genomic DNA, plasmid DNA, and minicircle DNA, and any fragments thereof. The term "duplex" in the context of polynucleotides refers, in the usual and customary sense, to double strandedness. Nucleic acids can be linear or branched. For example, nucleic acids can be a linear chain of nucleotides or the nucleic acids can be branched, e.g., such that the nucleic acids comprise one or more arms or branches of nucleotides. Optionally, the branched nucleic acids are repetitively branched to form higher ordered structures such as dendrimers and the like.

Nucleic acids, including e.g., nucleic acids with a phosphothioate backbone, can include one or more reactive moieties. As used herein, the term reactive moiety includes any group capable of reacting with another molecule, e.g., a nucleic acid or polypeptide through covalent, non-covalent or other interactions. By way of example, the nucleic acid can include an amino acid reactive moiety that reacts with an amino acid on a protein or polypeptide through a covalent, non-covalent or other interaction.

The terms also encompass nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, without limitation, phosphodiester derivatives including, e.g., phosphoramidate, phosphorodiamidate, phosphorothioate (also known as phosphothioate having double bonded sulfur replacing oxygen in the phosphate), phosphorodithioate, phosphonocarboxylic acids, phosphonocarboxylates, phosphonoacetic acid, phosphonoformic acid, methyl phosphonate, boron phosphonate, or O-methylphosphoroamidite linkages (see Eckstein, Oligonucleotides and Analogues: A Practical Approach, Oxford University Press) as well as modifications to the nucleotide bases such as in 5-methyl cytidine or pseudouridine; and peptide nucleic acid backbones and linkages. Other analog nucleic acids include those with positive backbones; non-ionic backbones, modified sugars, and non-ribose backbones (e.g. phosphorodiamidate morpholino oligos or locked nucleic acids (LNA) as known in the art), including those described in U.S. Pat. Nos. 5,235,033 and 5,034,506, and Chapters 6 and 7, ASC Symposium Series 580, Carbohydrate Modifications in Antisense Research, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made. In aspects, the internucleotide linkages in DNA are phosphodiester, phosphodiester derivatives, or a combination of both.

Nucleic acids can include nonspecific sequences. As used herein, the term "nonspecific sequence" refers to a nucleic acid sequence that contains a series of residues that are not designed to be complementary to or are only partially complementary to any other nucleic acid sequence. By way of example, a nonspecific nucleic acid sequence is a sequence of nucleic acid residues that does not function as an inhibitory nucleic acid when contacted with a cell or organism.

The term "complement," as used herein, refers to a nucleotide (e.g., RNA or DNA) or a sequence of nucleotides capable of base pairing with a complementary nucleotide or sequence of nucleotides. As described herein and commonly known in the art the complementary (matching) nucleotide of adenosine is thymidine and the complementary (matching) nucleotide of guanosine is cytosine. Thus, a complement may include a sequence of nucleotides that base pair with corresponding complementary nucleotides of a second nucleic acid sequence. The nucleotides of a complement may partially or completely match the nucleotides of the second nucleic acid sequence. Where the nucleotides of the complement completely match each nucleotide of the second nucleic acid sequence, the complement forms base pairs with each nucleotide of the second nucleic acid sequence. Where the nucleotides of the complement partially match the nucleotides of the second nucleic acid sequence only some of the nucleotides of the complement form base pairs with nucleotides of the second nucleic acid sequence. Examples of complementary sequences include coding and a non-coding sequences, wherein the non-coding sequence contains complementary nucleotides to the coding sequence and thus forms the complement of the coding sequence. A further example of complementary sequences are sense and antisense sequences, wherein the sense sequence contains complementary nucleotides to the antisense sequence and thus forms the complement of the antisense sequence.

As described herein the complementarity of sequences may be partial, in which only some of the nucleic acids match according to base pairing, or complete, where all the nucleic acids match according to base pairing. Thus, two sequences that are complementary to each other, may have a specified percentage of nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region).

The term "gene" means the segment of DNA involved in producing a protein; it includes regions preceding and following the coding region (leader and trailer) as well as intervening sequences (introns) between individual coding segments (exons). The leader, the trailer as well as the introns include regulatory elements that are necessary during the transcription and the translation of a gene. Further, a "protein gene product" is a protein expressed from a particular gene.

The word "expression" or "expressed" as used herein in reference to a gene means the transcriptional and/or translational product of that gene. The level of expression of a DNA molecule in a cell may be determined on the basis of either the amount of corresponding mRNA that is present within the cell or the amount of protein encoded by that DNA produced by the cell. The level of expression of non-coding nucleic acid molecules (e.g., siRNA) may be detected by standard PCR or Northern blot methods well known in the art. See, Sambrook et al., 1989 Molecular Cloning: A Laboratory Manual, 18.1-18.88.

The term "recombinant" when used with reference, e.g., to a cell, or nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (non-recombinant) form of the cell or express native genes that are otherwise abnormally expressed, under expressed or not expressed at all. Transgenic cells and plants are those that express a heterologous gene or coding sequence, typically as a result of recombinant methods.

The term "heterologous" when used with reference to portions of a nucleic acid indicates that the nucleic acid including two or more subsequences that are not found in the same relationship to each other in nature. For instance, the nucleic acid is typically recombinantly produced, having two or more sequences from unrelated genes arranged to make a new functional nucleic acid, e.g., a promoter from one source and a coding region from another source. Similarly, a heterologous protein indicates that the protein including two or more subsequences that are not found in the same relationship to each other in nature (e.g., a fusion protein).

The phrase "specifically (or selectively) binds" to an antibody or "specifically (or selectively) immunoreactive with," when referring to a protein or peptide, refers to a binding reaction that is determinative of the presence of the protein, often in a heterogeneous population of proteins and other biologics. Thus, under designated immunoassay conditions, the specified antibodies bind to a particular protein at least two times the background and more typically more than 10 to 100 times background. Specific binding to an antibody under such conditions requires an antibody that is selected for its specificity for a particular protein. For example, polyclonal antibodies can be selected to obtain only a subset of antibodies that are specifically immunoreactive with the selected antigen and not with other proteins. This selection may be achieved by subtracting out antibodies that cross-react with other molecules. A variety of immunoassay formats may be used to select antibodies specifically immunoreactive with a particular protein. For example, solid-phase ELISA immunoassays are routinely used to select antibodies specifically immunoreactive with a protein (see, e.g., Harlow & Lane, Using Antibodies, A Laboratory Manual (1998) for a description of immunoassay formats and conditions that can be used to determine specific immunoreactivity).

A "labeled nucleic acid or oligonucleotide" is one that is bound, either covalently, through a linker or a chemical bond, or noncovalently, through ionic, van der Waals, electrostatic, or hydrogen bonds to a label such that the presence of the nucleic acid may be detected by detecting the presence of the detectable label bound to the nucleic acid. Alternatively, a method using high affinity interactions may achieve the same results where one of a pair of binding partners binds to the other, e.g., biotin, streptavidin. In aspects, the phosphorothioate nucleic acid or phosphorothioate polymer backbone includes a detectable label, as disclosed herein and known in the art.

The terms "isolate" or "isolated", when applied to a nucleic acid, virus, or protein, denotes that the nucleic acid, virus, or protein is essentially free of other cellular components with which it is associated in the natural state. It can be, for example, in a homogeneous state and may be in either a dry or aqueous solution. Purity and homogeneity are typically determined using analytical chemistry techniques such as polyacrylamide gel electrophoresis or high performance liquid chromatography. A protein that is the predominant species present in a preparation is substantially purified.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and 0-phosphoserine. Amino acid analogs refers to compounds that have the same basic chemical structure as a naturally occurring amino acid, i.e., an a carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that functions in a manner similar to a naturally occurring amino acid. The terms "non-naturally occurring amino acid" and "unnatural amino acid" refer to amino acid analogs, synthetic amino acids, and amino acid mimetics which are not found in nature.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

The terms "polypeptide," "peptide" and "protein" are used interchangeably herein to refer to a polymer of amino acid residues, wherein the polymer may be conjugated to a moiety that does not consist of amino acids. The terms apply to amino acid polymers in which one or more amino acid residue is an artificial chemical mimetic of a corresponding naturally occurring amino acid, as well as to naturally occurring amino acid polymers and non-naturally occurring amino acid polymers. A "fusion protein" refers to a chimeric protein encoding two or more separate protein sequences that are recombinantly expressed as a single moiety.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the disclosure.

The following eight groups each contain amino acids that are conservative substitutions for one another: (1) Alanine (A), Glycine (G); (2) Aspartic acid (D), Glutamic acid (E); (3) Asparagine (N), Glutamine (Q); (4) Arginine (R), Lysine (K); (5) Isoleucine (I), Leucine (L), Methionine (M), Valine (V); (6) Phenylalanine (F), Tyrosine (Y), Tryptophan (W); (7) Serine (S), Threonine (T); and (8) Cysteine (C), Methionine (M) (see, e.g., Creighton, *Proteins* (1984)).

"Percentage of sequence identity" is determined by comparing two optimally aligned sequences over a comparison window, wherein the portion of the polynucleotide or polypeptide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The terms "identical" or percent "identity," in the context of two or more nucleic acids or polypeptide sequences, refer to two or more sequences or subsequences that are the same or have a specified percentage of amino acid residues or nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms or by manual alignment and visual inspection (see, e.g., http://www.ncbi.nlm.nih.gov/BLAST/ or the like). Such sequences are then said to be "substantially identical." This definition also refers to, or may be applied to, the compliment of a test sequence. The definition also includes sequences that have deletions and/or additions, as well as those that have substitutions. As described below, the preferred algorithms can account for gaps and the like. Preferably, identity exists over a region that is at least about 25 amino acids or nucleotides in length, or more preferably over a region that is 50-100 amino acids or nucleotides in length.

An amino acid or nucleotide base "position" is denoted by a number that sequentially identifies each amino acid (or nucleotide base) in the reference sequence based on its position relative to the N-terminus (or 5'-end). Due to deletions, insertions, truncations, fusions, and the like that must be taken into account when determining an optimal alignment, in general the amino acid residue number in a test sequence determined by simply counting from the N-terminus will not necessarily be the same as the number of its corresponding position in the reference sequence. For example, in a case where a variant has a deletion relative to an aligned reference sequence, there will be no amino acid in the variant that corresponds to a position in the reference sequence at the site of deletion. Where there is an insertion in an aligned reference sequence, that insertion will not correspond to a numbered amino acid position in the reference sequence. In the case of truncations or fusions there can be stretches of amino acids in either the reference or aligned sequence that do not correspond to any amino acid in the corresponding sequence.

The terms "numbered with reference to" or "corresponding to," when used in the context of the numbering of a given amino acid or polynucleotide sequence, refers to the numbering of the residues of a specified reference sequence when the given amino acid or polynucleotide sequence is compared to the reference sequence.

A "OX40" or "OX40 protein" as referred to herein includes any of the recombinant or naturally-occurring forms of tumor necrosis factor receptor superfamily, member 4 (OX40) also known as cluster of differentiation 134 (CD 134) or variants or homologs thereof that maintain OX40 activity (e.g. within at least 50%, 80%, 90%, 95%, 96%, 97%, 98%, 99% or 100% activity compared to OX40). In aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring OX40 protein. In aspects, the OX40 protein is substantially identical to the protein identified by the NCBI reference number GI: 32698383, or a variant or homolog having substantial identity thereto. In aspects, the OX40 protein is substantially identical to the protein identified by the NCBI reference number GI: 732819, or a variant or homolog having substantial identity thereto. In aspects, the OX40 protein is substantially identical to the protein identified by the NCBI reference number GI: 8926702, or a variant or homolog having substantial identity thereto. In aspects, the OX40 protein is substantially identical to the protein identified by the NCBI reference number GI: 913406, or a variant or homolog having substantial identity thereto.

The term "OX40 inhibitor" as provided herein refers to a substance (e.g., small molecule, peptide, protein, antibody, antibody fragment, single chain variable fragment [scFv]) capable of detectably lowering expression of or activity level of OX40 compared to a control. The inhibited expression or activity of OX40 can be 10%, 20%, 30%, 40%, 50%, 60%, 70%, 80%, 90% or less than that in a control. In aspects, the inhibition is 1.5-fold, 2-fold, 3-fold, 4-fold, 5-fold, 10-fold, or more in comparison to a control. A OX40 inhibitor inhibits OX40 e.g., by at least in part, partially or totally blocking stimulation, decreasing, preventing, or delaying activation, or inactivating, desensitizing, or down-regulating signal transduction, activity or amount of OX40 relative to the absence of the OX40 inhibitor.

As used herein, the term "about" means a range of values including the specified value, which a person of ordinary skill in the art would consider reasonably similar to the specified value. In aspects, about means within a standard deviation using measurements generally acceptable in the art. In aspects, about means a range extending to +/−10% of the specified value. In aspects, about includes the specified value.

A "therapeutic agent" as used herein refers to an agent (e.g., nucleic acid, compound, or pharmaceutical composition described herein) that when administered to a subject will have the intended prophylactic effect, e.g., preventing or delaying the onset (or reoccurrence) of an injury, disease, pathology or condition, or reducing the likelihood of the onset (or reoccurrence) of an injury, disease, pathology, or condition, or their symptoms or the intended therapeutic effect, e.g., treatment or amelioration of an injury, disease, pathology or condition, or their symptoms including any objective or subjective parameter of treatment such as abatement; remission; diminishing of symptoms or making the injury, pathology or condition more tolerable to the patient; slowing in the rate of degeneration or decline; making the final point of degeneration less debilitating; or improving a patient's physical or mental well-being.

"Contacting" is used in accordance with its plain ordinary meaning and refers to the process of allowing at least two distinct species (e.g. chemical compounds including biomolecules or cells) to become sufficiently proximal to react, interact, or physically touch. It should be appreciated; however, the resulting reaction product can be produced directly from a reaction between the added reagents or from an intermediate from one or more of the added reagents that can be produced in the reaction mixture. The term "contacting" may include allowing two species to react, interact, or physically touch, wherein the two species may be a nucleic acid as described herein and a cell, protein, or enzyme.

"Control" or "control experiment" is used in accordance with its plain ordinary meaning and refers to an experiment in which the subjects or reagents of the experiment are treated as in a parallel experiment except for omission of a procedure, reagent, or variable of the experiment. In aspects, the control is used as a standard of comparison in evaluating experimental effects. In aspects, a control is the measurement of the activity of a protein in the absence of a compound as described herein (including embodiments and examples). One of skill in the art will understand which standard controls are most appropriate in a given situation and be able to analyze data based on comparisons to standard control values. Standard controls are also valuable for determining the significance (e.g. statistical significance) of data. For example, if values for a given parameter are widely variant in standard controls, variation in test samples will not be considered as significant.

A "detectable agent" or "detectable moiety" is a compound or composition detectable by appropriate means such as spectroscopic, photochemical, biochemical, immunochemical, chemical, magnetic resonance imaging, or other physical means. A detectable moiety is a monovalent detectable agent or a detectable agent bound (e.g. covalently and directly or via a linking group) with another compound, e.g., a nucleic acid. Exemplary detectable agents/moieties for use in the present disclosure include an antibody ligand, a peptide, a nucleic acid, radioisotopes, paramagnetic metal ions, fluorophore (e.g. fluorescent dyes), electron-dense reagents, enzymes (e.g., as commonly used in an ELISA), biotin, a biotin-avidin complex, a biotin-streptavidin complex, digoxigenin, magnetic beads (e.g., DYNABEADS® by ThermoFisher, encompassing functionalized magnetic beads such as DYNABEADS® M-270 amine by ThermoFisher), paramagnetic molecules, paramagnetic nanoparticles, ultrasmall superparamagnetic iron oxide nanoparticles, ultrasmall superparamagnetic iron oxide nanoparticle aggregates, superparamagnetic iron oxide nanoparticles, superparamagnetic iron oxide nanoparticle aggregates, monocrystalline iron oxide nanoparticles, monocrystalline iron oxide, nanoparticle contrast agents, liposomes or other delivery vehicles containing Gadolinium chelate molecules, gadolinium, radionuclides (e.g. carbon-11, nitrogen-13, oxygen-15, fluorine-18, rubidium-82), fluorodeoxyglucose (e.g. fluorine-18 labeled), any gamma ray emitting radionuclides, positron-emitting radionuclide, radiolabeled glucose, radiolabeled water, radiolabeled ammonia, biocolloids, microbubbles (e.g. including microbubble shells including albumin, galactose, lipid, and/or polymers; microbubble gas core including air, heavy gas(es), perfluorcarbon, nitrogen, octafluoropropane, perflexane lipid microsphere, perflutren, etc.), iodinated contrast agents (e.g. iohexol, iodixanol, ioversol, iopamidol, ioxilan, iopromide, diatrizoate, metrizoate, ioxaglate), barium sulfate, thorium dioxide, gold, gold nanoparticles, gold nanoparticle aggregates, fluorophores, two-photon fluorophores, or haptens and proteins or other entities which can be made detectable, e.g., by incorporating a radiolabel into a peptide or antibody specifically reactive with a target peptide. In aspects, the detectable agent is a detectable fluorescent agent. In aspects, the detectable agent is a detectable phosphorescent agent. In aspects, the detectable agent is a detectable radioactive agent. In aspects, the detectable agent is a detectable metalloenzyme. In aspects, the detectable agent is a detectable colorimetric agent. In aspects, the detectable agent is a detectable luminescent agent. In aspects, the detectable agent is a detectable spectrophotometric agent. In aspects, the detectable agent is a detectable metal-organic framework. In aspects, the detectable agent is detectable by means other than by spectroscopy. In aspects, the detectable agent comprises a fluorophore linked to biotin, avidin, or streptavidin. In aspects, the detectable agent comprises a fluorophore linked to streptavidin. In aspects, the detectable agent comprises a fluorophore linked to avidin. In aspects, the detectable agent comprises a fluorophore linked to avidin linked to biotin. In aspects, the detectable agent comprises a fluorophore linked to streptavidin linked to biotin.

"Fluorophore" refers to compounds that absorb light energy of a specific wavelength and re-emit the light at a lower wavelength. Exemplary fluorophores that may be used herein include xanthenes (e.g., fluorescein, rhodamine, Oregon green, eosin, Texas red); cyanines (e.g., cyanine, indocarbocyanine, oxacarbocyanine, thiacarbocyanine, merocyanine); squaraines (e.g., Seta, Square dyes); squaraine rotaxane (e.g., SeTau® dyes); naphthalenes (e.g., dansyl, prodan); coumarins; oxadiazoles (e.g., pyridyloxazole, nitrobenzoxadiazole, benzooxadiazole); anthracenes (e.g., anthraquinones, DRAQ5®, DRAQ7®, CyTRAK® orange); pyrenes (e.g., cascade blue); oxazines (e.g., Nile red, Nile blue, cresyl violet, oxazine 170); acridines (e.g., proflavin, acridine organge, acridine yellow); arylmethines (e.g., auramine, crystal violet, malachite green); tetrapyrroles (e.g., porphin, phthalocyanine, bilirubin), and the like. In aspects, "fluorophore" is a fluorophore bound to avidin (e.g., Alexa Fluor® Avidin by ThermoFisher; or Rhodamine Avidin, Fluorescein Avidin, Texas Red® Aavidin all by Vector Laboratories). In aspects, "fluorophore" is a fluorophore bound to streptavidin (e.g., Alexa Fluor® Streptavidin by ThermoFisher; or DyLight Streptavidin, Cy3 Streptavidin, Fluorescein Streptavidin, Texas Red® Streptavidin all by Vector Laboratories).

Radioactive substances (e.g., radioisotopes) that may be used as imaging and/or labeling agents in accordance with the embodiments of the disclosure include, but are not limited to, $^{18}F$, $^{32}P$, $^{33}P$, $^{45}Ti$, $^{47}Sc$, $^{52}Fe$, $^{59}Fe$, $^{62}Cu$, $^{64}Cu$, $^{67}Cu$, $^{67}Ga$, $^{68}Ga$, $^{77}As$, $^{86}Y$, $^{90}Y$, $^{89}Sr$, $^{89}Zr$, $^{94}Tc$, $^{94}Tc$, $^{99m}Tc$, $^{99}Mo$, $^{105}Pd$, $^{105}Rb$, $^{111}Ag$, $^{111}In$, $^{123}I$, $^{124}I$, $^{125}I$, $^{131}I$, $^{142}Pr$, $^{143}Pr$, $^{149}Pm$, $^{153}Sm$, $^{154\text{-}1581}Gd$, $^{161}Tb$, $^{166}Dy$, $^{166}Ho$, $^{169}Er$, $^{175}Ln$, $^{177}Lu$, $^{186}Re$, $^{188}Re$, $^{189}Re$, $^{194}Ir$, $^{198}Au$, $^{199}Au$, $^{211}At$, $^{211}Pb$, $^{212}Bi$, $^{212}Pb$, $^{213}Bi$, $^{223}Ra$ and $^{225}Ac$. Paramagnetic ions that may be used as additional imaging agents in accordance with the embodiments of the disclosure include, but are not limited to, ions of transition and lanthanide metals (e.g., metals having atomic numbers of 21-29, 42, 43, 44, or 57-71). These metals include ions of Cr, V, Mn, Fe, Co, Ni, Cu, La, Ce, Pr, Nd, Pm, Sm, Eu, Gd, Tb, Dy, Ho, Er, Tm, Yb and Lu.

Where substituent groups are specified by their conventional chemical formulae, written from left to right, they equally encompass the chemically identical substituents that would result from writing the structure from right to left, e.g., —CH$_2$O— is equivalent to —OCH$_2$—.

The term "alkyl," by itself or as part of another substituent, means, unless otherwise stated, a straight (i.e., unbranched) or branched non-cyclic carbon chain (or carbon), or combination thereof, which may be fully saturated, mono- or polyunsaturated and can include di- and multivalent radicals, having the number of carbon atoms designated (i.e., $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, (cyclohexyl)methyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. An alkoxy is an alkyl attached to the remainder of the molecule via an oxygen linker (—O—).

The term "alkylene," by itself or as part of another substituent, means, unless otherwise stated, a divalent radical derived from an alkyl, as exemplified, but not limited by, —CH$_2$CH$_2$CH$_2$—. Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms. The term "alkenylene," by itself or as part of another substituent, means, unless otherwise stated, a divalent radical derived from an alkene.

The term "heteroalkyl," by itself or in combination with another term, means, unless otherwise stated, a stable non-cyclic straight or branched chain, or combinations thereof, including at least one carbon atom and at least one heteroatom selected from the group consisting of O, N, P, Si, and S, and wherein the nitrogen and sulfur atoms may optionally be oxidized, and the nitrogen heteroatom may optionally be quaternized. The heteroatom(s) O, N, P, S, and Si may be placed at any interior position of the heteroalkyl group or at the position at which the alkyl group is attached to the remainder of the molecule. Examples include, but are not limited to: —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, —CH=CH—N(CH$_3$)—CH$_3$, —O—CH$_3$, —O—CH$_2$—CH$_3$, and —CN. Up to two or three heteroatoms may be consecutive, such as, for example, —CH$_2$—NH—OCH$_3$ and —CH$_2$—O—Si(CH$_3$)$_3$.

The term "heteroalkylene," by itself or as part of another substituent, means, unless otherwise stated, a divalent radical derived from heteroalkyl, as exemplified, but not limited by, —CH$_2$—CH$_2$—S—CH$_2$—CH$_2$—, —O—CH$_2$—CH$_2$—NH—CH$_2$—, —O—(CH$_2$)$_3$—O—PO$_3$—, —O—(CH$_2$)—O—PO$_3$—, —O—(CH$_2$)$_2$—O—PO$_3$—, —O—(CH$_2$)$_4$—O—PO$_3$—, and the like. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—. As described above, heteroalkyl groups, as used herein, include those groups that are attached to the remainder of the molecule through a heteroatom, such as —C(O)R', —C(O)NR', —NR'R", —OR', —SR', and/or —SO$_2$R'. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted as excluding specific heteroalkyl groups, such as —NR'R" or the like.

The terms "cycloalkyl" and "heterocycloalkyl," by themselves or in combination with other terms, mean, unless otherwise stated, cyclic non-aromatic versions of "alkyl" and "heteroalkyl," respectively, wherein the carbons making up the ring or rings do not necessarily need to be bonded to a hydrogen due to all carbon valencies participating in bonds with non-hydrogen atoms. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent, means a divalent radical derived from a cycloalkyl and heterocycloalkyl, respectively.

The terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl. For example, the term "halo($C_1$-$C_4$) alkyl" includes, but is not limited to, fluoromethyl, difluoromethyl, trifluoromethyl, 2,2,2-trifluoroethyl, 4-chlorobutyl, 3-bromopropyl, and the like.

The term "acyl" means, unless otherwise stated, —C(O)R where R is a substituted or unsubstituted alkyl, substituted or unsubstituted cycloalkyl, substituted or unsubstituted heteroalkyl, substituted or unsubstituted heterocycloalkyl, substituted or unsubstituted aryl, or substituted or unsubstituted heteroaryl.

The term "aryl" means, unless otherwise stated, a polyunsaturated, aromatic, hydrocarbon substituent, which can be a single ring or multiple rings (preferably from 1 to 3 rings) that are fused together (i.e., a fused ring aryl) or linked covalently (e.g., biphenyl). A fused ring aryl refers to multiple rings fused together wherein at least one of the fused rings is an aryl ring. The term "heteroaryl" refers to aryl groups (or rings) that contain at least one heteroatom such as N, O, or S, wherein the nitrogen and sulfur atoms are optionally oxidized, and the nitrogen atom(s) are optionally quaternized. Thus, the term "heteroaryl" includes fused ring heteroaryl groups (i.e., multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent, mean a divalent radical derived from an aryl and heteroaryl, respectively. Non-limiting examples of heteroaryl groups include pyridinyl, pyrimidinyl, thiophenyl, thienyl, furanyl, indolyl, benzoxadiazolyl, benzodioxolyl, benzodioxanyl, thianaphthanyl, pyrrolopyridinyl, indazolyl, quinolinyl, quinoxalinyl, pyridopyrazinyl, quinazolinonyl, benzoisoxazolyl, imidazopyridinyl, benzofuranyl, benzothienyl, benzothiophenyl, phenyl, naphthyl, biphenyl, pyrrolyl, pyrazolyl, imidazolyl, pyrazinyl, oxazolyl, isoxazolyl, thiazolyl, furylthienyl, pyridyl, pyrimidyl, benzothiazolyl, purinyl, benzimidazolyl, isoquinolyl, thiadiazolyl, oxadiazolyl, pyrrolyl, diazolyl, triazolyl, tetrazolyl, benzothiadiazolyl, isothiazolyl, pyrazolopyrimidinyl, pyrrolopyrimidinyl, benzotriazolyl, benzoxazolyl, or quinolyl. The examples above may be substituted or unsubstituted and divalent radicals of each heteroaryl example above are non-limiting examples of heteroarylene.

A fused ring heterocyloalkyl-aryl is an aryl fused to a heterocycloalkyl. A fused ring heterocycloalkyl-heteroaryl is a heteroaryl fused to a heterocycloalkyl. A fused ring heterocycloalkyl-cycloalkyl is a heterocycloalkyl fused to a cycloalkyl. A fused ring heterocycloalkyl-heterocycloalkyl is a heterocycloalkyl fused to another heterocycloalkyl. Fused ring heterocycloalkyl-aryl, fused ring heterocycloalkyl-heteroaryl, fused ring heterocycloalkyl-cycloalkyl, or fused ring heterocycloalkyl-heterocycloalkyl may each independently be unsubstituted or substituted with one or more of the substitutents described herein.

The term "oxo" means an oxygen that is double bonded to a carbon atom.

The term "alkylsulfonyl," as used herein, means a moiety having the formula —S($O_2$)—R', where R' is a substituted or unsubstituted alkyl group as defined above. R' may have a specified number of carbons (e.g., "$C_1$-$C_4$ alkylsulfonyl").

Each of the above terms (e.g., "alkyl," "heteroalkyl," "aryl," and "heteroaryl") includes both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR'''', —NR—C(NR'R")=NR''', —S(O)R', —S(O)$_2$R', —S(O)$_2$NR'R", —NRSO$_2$R', —NR'NR"R''', —ONR'R", —NR'C=(O)NR"NR'''R'''', —CN, —NO$_2$, in a number ranging from zero to (2m'+1), where m' is the total number of carbon atoms in such radical. R, R', R", R''', and R'''' each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted heteroaryl, substituted or unsubstituted alkyl, alkoxy, or thioalkoxy groups, or arylalkyl groups. When a compound of the invention includes more than one R group, for example, each of the R groups is independently selected as are each R', R", R''', and R'''' group when more than one of these groups is present. When R' and R" are attached to the same nitrogen atom, they can be combined with the nitrogen atom to form a 4-, 5-, 6-, or 7-membered ring. For example, —NR'R" includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are varied and are selected from, for example: —OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —NR'NR"R'", —ONR'R", —NR'C=(O)NR"NR'"R"", —CN, —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R'", and R"" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. When a compound of the invention includes more than one R group, for example, each of the R groups is independently selected as are each R', R", R'", and R"" groups when more than one of these groups is present.

Two or more substituents may optionally be joined to form aryl, heteroaryl, cycloalkyl, or heterocycloalkyl groups. Such so-called ring-forming substituents are typically, though not necessarily, found attached to a cyclic base structure. In aspects, the ring-forming substituents are attached to adjacent members of the base structure. For example, two ring-forming substituents attached to adjacent members of a cyclic base structure create a fused ring structure. In aspects, the ring-forming substituents are attached to a single member of the base structure. For example, two ring-forming substituents attached to a single member of a cyclic base structure create a spirocyclic structure. In aspects, the ring-forming substituents are attached to non-adjacent members of the base structure.

Two of the substituents on adjacent atoms of the aryl or heteroaryl ring may optionally form a ring of the formula -T-C(O)—(CRR')$_q$—U—, wherein T and U are independently —NR—, —O—, —CRR'—, or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'—, or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X'—(C"R"R'")$_d$—, where s and d are independently integers of from 0 to 3, and X' is —O—, —NR'—, —S—, —S(O)—, —S(O)$_2$—, or —S(O)$_2$NR'—. The substituents R, R', R", and R'" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

As used herein, the terms "heteroatom" or "ring heteroatom" are meant to include, oxygen (O), nitrogen (N), sulfur (S), phosphorus (P), and silicon (Si).

A "substituent group," as used herein, means a group selected from the following moieties: (A) oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, and (B) alkyl, heteroalkyl, cycloalkyl, heterocycloalkyl, aryl, heteroaryl, substituted with at least one substituent selected from: (i) oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, and (ii) alkyl, heteroalkyl, cycloalkyl, heterocycloalkyl, aryl, heteroaryl, substituted with at least one substituent selected from: (a) oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$NH$_2$, —NHNH$_2$, —ONH$_2$, —NHC=(O)NHNH$_2$, —NHC=(O)NH$_2$, —NHSO$_2$H, —NHC=(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl, and (b) alkyl, heteroalkyl, cycloalkyl, heterocycloalkyl, aryl, heteroaryl, substituted with at least one substituent selected from: oxo, halogen, —CF$_3$, —CN, —OH, —NH$_2$, —COOH, —CONH$_2$, —NO$_2$, —SH, —SO$_2$Cl, —SO$_3$H, —SO$_4$H, —SO$_2$N$_{112}$, —NHNH$_2$, —ONH$_2$, —NHC—(O)NHNH$_2$, —NHC=(O)NH$_2$, —NHSO$_2$H, —NHC=(O)H, —NHC(O)—OH, —NHOH, —OCF$_3$, —OCHF$_2$, —NHSO$_2$CH$_3$, —N$_3$, unsubstituted alkyl, unsubstituted heteroalkyl, unsubstituted cycloalkyl, unsubstituted heterocycloalkyl, unsubstituted aryl, unsubstituted heteroaryl.

A "size-limited substituent" or "size-limited substituent group," as used herein, means a group selected from all of the substituents described above for a "substituent group," wherein each substituted or unsubstituted alkyl is a substituted or unsubstituted C$_1$-C$_{20}$ alkyl, each substituted or unsubstituted heteroalkyl is a substituted or unsubstituted 2 to 20 membered heteroalkyl, each substituted or unsubstituted cycloalkyl is a substituted or unsubstituted C$_3$-C$_8$ cycloalkyl, each substituted or unsubstituted heterocycloalkyl is a substituted or unsubstituted 3 to 8 membered heterocycloalkyl, each substituted or unsubstituted aryl is a substituted or unsubstituted C$_6$-C$_{10}$ aryl, and each substituted or unsubstituted heteroaryl is a substituted or unsubstituted 5 to 10 membered heteroaryl.

A "lower substituent" or "lower substituent group," as used herein, means a group selected from all of the substituents described above for a "substituent group," wherein each substituted or unsubstituted alkyl is a substituted or unsubstituted C$_1$-C$_8$ alkyl, each substituted or unsubstituted heteroalkyl is a substituted or unsubstituted 2 to 8 membered heteroalkyl, each substituted or unsubstituted cycloalkyl is a substituted or unsubstituted C$_3$-C$_7$ cycloalkyl, each substituted or unsubstituted heterocycloalkyl is a substituted or unsubstituted 3 to 7 membered heterocycloalkyl, each substituted or unsubstituted aryl is a substituted or unsubstituted C$_6$-C$_{10}$ aryl, and each substituted or unsubstituted heteroaryl is a substituted or unsubstituted 5 to 9 membered heteroaryl.

In aspects, each substituted group described in the compounds herein is substituted with at least one substituent group. More specifically, in aspects, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In aspects, at least one or all of these groups are substituted with at least one size-limited substituent group. In aspects, at least one or all of these groups are substituted with at least one lower substituent group.

In aspects of the compounds herein, each substituted or unsubstituted alkyl may be a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 10 membered heteroaryl. In aspects of the compounds herein, each substituted or unsubstituted alkylene is a substituted or unsubstituted $C_1$-$C_{20}$ alkylene, each substituted or unsubstituted heteroalkylene is a substituted or unsubstituted 2 to 20 membered heteroalkylene, each substituted or unsubstituted cycloalkylene is a substituted or unsubstituted $C_3$-$C_8$ cycloalkylene, each substituted or unsubstituted heterocycloalkylene is a substituted or unsubstituted 3 to 8 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 10 membered heteroarylene.

In aspects, each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 9 membered heteroaryl. In aspects, each substituted or unsubstituted alkylene is a substituted or unsubstituted $C_1$-$C_8$ alkylene, each substituted or unsubstituted heteroalkylene is a substituted or unsubstituted 2 to 8 membered heteroalkylene, each substituted or unsubstituted cycloalkylene is a substituted or unsubstituted $C_3$-$C_7$ cycloalkylene, each substituted or unsubstituted heterocycloalkylene is a substituted or unsubstituted 3 to 7 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 9 membered heteroarylene. In aspects, the compound is a chemical species set forth in the Examples section below.

As defined herein, the term "activation", "activate", "activating", "activator" and the like in reference to a protein-inhibitor interaction means positively affecting (e.g. increasing) the activity or function of the protein relative to the activity or function of the protein in the absence of the activator. In aspects activation means positively affecting (e.g. increasing) the concentration or levels of the protein relative to the concentration or level of the protein in the absence of the activator. The terms may reference activation, or activating, sensitizing, or up-regulating signal transduction or enzymatic activity or the amount of a protein decreased in a disease. Thus, activation may include, at least in part, partially or totally increasing stimulation, increasing or enabling activation, or activating, sensitizing, or up-regulating signal transduction or enzymatic activity or the amount of a protein associated with a disease (e.g., a protein which is decreased in a disease relative to a non-diseased control). Activation may include, at least in part, partially or totally increasing stimulation, increasing or enabling activation, or activating, sensitizing, or up-regulating signal transduction or enzymatic activity or the amount of a protein The terms "agonist," "activator," "upregulator," etc. refer to a substance capable of detectably increasing the expression or activity of a given gene or protein. The agonist can increase expression or activity 10%, 20%, 30%, 40%, 50%, 60%, 70%, 80%, 90% or more in comparison to a control in the absence of the agonist. In certain instances, expression or activity is 1.5-fold, 2-fold, 3-fold, 4-fold, 5-fold, 10-fold or higher than the expression or activity in the absence of the agonist.

As defined herein, the term "inhibition", "inhibit", "inhibiting" and the like in reference to a protein-inhibitor interaction means negatively affecting (e.g. decreasing) the activity or function of the protein relative to the activity or function of the protein in the absence of the inhibitor. In aspects inhibition means negatively affecting (e.g. decreasing) the concentration or levels of the protein relative to the concentration or level of the protein in the absence of the inhibitor. In aspects inhibition refers to reduction of a disease or symptoms of disease. In aspects, inhibition refers to a reduction in the activity of a particular protein target. Thus, inhibition includes, at least in part, partially or totally blocking stimulation, decreasing, preventing, or delaying activation, or inactivating, desensitizing, or down-regulating signal transduction or enzymatic activity or the amount of a protein. In aspects, inhibition refers to a reduction of activity of a target protein resulting from a direct interaction (e.g. an inhibitor binds to the target protein). In aspects, inhibition refers to a reduction of activity of a target protein from an indirect interaction (e.g. an inhibitor binds to a protein that activates the target protein, thereby preventing target protein activation).

The terms "inhibitor," "repressor" or "antagonist" or "downregulator" interchangeably refer to a substance capable of detectably decreasing the expression or activity of a given gene or protein. The antagonist can decrease expression or activity 10%, 20%, 30%, 40%, 50%, 60%, 70%, 80%, 90% or more in comparison to a control in the absence of the antagonist. In certain instances, expression or activity is 1.5-fold, 2-fold, 3-fold, 4-fold, 5-fold, 10-fold or lower than the expression or activity in the absence of the antagonist.

The term "modulator" refers to a composition that increases or decreases the level of a target molecule or the function of a target molecule or the physical state of the target of the molecule relative to the absence of the modulator.

The term "modulate" is used in accordance with its plain ordinary meaning and refers to the act of changing or varying one or more properties. "Modulation" refers to the process of changing or varying one or more properties. For example, as applied to the effects of a modulator on a target protein, to modulate means to change by increasing or decreasing a property or function of the target molecule or the amount of the target molecule.

"Biological sample" or "sample" refer to materials obtained from or derived from a subject or patient. A biological sample includes sections of tissues such as biopsy and autopsy samples, and frozen sections taken for histological purposes. Such samples include bodily fluids such as blood and blood fractions or products (e.g., serum, plasma, platelets, red blood cells, and the like), sputum, tissue, cultured cells (e.g., primary cultures, explants, and transformed cells) stool, urine, synovial fluid, joint tissue, synovial tissue, synoviocytes, fibroblast-like synoviocytes, macrophage-like synoviocytes, immune cells, hematopoietic cells, fibroblasts, macrophages, T cells, etc. A biological sample is typically obtained from a eukaryotic organism, such as a mammal such as a primate e.g., chimpanzee or human; cow; dog; cat; or rodent.

Neural Stem Cells and Vesicles

In embodiments, the disclosure provides a neural stem cell comprising an exogenous nucleic acid, wherein the exogenous nucleic acid comprises a neural stem cell-loading sequence bonded to an immunostimulatory sequence via a linking group. In embodiments, the disclosure provides a neural stem cell comprising vesicles, wherein the vesicles comprise an exogenous nucleic acid, wherein the exogenous nucleic acid comprises a neural stem cell-loading sequence bonded to an immunostimulatory sequence via a linking group. In embodiments, the disclosure provides vesicles comprising an exogenous nucleic acid, wherein the exogenous nucleic acid comprises a neural stem cell-loading sequence bonded to an immunostimulatory sequence via a linking group. In aspects, the neural stem cell is a human leukocyte antigen (HLA) II-negative neural stem cell. In aspects, the neural stem cell is a HB1.F3 neural stem cell. In aspects, the neural stem cell is a HB1.F3.CD21 neural stem cell. In aspects, the neural stem cell is allogeneic. In aspects, the neural stem cell is autologous. In aspects, the neural stem cell is an allogeneic HB1.F3 neural stem cell. In aspects, the neural stem cell is an allogeneic HB1.F3.CD21 neural stem cell.

The exogenous nucleic acid comprises a neural stem cell-loading sequence bonded to an immunostimulatory sequence via a linking group. In aspects, the exogenous nucleic acid is a nuclease-resistant exogenous nucleic acid. In aspects, the exogenous nucleic acid comprises less than 1,500 base pairs. In aspects, the exogenous nucleic acid comprises less than 1,000 base pairs. In aspects, the exogenous nucleic acid comprises from about 10 to about 550 base pairs. In aspects, the exogenous nucleic acid comprises from about 10 to about 500 base pairs. In aspects, the exogenous nucleic acid comprises from about 10 to about 400 base pairs. In aspects, the exogenous nucleic acid comprises from about 10 to about 300 base pairs. In aspects, the exogenous nucleic acid comprises from about 10 to about 200 base pairs. In aspects, the exogenous nucleic acid comprises from about 10 to about 100 base pairs. In aspects, the exogenous nucleic acid comprises from about 10 to about 50 base pairs.

The neural stem cell-loading sequence can be any known in the art. In aspects, the neural stem cell-loading sequence comprises a Toll-like receptor 3-binding nucleic acid sequence, a Toll-like receptor 9-binding nucleic acid sequence, or a combination thereof. In aspects, the neural stem cell-loading sequence comprises a Toll-like receptor 3-binding nucleic acid sequence or a Toll-like receptor 9-binding nucleic acid sequence.

In aspects, the neural stem cell-loading sequence comprises a Toll-like receptor 3-binding nucleic acid sequence. In aspects, the Toll-like receptor 3-binding nucleic acid sequence comprises dsRNA (e.g., polyadenylic-polyuridylic acid (Poly(A:U)), polyinosine-polycytidylic acid (Poly(I:C)), or a combination thereof. In aspects, the Toll-like receptor 3-binding nucleic acid sequence comprises dsRNA. In aspects, the Toll-like receptor 3-binding nucleic acid sequence comprises polyadenylic-polyuridylic acid. In aspects, the Toll-like receptor 3-binding nucleic acid sequence comprises polyinosine-polycytidylic acid.

In aspects, the neural stem cell-loading sequence comprises a Toll-like receptor 9-binding nucleic acid sequence. In aspects, the Toll-like receptor 9-binding nucleic acid sequence comprises a CpG oligodeoxynucleotide (ODN). In aspects, the CpG ODN is a CpG-A ODN, a CpG-B ODN, a CpG-C ODN, or a combination of two or more thereof. In aspects, the CpG ODN is a CpG-A ODN. In aspects, the CpG ODN is a CpG-B ODN. In aspects, the CpG ODN is a CpG-C ODN. In aspects, the CpG ODN is CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, CpG ODN D19, or a combination of two or more thereof. In aspects, the CpG ODN is CpG ODN 1585. In aspects, the CpG ODN is CpG ODN 2216. In aspects, the CpG ODN is CpG ODN 2336. In aspects, the CpG ODN is CpG ODN 1668. In aspects, the CpG ODN is CpG ODN 1826. In aspects, the CpG ODN is CpG ODN 2006. In aspects, the CpG ODN is CpG ODN 2007. In aspects, the CpG ODN is CpG ODN BW006. In aspects, the CpG ODN is CpG ODN D-SL01. In aspects, the CpG ODN is CpG ODN 2395. In aspects, the CpG ODN is CpG ODN CpG ODN M362. In aspects, the CpG ODN is CpG ODN D-SL03. In aspects, the CpG ODN is CpG ODN D19.

The immunostimulatory sequence can be any known in the art. In aspects, the immunostimulatory sequence comprises a STAT-inhibiting nucleic acid sequence, a Toll like receptor 7/8-activating nucleic acid sequence, a STING receptor-activating nucleic acid sequence, a RIG-1 receptor-activating nucleic acid sequence, or a combination of two or more thereof. In aspects, the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence.

In aspects, the immunostimulatory sequence comprises a STAT-inhibiting nucleic acid sequence. In aspects, the immunostimulatory sequence comprises a STAT3-inhibiting nucleic acid sequence, a STAT4-inhibiting nucleic acid sequence, a STAT5A-inhibiting nucleic acid sequence, a STAT5B-inhibiting nucleic acid sequence, a STAT6-inhibiting nucleic acid sequence, or a combination of two or more thereof. In aspects, the immunostimulatory sequence comprises a STAT3-inhibiting nucleic acid sequence, a STAT4-inhibiting nucleic acid sequence, a STAT5A-inhibiting nucleic acid sequence, a STAT5B-inhibiting nucleic acid sequence, or a STAT6-inhibiting nucleic acid sequence. In aspects, the immunostimulatory sequence comprises a STAT4-inhibiting nucleic acid sequence. In aspects, the immunostimulatory sequence comprises a STAT5A-inhibiting nucleic acid sequence. In aspects, the immunostimulatory sequence comprises a STAT5B-inhibiting nucleic acid sequence. In aspects, the immunostimulatory sequence comprises a STAT6-inhibiting nucleic acid sequence.

In aspects, the immunostimulatory sequence comprises a STAT3-inhibiting nucleic acid sequence. In aspects, the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:35, or a combination of two or more thereof. In aspects, the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35. In aspects, the STAT3-inhibiting nucleic acid sequence comprises SEQ ID NO:17. In aspects, the STAT3-inhibiting nucleic acid sequence comprises SEQ ID NO:18. In aspects, the STAT3-inhibiting nucleic acid sequence comprises SEQ ID NO:19. In aspects, the STAT3-inhibiting nucleic acid sequence comprises SEQ ID NO:20. In aspects, the STAT3-inhibiting nucleic acid sequence comprises SEQ ID NO:21. In aspects, the STAT3-inhibiting nucleic acid sequence comprises SEQ ID NO:22. In aspects, the STAT3-inhibiting nucleic acid sequence comprises SEQ ID NO:23. In aspects, the STAT3-inhibiting nucleic acid sequence comprises SEQ ID NO:24. In aspects, the STAT3-inhibiting nucleic acid sequence comprises SEQ ID NO:25. In aspects, the STAT3-inhibiting nucleic acid sequence comprises SEQ ID NO:26. In aspects, the STAT3-inhibiting nucleic acid sequence comprises SEQ ID NO:27. In aspects, the STAT3-inhibiting nucleic acid sequence comprises SEQ ID NO:28. In aspects, the STAT3-inhibiting nucleic acid sequence comprises SEQ ID NO:29. In aspects, the STAT3-inhibiting nucleic acid sequence comprises SEQ ID NO:30. In aspects, the STAT3-inhibiting nucleic acid sequence comprises SEQ ID NO:31. In aspects, the STAT3-inhibiting nucleic acid sequence comprises SEQ ID NO:32. In aspects, the STAT3-inhibiting nucleic acid sequence comprises SEQ ID NO:35.

In aspects, the immunostimulatory sequence comprises a Toll like receptor 7/8-activating nucleic acid sequence. In aspects, the Toll like receptor 7/8-activating nucleic acid sequence comprises ssRNA (e.g., SSRNA with 6 UUGU repeats available as ORN06/LyoVec™ from InvivoGen; RNA homopolymer available as ssPolyU Naked or ssPolyU/LyoVec™ from InvivoGen; HIV-1 LTR derived ssRNA available as ssRNA40/LyoVec™ from InvivoGen, and the like), thymidine homopolymer ODN (e.g., Poly(dT) available from InvivoGen), guanosine analogs (e.g., loxoribine available from InvivoGen), and the like. In aspects, the Toll like receptor 7/8-activating nucleic acid sequence comprises ssRNA. In aspects, the Toll like receptor 7/8-activating nucleic acid sequence comprises thymidine homopolymer ODN. In aspects, the Toll like receptor 7/8-activating nucleic acid sequence comprises loxoribine.

In aspects, the immunostimulatory sequence comprises a STING receptor-activating nucleic acid sequence. In aspects, the STING receptor-activating nucleic acid sequence comprises cGAMP (e.g., 3'3'-cGAMP, 2'3'-cGAMP, biphosphorothioate analogs of 2'3'-cGAMP); c-di-CMP (e.g., c-di-GMP; 2'3'-ci-di-GMP); c-di-AMP (e.g., c-di-AMP, 2'3'-c-di-AMP, bisphosphorothioate analogs of 2'3'-ci-di-AMP); c-AIMP (e.g., cAIMP, difluor and/or bisphosphorothioate analogs of cAIMP), or an analog of any one of the foregoing. In aspects, the STING receptor-activating nucleic acid sequence comprises cGAMP, c-di-CMP, c-di-AMP, or c-AIMP. In aspects, the STING receptor-activating nucleic acid sequence comprises 3'3'-cGAMP, 2'3'-cGAMP, biphosphorothioate analogs of 2'3'-cGAMP, c-di-GMP; 2'3'-ci-di-GMP, c-di-AMP, 2'3'-c-di-AMP, bisphosphorothioate analogs of 2'3'-ci-di-AMP, cAIMP, or difluor and/or bisphosphorothioate analogs of cAIMP. In aspects, the STING receptor-activating nucleic acid sequence comprises 3'3'-cGAMP, 2'3'-cGAMP, c-di-GMP; 2'3'-ci-di-GMP, c-di-AMP, 2'3'-c-di-AMP, or cAIMP.

In aspects, the immunostimulatory sequence comprises a RIG-1 receptor-activating nucleic acid sequence. In aspects, the RIG-1 receptor-activating nucleic acid sequence comprises dsRNA (e.g., 5'triphosphate double stranded RNA (5'ppp-dsRNA), or polyinosinic-polycytidylic acid (poly(I:C)). In aspects, the RIG-1 receptor-activating nucleic acid sequence comprises 5'triphosphate double stranded RNA or polyinosinic:polycytidylic acid (poly(I:C)).

The linking group covalently binding the immunostimulatory sequence to the neural stem cell-loading sequence can be any linking group known in the art. In aspects, the linking group comprises a bond, a nucleic acid sequence, a DNA sequence, substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, or a combination of two or more thereof. In aspects, the linking group comprises a bond, a nucleic acid sequence, unsubstituted alkylene, unsubstituted heteroalkylene, or a combination of two or more thereof. In aspects, the linking group is a covalent bond. In aspects, the linking group is a nucleic acid sequence. In aspects, the linking group is a DNA sequence. In aspects, the linking group comprises a nucleic acid sequence and a substituted or unsubstituted alkylene. In aspects, the linking group comprises a nucleic acid sequence and an unsubstituted alkylene. In aspects, the linking group comprises a nucleic acid sequence and a substituted or unsubstituted heteroalkylene. In aspects, the linking group comprises a nucleic acid sequence and an unsubstituted heteroalkylene. In aspects, the linking group comprises a substituted or unsubstituted heteroalkylene. In aspects, the linking group comprises a substituted heteroalkylene.

In aspects, the linking group comprises a substituted heteroalkylene. In aspects, the linking group comprises a substituted 6 to 60 membered heteroalkylene. In aspects, the linking group comprises a substituted 6 to 54 membered heteroalkylene. In aspects, the linking group comprises a substituted 12 to 48 membered heteroalkylene. In aspects, the linking group comprises a substituted 18 to 42 membered heteroalkylene. In aspects, the linking group comprises a substituted 24 to 36 membered heteroalkylene. In aspects, the linking group comprises a substituted 30 membered heteroalkylene. In aspects, the heteroalkylene comprises an oxygen atom, a phosphorous atom, or a combination thereof. In aspects, the substituents on the substituted heteroalkylene comprise oxo, —OH, —O⁻, or a combination of two or more thereof. In aspects, the linking group comprises a substituted 18 to 42 membered heteroalkylene; wherein the heteroalkylene comprises an oxygen atom, a phosphorous atom, or a combination thereof; and wherein the substituents are independently selected from the group consisting of oxo, —OH, and —O⁻.

In aspects, the linking group comprises any one of the following structures:

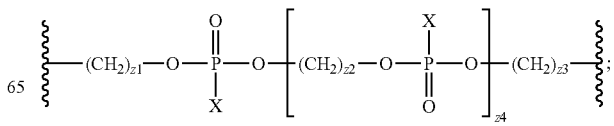

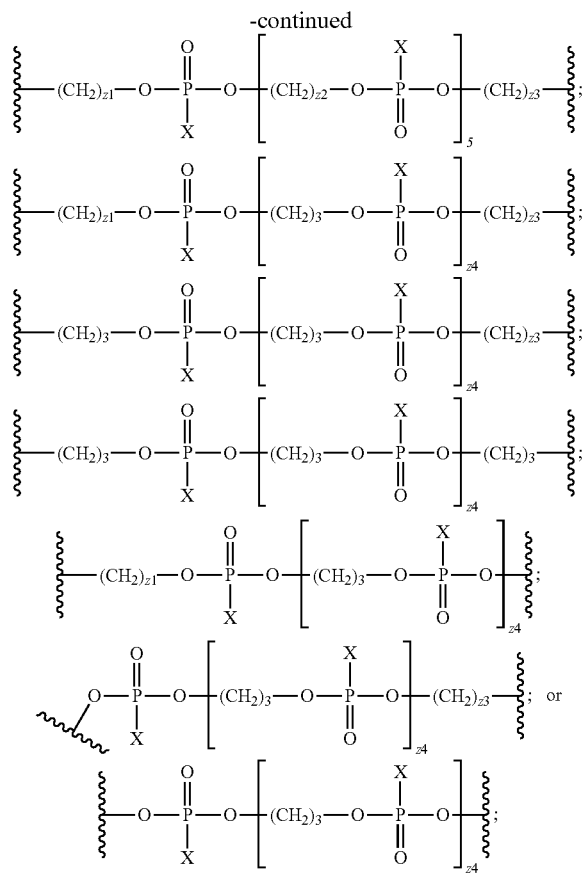

wherein z1, z2, z3 and z4 are independently integers from 0 to 20; and each X is independently —OH or —O⁻. In aspects, z1 is an integer from 0 to 5. In aspects, z1 is an integer from 2 to 4. In aspects, z2 is an integer from 0 to 5. In aspects, z2 is an integer from 2 to 4. In aspects, z3 is an integer from 0 to 5. In aspects, z1 is an integer from 2 to 4. In aspects, z4 is an integer from 3 to 7. In aspects, z4 is an integer from 4 to 6. In aspects, each X is —OH. In aspects, each X is —O⁻.

In aspects, the linking group comprises the structure:

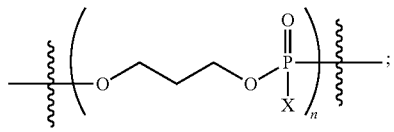

wherein each X is independently —OH or —O⁻, and n is an integer from 1 to 10. In aspects, each X is —OH. In aspects, each X is —O⁻. In aspects, n is an integer from 2 to 8. In aspects, n is an integer from 3 to 7. In aspects, n is an integer from 4 to 6. In aspects, n is 1. In aspects, n is 2. In aspects, n is 3. In aspects, n is 4. In aspects, n is 5. In aspects, n is 6. In aspects, n is 7. In aspects, n is 8. In aspects, n is 9. In aspects, n is 10.

In aspects, the exogenous nucleic acid comprises a terminal C3 spacer modification on the 5'-terminus, the 3'-terminus, or both the 5' and 3'-terminus. In aspects, the exogenous nucleic acid comprises a terminal C3 spacer modification on the 5'-terminus. In aspects, the exogenous nucleic acid comprises a terminal C3 spacer modification on the 3'-terminus. In aspects, the exogenous nucleic acid comprises a terminal C3 spacer modification on both the 5'-terminus and the 3'-terminus.

In embodiments, the exogenous nucleic acid comprises a Toll-like receptor 9-binding nucleic acid sequence covalently bonded to a STAT3-inhibiting nucleic acid sequence via a linking group. In aspects, the Toll-like receptor 9-binding nucleic acid sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, CpG ODN D19, or a combination of two or more thereof; and the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:35, or a combination of two or more thereof. In aspects, the Toll-like receptor 9-binding nucleic acid sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19; and the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35. In aspects, the linking group comprises a substituted heteroalkylene. In aspects, the linking group comprises a substituted 18 to 42 membered heteroalkylene; wherein the heteroalkylene comprises an oxygen atom, a phosphorous atom, or a combination thereof; and wherein the substituents are independently selected from the group consisting of oxo, —OH, and —O⁻. In aspects, the linking group is:

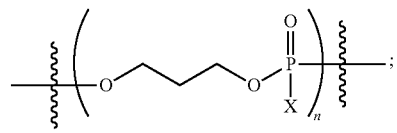

wherein each X is independently —OH or —O⁻, and n is an integer from 1 to 10. In aspects, each X is —OH. In aspects, each X is O⁻. In aspects, each X is independently-OH or —O⁻. In aspects, n is an integer from 2 to wherein n is an integer from 1 to 10. In aspects, n is an integer from 4 to 6. In aspects, n is 5. In aspects, the exogenous nucleic acid comprises a 5' C3 spacer modification, a 3' C3 spacer modification, or a combination thereof. In aspects, the exogenous nucleic acid comprises SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:33, or SEQ ID NO:34. In aspects, the exogenous nucleic acid comprises SEQ ID NO:1. In aspects, the exogenous nucleic acid comprises SEQ ID NO:2. In aspects, the exogenous nucleic acid comprises SEQ ID NO:3. In aspects, the exogenous nucleic acid comprises SEQ ID NO:4. In aspects, the exogenous nucleic acid comprises SEQ ID NO:5. In aspects, the exogenous nucleic acid comprises SEQ ID NO:6. In aspects, the exogenous nucleic acid comprises SEQ ID NO:7. In aspects, the exogenous nucleic acid comprises SEQ ID NO:8. In aspects, the exogenous nucleic acid comprises SEQ ID NO:9. In aspects, the exogenous nucleic acid comprises SEQ ID NO:10. In aspects, the exogenous nucleic acid comprises SEQ ID NO:11. In aspects, the exogenous nucleic acid comprises SEQ ID NO:12. In aspects, the exogenous nucleic acid comprises SEQ ID NO:13. In aspects, the exogenous nucleic acid comprises SEQ ID NO:14. In aspects, the exogenous nucleic acid comprises SEQ ID NO:15. In aspects, the exogenous nucleic acid comprises SEQ ID NO:16. In aspects, the exogenous nucleic acid comprises SEQ ID NO:33. In aspects, the exogenous nucleic acid comprises SEQ ID NO:34.

In embodiments, the exogenous nucleic acid comprises a Toll-like receptor 9-binding nucleic acid sequence covalently bonded to a STAT3-inhibiting nucleic acid sequence via a linking group. In aspects, the Toll-like receptor 9-binding nucleic acid sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, CpG ODN D19, or a combination of two or more thereof; and the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:35, or a combination of two or more thereof. In aspects, the Toll-like receptor 9-binding nucleic acid sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19; and the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35. In aspects, the linking group comprises a substituted heteroalkylene. In aspects, the linking group comprises a substituted 18 to 42 membered heteroalkylene; wherein the heteroalkylene comprises an oxygen atom, a phosphorous atom, or a combination thereof; and wherein the substituents are independently selected from the group consisting of oxo, —OH, and —O⁻.

In aspects, the linking group is selected from the group consisting of one of the following structures:

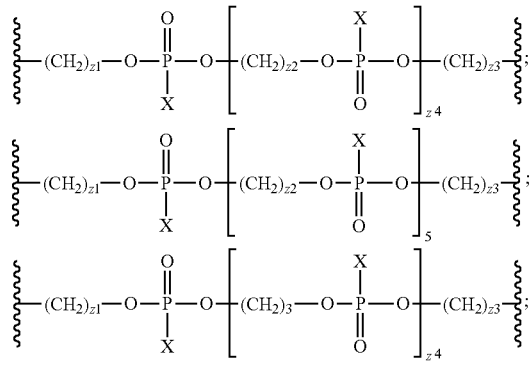

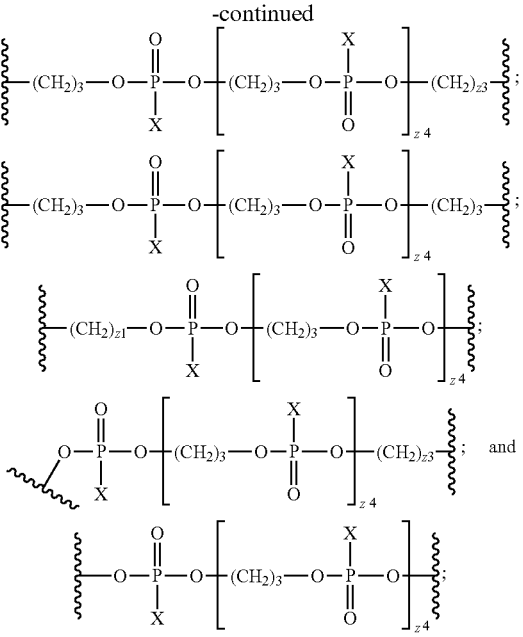

wherein z1, z2, z3 and z4 are independently integers from 0 to 20; and each X is independently —OH or —O⁻. In aspects, z1 is an integer from 0 to 5. In aspects, z1 is an integer from 2 to 4. In aspects, z2 is an integer from 0 to 5. In aspects, z2 is an integer from 2 to 4. In aspects, z3 is an integer from 0 to 5. In aspects, z1 is an integer from 2 to 4. In aspects, z4 is an integer from 3 to 7. In aspects, z4 is an integer from 4 to 6. In aspects, each X is —OH. In aspects, each X is —O⁻. In aspects, the exogenous nucleic acid comprises SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:33, or SEQ ID NO:34. In aspects, the exogenous nucleic acid comprises SEQ ID NO:1. In aspects, the exogenous nucleic acid comprises SEQ ID NO:2. In aspects, the exogenous nucleic acid comprises SEQ ID NO:3. In aspects, the exogenous nucleic acid comprises SEQ ID NO:4. In aspects, the exogenous nucleic acid comprises SEQ ID NO:5. In aspects, the exogenous nucleic acid comprises SEQ ID NO:6. In aspects, the exogenous nucleic acid comprises SEQ ID NO:7. In aspects, the exogenous nucleic acid comprises SEQ ID NO:8. In aspects, the exogenous nucleic acid comprises SEQ ID NO:9. In aspects, the exogenous nucleic acid comprises SEQ ID NO:10. In aspects, the exogenous nucleic acid comprises SEQ ID NO:11. In aspects, the exogenous nucleic acid comprises SEQ ID NO:12. In aspects, the exogenous nucleic acid comprises SEQ ID NO:13. In aspects, the exogenous nucleic acid comprises SEQ ID NO:14. In aspects, the exogenous nucleic acid comprises SEQ ID NO:15. In aspects, the exogenous nucleic acid comprises SEQ ID NO:16. In aspects, the exogenous nucleic acid comprises SEQ ID NO:33. In aspects, the exogenous nucleic acid comprises SEQ ID NO:34.

In embodiments, the exogenous nucleic acid further comprises a detectable moiety. The detectable moiety can be any known in the art and described herein. In aspects, the detectable moiety is an enzyme, biotin, digoxigenin, a paramagnetic molecule, a contrast agent, gadolinium, a radioisotope, radionuclide, fluorodeoxyglucose, barium sulfate, thorium dioxide, gold, a fluorophore, a hapten, a protein, a fluorescent moiety, or a combination of two or more thereof. In aspects, the contrast agent is a magnetic resonance imaging contrast agent, an X-ray contrast agent, or an iodinated contrast agent. In aspects, the detectable agent is a fluorophore (e.g., fluorescein, rhodamine, coumarin, cyanine, or analogs thereof). In aspects, the detectable agent is a chemiluminescent agent. In aspects, the detectable agent is a radionuclide. In aspects, the detectable agent is a radioisotope. In aspects, the detectable agent is a paramagnetic molecule or a paramagnetic nanoparticle.

Pharmaceutical Compositions

In embodiments, the disclosure provides pharmaceutical compositions comprising a pharmaceutically acceptable excipient and an effective amount of the neural stem cells which comprise the exogenous nucleic acids, as described herein, including all embodiments and aspects thereof. In aspects, the disclosure provides pharmaceutical compositions comprising a pharmaceutically acceptable excipient and a therapeutically effective amount of the neural stem cells which comprise the exogenous nucleic acids, as described herein, including all embodiments and aspects thereof.

In embodiments, the disclosure provides pharmaceutical compositions comprising a pharmaceutically acceptable excipient and an effective amount of the neural stem cells which comprise vesicles, wherein the vesicles comprise exogenous nucleic acids, as described herein, including all embodiments and aspects thereof. In aspects, the disclosure provides pharmaceutical compositions comprising a pharmaceutically acceptable excipient and a therapeutically effective amount of the neural stem cells which comprise vesicles, wherein the vesicles comprise exogenous nucleic acids, as described herein, including all embodiments and aspects thereof.

In embodiments, the disclosure provides pharmaceutical compositions comprising a pharmaceutically acceptable excipient and an effective amount of the vesicles which comprise the exogenous nucleic acids, as described herein, including all embodiments and aspects thereof. In aspects, the disclosure provides pharmaceutical compositions comprising a pharmaceutically acceptable excipient and a therapeutically effective amount of the vesicles which comprise the exogenous nucleic acids, as described herein, including all embodiments and aspects thereof.

A "effective amount" is an amount sufficient for a compound to accomplish a stated purpose relative to the absence of the compound (e.g. achieve the effect for which it is administered, treat a disease, reduce enzyme activity, increase enzyme activity, reduce a signaling pathway, or reduce one or more symptoms of a disease or condition). An example of an "effective amount" is an amount sufficient to contribute to the treatment, prevention, or reduction of a symptom or symptoms of a disease, which could also be referred to as a "therapeutically effective amount." A "reduction" of a symptom or symptoms (and grammatical equivalents of this phrase) means decreasing of the severity or frequency of the symptom(s), or elimination of the symptom(s). A "prophylactically effective amount" of a drug is an amount of a drug that, when administered to a subject, will have the intended prophylactic effect, e.g., preventing or delaying the onset (or reoccurrence) of an injury, disease, pathology or condition, or reducing the likelihood of the onset (or reoccurrence) of an injury, disease, pathology, or condition, or their symptoms. The full prophylactic effect does not necessarily occur by administration of one dose, and may occur only after administration of a series of doses. Thus, a prophylactically effective amount may be administered in one or more administrations. An "activity decreasing amount," as used herein, refers to an amount of antagonist required to decrease the activity of an enzyme relative to the absence of the antagonist. A "function disrupting amount," as used herein, refers to the amount of antagonist required to disrupt the function of an enzyme or protein relative to the absence of the antagonist. The exact amounts will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Pickar, Dosage Calculations (1999); and Remington: The Science and Practice of Pharmacy, 20th Edition, 2003, Gennaro, Ed., Lippincott, Williams & Wilkins).

For any compound described herein, the therapeutically effective amount can be initially determined from cell culture assays. Target concentrations will be those concentrations of active compound (e.g., neural stem cells, vesicles) that are capable of achieving the methods described herein, as measured using the methods described herein or known in the art.

As is known in the art, therapeutically effective amounts for use in humans can also be determined from animal models. For example, a dose for humans can be formulated to achieve a concentration that has been found to be effective in animals. The dosage in humans can be adjusted by monitoring the effectiveness of the compositions, neural stem cells, and vesicles described herein, and adjusting the dosage upwards or downwards. Adjusting the dose to achieve maximal efficacy in humans based on the methods described above and other methods is well within the capabilities of the ordinarily skilled artisan.

The term "therapeutically effective amount," as used herein, refers to that amount of the therapeutic agent (e.g., a neural stem cell, vesicle) sufficient to ameliorate the disorder, as described above. For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a control.

Dosages may be varied depending upon the requirements of the patient and the compound (e.g., a neural stem cell including a chimeric poxvirus) being employed. The dose administered to a patient, in the context of the present disclosure, should be sufficient to effect a beneficial therapeutic response in the patient over time. The size of the dose also will be determined by the existence, nature, and extent of any adverse side-effects. Determination of the proper dosage for a particular situation is within the skill of the practitioner. Generally, treatment is initiated with smaller dosages which are less than the optimum dose of the compound. Thereafter, the dosage is increased by small increments until the optimum effect under circumstances is reached. Dosage amounts and intervals can be adjusted individually to provide levels of the administered compound effective for the particular clinical indication being treated. This will provide a therapeutic regimen that is commensurate with the severity of the individual's disease state.

As used herein, the term "administering" means oral administration, administration as a suppository, topical contact, intravenous, parenteral, intraperitoneal, intramuscular, intralesional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intra-tumoral, intravenous, intramuscular, intra-arteriole, intradermal, subcutaneous, intraperitoneal, intraventricular, and intracranial. In aspects, the neural stem cells, vesicles or pharmaceutical compositions described herein are parenterally administered to a patient. In aspects, the neural stem cells, vesicles or pharmaceutical compositions described herein are administered intra-tumorally to a patient. Other modes of delivery include, but are not limited to, the use of liposomal formulations, intravenous infusion, transdermal patches, etc. In aspects, the administering does not include administration of any active agent other than the recited active agent.

"Pharmaceutically acceptable excipient" and "pharmaceutically acceptable carrier" refer to a substance that aids the administration of an active agent to and absorption by a subject and can be included in the compositions of the present disclosure without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylose or starch, fatty acid esters, hydroxymethycellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compounds of the disclosure. One of skill in the art will recognize that other pharmaceutical excipients are useful in the present disclosure.

Methods of Treatment

In embodiments, the disclosure provides methods of treating a neurodegenerative disease in a patient in need thereof by administering to the patient in an effective amount of the neural stem cells comprising the exogenous nucleic acid, as described herein, including all embodiments and aspects thereof. In embodiments, the disclosure provides methods of treating a neurodegenerative disease in a patient in need thereof by administering to the patient in an effective amount of a pharmaceutical composition comprising a pharmaceutically acceptable excipient and neural stem cells comprising the exogenous nucleic acids, as described herein, including all embodiments and aspects thereof. In embodiments, the disclosure provides methods of treating a neurodegenerative disease in a patient in need thereof by administering to the patient in an effective amount of the neural stem cells comprising vesicles, wherein the vesicles comprise exogenous nucleic acid, as described herein, including all embodiments and aspects thereof. In embodiments, the disclosure provides methods of treating a neurodegenerative disease in a patient in need thereof by administering to the patient in an effective amount of a pharmaceutical composition comprising a pharmaceutically acceptable excipient and neural stem cells comprising vesicles, wherein the vesicles comprise exogenous nucleic acids, as described herein, including all embodiments and aspects thereof. In embodiments, the disclosure provides methods of treating a neurodegenerative disease in a patient in need thereof by administering to the patient in an effective amount of vesicles which comprise exogenous nucleic acid, as described herein, including all embodiments and aspects thereof. In embodiments, the disclosure provides methods of treating a neurodegenerative disease in a patient in need thereof by administering to the patient in an effective amount of a pharmaceutical composition comprising a pharmaceutically acceptable excipient and the vesicles which comprise exogenous nucleic acids, as described herein, including all embodiments and aspects thereof. In aspects, the neurodegenerative disease is dementia, Alzheimer's disease, Huntington's disease, Parkinson's disease, amyotrophic lateral sclerosis, or multiple sclerosis. In aspects, the neurodegenerative disease is stroke, traumatic brain injury, or traumatic spinal cord injury.

The term "neurodegenerative disease" refers to a disease, disorder, or condition in which the function of a subject's nervous system becomes impaired. Examples of neurodegenerative diseases that can be treated with the neural stem cells, vesicles, and pharmaceutical compositions described herein include stroke, traumatic brain injury, traumatic spinal cord injury, Alexander's disease, Alper's disease, Alzheimer's disease, amyotrophic lateral sclerosis, ataxia telangiectasia, batten disease (also known as Spielmeyer-Vogt-Sjogren-Batten disease), bovine spongiform encephalopathy (BSE), Canavan disease, chronic fatigue syndrome, cockayne syndrome, corticobasal degeneration, Creutzfeldt-Jakob disease, frontotemporal dementia, Gerstmann-Straussler-Scheinker syndrome, Huntington's disease, HIV-associated dementia, Kennedy's disease, Krabbe's disease, kuru, lewy body dementia, Machado-Joseph disease (spinocerebellar ataxia type 3), multiple sclerosis, multiple system atrophy, myalgic encephalomyelitis, narcolepsy, neuroborreliosis, Parkinson's disease, Pelizaeus-Merzbacher Disease, Pick's disease, primary lateral sclerosis, prion diseases, Refsum's disease, Sandhoffs disease, Schilder's disease, subacute combined degeneration of spinal cord secondary to pernicious anemia, schizophrenia, spinocerebellar ataxia (multiple types with varying characteristics), spinal muscular atrophy, Steele-Richardson-Olszewski disease, progressive supranuclear palsy, or tabes dorsalis.

In embodiments, the disclosure provides methods of treating an inflammatory disease in a patient in need thereof by administering to the patient in an effective amount of the neural stem cells comprising the exogenous nucleic acids, as described herein, including all embodiments and aspects thereof. In embodiments, the disclosure provides methods of treating an inflammatory disease in a patient in need thereof by administering to the patient in an effective amount of a pharmaceutical composition comprising a pharmaceutically acceptable excipient and neural stem cells comprising the exogenous nucleic acids, as described herein, including all embodiments and aspects thereof. In embodiments, the disclosure provides methods of treating an inflammatory disease in a patient in need thereof by administering to the patient in an effective amount of the neural stem cells comprising vesicles, wherein the vesicles comprise exogenous nucleic acid, as described herein, including all embodiments and aspects thereof. In embodiments, the disclosure provides methods of treating an inflammatory disease in a patient in need thereof by administering to the patient in an effective amount of a pharmaceutical composition comprising a pharmaceutically acceptable excipient and neural stem cells comprising vesicles, wherein the vesicles comprise exogenous nucleic acids, as described herein, including all embodiments and aspects thereof. In embodiments, the disclosure provides methods of treating an inflammatory disease in a patient in need thereof by administering to the patient in an effective amount of vesicles which comprise exogenous nucleic acid, as described herein, including all embodiments and aspects thereof. In embodiments, the disclosure provides methods of treating an inflammatory disease in a patient in need thereof by administering to the patient in an effective amount of a pharmaceutical composition comprising a pharmaceutically acceptable excipient and the vesicles which comprise exogenous nucleic acids, as described herein, including all embodiments and aspects thereof.

The term "inflammatory disease" refers to a disease or condition characterized by aberrant inflammation (e.g. an increased level of inflammation compared to a control such as a healthy person not suffering from a disease). Examples of inflammatory diseases include enterocolitis (e.g., necrotizing enterocolitis), autoimmune diseases, arthritis, rheumatoid arthritis, psoriatic arthritis, juvenile idiopathic arthritis, multiple sclerosis, systemic lupus erythematosus, myasthenia gravis, juvenile onset diabetes, diabetes mellitus type 1, Guillain-Barre syndrome, Hashimoto's encephalitis, Hashimoto's thyroiditis, ankylosing spondylitis, psoriasis, Sjogren's syndrome, vasculitis, glomerulonephritis, autoimmune thyroiditis, Behcet's disease, Crohn's disease, ulcerative colitis, bullous pemphigoid, sarcoidosis, ichthyosis, Graves ophthalmopathy, inflammatory bowel disease, Addison's disease, vitiligo, asthma, allergic asthma, acne vulgaris, celiac disease, chronic prostatitis, inflammatory bowel disease, pelvic inflammatory disease, reperfusion injury, ischemia reperfusion injury, stroke, sarcoidosis, transplant rejection, interstitial cystitis, atherosclerosis, scleroderma, and atopic dermatitis.

In embodiments, the disclosure provides methods of treating a viral infection in a patient in need thereof by administering to the patient in an effective amount of the neural stem cells comprising the exogenous nucleic acids, as described herein, including all embodiments and aspects thereof. In embodiments, the disclosure provides methods of treating a viral infection in a patient in need thereof by administering to the patient in an effective amount of a pharmaceutical composition comprising a pharmaceutically acceptable excipient and neural stem cells comprising the exogenous nucleic acids, as described herein, including all embodiments and aspects thereof. In embodiments, the disclosure provides methods of treating a viral infection in a patient in need thereof by administering to the patient in an effective amount of the neural stem cells comprising vesicles, wherein the vesicles comprise exogenous nucleic acids, as described herein, including all embodiments and aspects thereof. In embodiments, the disclosure provides methods of treating a viral infection in a patient in need thereof by administering to the patient in an effective amount of a pharmaceutical composition comprising a pharmaceutically acceptable excipient and neural stem cells comprising vesicles, wherein the vesicles comprise exogenous nucleic acids, as described herein, including all embodiments and aspects thereof. In embodiments, the disclosure provides methods of treating a viral infection in a patient in need thereof by administering to the patient in an effective amount of vesicles comprising the exogenous nucleic acids, as described herein, including all embodiments and aspects thereof. In embodiments, the disclosure provides methods of treating a viral infection in a patient in need thereof by administering to the patient in an effective amount of a pharmaceutical composition comprising a pharmaceutically acceptable excipient and vesicles comprising the exogenous nucleic acids, as described herein, including all embodiments and aspects thereof.

The term "viral infection" or "viral disease" refers to a disease or condition that is caused by a virus. Non-limiting examples of viral infections include hepatic viral diseases (e.g., hepatitis A, B, C, D, E), herpes virus infection (e.g., HSV-1, HSV-2, herpes zoster), flavivirus infection, Zika virus infection, cytomegalovirus infection, a respiratory viral infection (e.g., adenovirus infection, influenza, severe acute respiratory syndrome, coronavirus infection (e.g., SARS-CoV-1, SARS-CoV-2, MERS-CoV, COVID-19, MERS)), a gastrointestinal viral infection (e.g., norovirus infection, rotavirus infection, astrovirus infection), an exanthematous viral infection (e.g., measles, shingles, smallpox, rubella), viral hemorrhagic disease (e.g., Ebola, Lassa fever, dengue fever, yellow fever), a neurologic viral infection (e.g., West Nile viral infection, polio, viral meningitis, viral encephalitis, Japanese encephalitis, rabies), and human papilloma viral infection. In aspects, the viral disease is a Zika virus infection. In aspects, the viral infection is a coronavirus infection. In aspects, the viral infection is SARS-CoV-1. In aspects, the viral infection is SARS-CoV-2. In aspects, the viral infection is MERS-CoV. In aspects, the viral disease is COVID-19. In aspects, the viral disease is MERS (Middle Eastern respiratory syndrome).

In embodiments, the disclosure provides methods of treating cancer in a patient in need thereof by administering to the patient in an effective amount of the neural stem cells comprising the exogenous nucleic acids, as described herein, including all embodiments and aspects thereof. In embodiments, the disclosure provides methods of treating cancer in a patient in need thereof by administering to the patient in an effective amount of a pharmaceutical composition comprising a pharmaceutically acceptable excipient and neural stem cells comprising the exogenous nucleic acids, as described herein, including all embodiments and aspects thereof. In embodiments, the disclosure provides methods of treating cancer in a patient in need thereof by administering to the patient in an effective amount of the neural stem cells comprising vesicles, wherein the vesicles comprise exogenous nucleic acids, as described herein, including all embodiments and aspects thereof. In embodiments, the disclosure provides methods of treating cancer in a patient in need thereof by administering to the patient in an effective amount of a pharmaceutical composition comprising a pharmaceutically acceptable excipient and neural stem cells comprising vesicles, wherein the vesicles comprise exogenous nucleic acids, as described herein, including all embodiments and aspects thereof. In embodiments, the disclosure provides methods of treating cancer in a patient in need thereof by administering to the patient in an effective amount of vesicles comprising the exogenous nucleic acids, as described herein, including all embodiments and aspects thereof. In embodiments, the disclosure provides methods of treating cancer in a patient in need thereof by administering to the patient in an effective amount of a pharmaceutical composition comprising a pharmaceutically acceptable excipient and vesicles comprising the exogenous nucleic acids, as described herein, including all embodiments and aspects thereof. In aspects, the cancer is metastatic cancer. In aspects, the methods further comprise coadministering an effective amount of an anticancer agent to the patient. In aspects, the cancer is metastatic cancer. In aspects, the methods further comprise coadministering an effective amount of an anticancer agent to the patient. In aspects, the cancer is breast cancer. In aspects, the cancer is glioma. In aspects, the glioma is astrocytoma (e.g., astrocytoma, anaplastic astrocytoma, glioblastoma). In aspects, the glioma is ependymoma (e.g., anaplastic ependymoma, myxopapillary ependymoma, subependymoma). In aspects, the glioma is oligodendroglioma (e.g., oligodendroglioma, anaplastic oligodendroglioma, anaplastic oligoastrocytoma). In aspects, the glioma is a brain stem glioma. In aspects, the glioma is a mixed glioma. In aspects, the glioma is an optic pathway glioma. In aspects, the cancer is prostate cancer. In aspects, the cancer is leukemia. In aspects, the cancer is acute myeloid leukemia. In aspects, the cancer is lymphoma. In aspects, the cancer is B cell lymphoma.

The term "cancer" refers to all types of cancer, neoplasm or malignant tumors found in mammals (e.g. humans), including leukemias, lymphomas, carcinomas and sarcomas. Exemplary cancers that may be treated with neural stem cells, vesicles, and pharmaceutical compositions described herein include brain cancer, glioma, glioblastoma, neuroblastoma, prostate cancer, colorectal cancer, pancreatic cancer, medulloblastoma, melanoma, cervical cancer, gastric cancer, ovarian cancer, lung cancer, cancer of the head, Hodgkin's disease, and Non-Hodgkin's lymphomas. Exemplary cancers that may be treated with a compound or method provided herein include cancer of the thyroid, endocrine system, brain, breast, cervix, colon, head & neck, liver, kidney, lung, ovary, pancreas, rectum, stomach, and uterus. Additional examples include, thyroid carcinoma, cholangiocarcinoma, pancreatic adenocarcinoma, skin cutaneous melanoma, colon adenocarcinoma, rectum adenocarcinoma, stomach adenocarcinoma, esophageal carcinoma, head and neck squamous cell carcinoma, breast invasive carcinoma, lung adenocarcinoma, lung squamous cell carcinoma, non-small cell lung carcinoma, mesothelioma, multiple myeloma, neuroblastoma, glioma, glioblastoma, ovarian cancer, rhabdomyosarcoma, primary thrombocytosis, primary macroglobulinemia, primary brain tumors, malignant pancreatic insulanoma, malignant carcinoid, urinary bladder cancer, premalignant skin lesions, testicular cancer, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer.

As used herein, the terms "metastasis," "metastatic," and "metastatic cancer" can be used interchangeably and refer to the spread of a proliferative disease or disorder, e.g., cancer, from one organ or another non-adjacent organ or body part. "Metastatic cancer" is also called "Stage IV cancer." Cancer occurs at an originating site, e.g., breast, which site is referred to as a primary tumor, e.g., primary breast cancer. Some cancer cells in the primary tumor or originating site acquire the ability to penetrate and infiltrate surrounding normal tissue in the local area and/or the ability to penetrate the walls of the lymphatic system or vascular system circulating through the system to other sites and tissues in the body. A second clinically detectable tumor formed from cancer cells of a primary tumor is referred to as a metastatic or secondary tumor. When cancer cells metastasize, the metastatic tumor and its cells are presumed to be similar to those of the original tumor. Thus, if lung cancer metastasizes to the breast, the secondary tumor at the site of the breast consists of abnormal lung cells and not abnormal breast cells. The secondary tumor in the breast is referred to a metastatic lung cancer. Thus, the phrase metastatic cancer refers to a disease in which a subject has or had a primary tumor and has one or more secondary tumors. The phrases non-metastatic cancer or subjects with cancer that is not metastatic refers to diseases in which subjects have a primary tumor but not one or more secondary tumors. For example, metastatic lung cancer refers to a disease in a subject with or with a history of a primary lung tumor and with one or more secondary tumors at a second location or multiple locations, e.g., in the breast.

The terms "treating", or "treatment" refers to any indicia of success in the therapy or amelioration of an injury, disease, pathology or condition, including any objective or subjective parameter such as abatement; remission; diminishing of symptoms or making the injury, pathology or condition more tolerable to the patient; slowing in the rate of degeneration or decline; making the final point of degeneration less debilitating; improving a patient's physical or mental well-being. The treatment or amelioration of symptoms can be based on objective or subjective parameters; including the results of a physical examination, neuropsychiatric exams, and/or a psychiatric evaluation. The term "treating" and conjugations thereof, may include prevention of an injury, pathology, condition, or disease. In aspects, treating is preventing. In aspects, treating does not include preventing.

"Treating" or "treatment" as used herein (and as well-understood in the art) also broadly includes any approach for obtaining beneficial or desired results in a subject's condition, including clinical results. Beneficial or desired clinical results can include, but are not limited to, alleviation or amelioration of one or more symptoms or conditions, diminishment of the extent of a disease, stabilizing (i.e., not worsening) the state of disease, prevention of a disease's transmission or spread, delay or slowing of disease progression, amelioration or palliation of the disease state, diminishment of the reoccurrence of disease, and remission, whether partial or total and whether detectable or undetectable. In other words, "treatment" as used herein includes any cure, amelioration, or prevention of a disease. Treatment may prevent the disease from occurring; inhibit the disease's spread; relieve the disease's symptoms, fully or partially remove the disease's underlying cause, shorten a disease's duration, or do a combination of these things.

"Treating" and "treatment" as used herein include prophylactic treatment. Treatment methods include administering to a subject a therapeutically effective amount of an active agent. The administering step may consist of a single administration or may include a series of administrations. The length of the treatment period depends on a variety of factors, such as the severity of the condition, the age of the patient, the concentration of active agent, the activity of the compositions used in the treatment, or a combination thereof. It will also be appreciated that the effective dosage of an agent used for the treatment or prophylaxis may increase or decrease over the course of a particular treatment or prophylaxis regime. Changes in dosage may result and become apparent by standard diagnostic assays known in the art. In aspects, chronic administration may be required. For example, the compositions are administered to the subject in an amount and for a duration sufficient to treat the patient. In embodiments, the treating or treatment is no prophylactic treatment.

The term "prevent" refers to a decrease in the occurrence of disease symptoms in a patient. As indicated above, the prevention may be complete (no detectable symptoms) or partial, such that fewer symptoms are observed than would likely occur absent treatment.

"Patient" or "subject in need thereof" refers to a living organism suffering from or prone to a disease or condition that can be treated by administration of a pharmaceutical composition as provided herein. Non-limiting examples include humans, other mammals, bovines, rats, mice, dogs, monkeys, goat, sheep, cows, and other non-mammalian animals. In aspects, a patient is human.

Cancer model organism, as used herein, is an organism exhibiting a phenotype indicative of cancer, or the activity of cancer causing elements, within the organism. The term cancer is defined above. A wide variety of organisms may serve as cancer model organisms, and include for example, cancer cells and mammalian organisms such as rodents (e.g. mouse or rat) and primates (such as humans). Cancer cell lines are widely understood by those skilled in the art as cells exhibiting phenotypes or genotypes similar to in vivo cancers. Cancer cell lines as used herein includes cell lines from animals (e.g. mice) and from humans.

"Coadminister" means that a neural stem cell or vesicle or pharmaceutical composition described herein is administered at the same time, just prior to, or just after the administration of one or more additional anti-cancer agents and/or radiation treatment. The compounds provided herein can be administered alone or can be coadministered to the patient. Coadministration is meant to include simultaneous or sequential administration of the compounds individually or in combination (more than one compound). Thus, the preparations can also be combined, when desired, with other active substances (e.g. to reduce metabolic degradation).

"Anti-cancer agent" is used in accordance with its plain ordinary meaning and refers to a composition (e.g. compound, drug, antagonist, inhibitor, modulator) having anti-neoplastic properties or the ability to inhibit the growth or proliferation of cells. Exemplary anti-cancer agents include antibodies, small molecules, large molecules, and combinations thereof. In aspects, an anti-cancer agent is a chemotherapeutic. In aspects, an anti-cancer agent is an agent identified herein having utility in methods of treating cancer. In aspects, an anti-cancer agent is an agent approved by the FDA or similar regulatory agency of a country other than the USA, for treating cancer. Examples of anti-cancer agents include, but are not limited to, MEK (e.g. MEK1, MEK2, or MEK1 and MEK2) inhibitors (e.g. XL518, CI-1040, PD035901, selumetinib/AZD6244, GSK1120212/trametinib, GDC-0973, ARRY-162, ARRY-300, AZD8330, PD0325901, U0126, PD98059, TAK-733, PD318088, AS703026, BAY 869766), alkylating agents (e.g., cyclophosphamide, ifosfamide, chlorambucil, busulfan, melphalan, mechlorethamine, uramustine, thiotepa, nitrosoureas, nitrogen mustards (e.g., mechloroethamine, cyclophosphamide, chlorambucil, meiphalan), ethylenimine and methylmelamines (e.g., hexamethlymelamine, thiotepa), alkyl sulfonates (e.g., busulfan), nitrosoureas (e.g., carmustine, lomusitne, semustine, streptozocin), triazenes (decarbazine)), anti-metabolites (e.g., 5-azathioprine, leucovorin, capecitabine, fludarabine, gemcitabine, pemetrexed, raltitrexed, folic acid analog (e.g., methotrexate), or pyrimidine analogs (e.g., fluorouracil, floxouridine, Cytarabine), purine analogs (e.g., mercaptopurine, thioguanine, pentostatin), etc.), plant alkaloids (e.g., vincristine, vinblastine, vinorelbine, vindesine, podophyllotoxin, paclitaxel, docetaxel, etc.), topoisomerase inhibitors (e.g., irinotecan, topotecan, amsacrine, etoposide (VP16), etoposide phosphate, teniposide, etc.), antitumor antibiotics (e.g., doxorubicin, adriamycin, daunorubicin, epirubicin, actinomycin, bleomycin, mitomycin, mitoxantrone, plicamycin, etc.), platinum-based compounds or platinum containing agents (e.g. cisplatin, oxaloplatin, carboplatin), anthracenedione (e.g., mitoxantrone), substituted urea (e.g., hydroxyurea), methyl hydrazine derivative (e.g., procarbazine), adrenocortical suppressant (e.g., mitotane, aminoglutethimide), epipodophyllotoxins (e.g., etoposide), antibiotics (e.g., daunorubicin, doxorubicin, bleomycin), enzymes (e.g., L-asparaginase), inhibitors of mitogen-activated protein kinase signaling (e.g. U0126, PD98059, PD184352, PD0325901, ARRY-142886, SB239063, SP600125, BAY 43-9006, wortmannin, or LY294002, Syk inhibitors, mTOR inhibitors, antibodies (e.g., rituxan), gossyphol, genasense, polyphenol E, Chlorofusin, all trans-retinoic acid (ATRA), bryostatin, tumor necrosis factor-related apoptosis-inducing ligand (TRAIL), 5-aza-2'-deoxycytidine, all trans retinoic acid, doxorubicin, vincristine, etoposide, gemcitabine, imatinib (Gleevec®), geldanamycin, 17-N-Allylamino-17-Demethoxygeldanamycin (17-AAG), flavopiridol, LY294002, bortezomib, trastuzumab, BAY 11-7082, PKC412, PD184352, 20-epi-1, 25 dihydroxyvitamin D3; 5-ethynyluracil; abiraterone; aclarubicin; acylfulvene; adecypenol; adozelesin; aldesleukin; ALL-TK antagonists; altretamine; ambamustine; amidox; amifostine; aminolevulinic acid; amrubicin; amsacrine; anagrelide; anastrozole; andrographolide; angiogenesis inhibitors; antagonist D; antagonist G; antarelix; anti-dorsalizing morphogenetic protein-1; antiandrogen, prostatic carcinoma; antiestrogen; antineoplaston; antisense oligonucleotides; aphidicolin glycinate; apoptosis gene modulators; apoptosis regulators; apurinic acid; ara-CDP-DL-PTBA; arginine deaminase; asulacrine; atamestane; atrimustine; axinastatin 1; axinastatin 2; axinastatin 3; azasetron; azatoxin; azatyrosine; baccatin III derivatives; balanol; batimastat; BCR/ABL antagonists; benzochlorins; benzoylstaurosporine; beta lactam derivatives; beta-alethine; betaclamycin B; betulinic acid; bFGF inhibitor; bicalutamide; bisantrene; bisaziridinylspermine; bisnafide; bistratene A; bizelesin; breflate; bropirimine; budotitane; buthionine sulfoximine; calcipotriol; calphostin C; camptothecin derivatives; canarypox IL-2; capecitabine; carboxamide-amino-triazole; carboxyamidotriazole; CaRest M3; CARN 700; cartilage derived inhibitor; carzelesin; casein kinase inhibitors (ICOS); castanospermine; cecropin B; cetrorelix; chlorins; chloroquinoxaline sulfonamide; cicaprost; cis-porphyrin; cladribine; clomifene analogues; clotrimazole; collismycin A; collismycin B; combretastatin A4; combretastatin analogue; conagenin; crambescidin 816; crisnatol; cryptophycin 8; cryptophycin A derivatives; curacin A; cyclopentanthraquinones; cycloplatam; cypemycin; cytarabine ocfosfate; cytolytic factor; cytostatin; dacliximab; decitabine; dehydrodidemnin B; deslorelin; dexamethasone; dexifosfamide; dexrazoxane; dexverapamil; diaziquone; didemnin B; didox; diethylnorspermine; dihydro-5-azacytidine; 9-dioxamycin; diphenyl spiromustine; docosanol; dolasetron; doxifluridine; droloxifene; dronabinol; duocarmycin SA; ebselen; ecomustine; edelfosine; edrecolomab; eflornithine; elemene; emitefur; epirubicin; episteride; estramustine analogue; estrogen agonists; estrogen antagonists; etanidazole; etoposide phosphate; exemestane; fadrozole; fazarabine; fenretinide; filgrastim; finasteride; flavopiridol; flezelastine; fluasterone; fludarabine; fluorodaunorunicin hydrochloride; forfenimex; formestane; fostriecin; fotemustine; gadolinium texaphyrin; gallium nitrate; galocitabine; ganirelix; gelatinase inhibitors; gemcitabine; glutathione inhibitors; hepsulfam; heregulin; hexamethylene bisacetamide; hypericin; ibandronic acid; idarubicin; idoxifene; idramantone; ilmofosine; ilomastat; imidazoacridones; imiquimod; immunostimulant peptides; insulin-like growth factor-1 receptor inhibitor; interferon agonists; interferons; interleukins; iobenguane; iododoxorubicin; ipomeanol, 4-; iroplact; irsogladine; isobengazole; isohomohalicondrin B; itasetron; jasplakinolide; kahalalide F; lamellarin-N triacetate; lanreotide; leinamycin; lenograstim; lentinan sulfate; leptolstatin; letrozole; leukemia inhibiting factor; leukocyte alpha interferon; leuprolide+ estrogen+progesterone; leuprorelin; levamisole; liarozole; linear polyamine analogue; lipophilic disaccharide peptide; lipophilic platinum compounds; lissoclinamide 7; lobaplatin; lombricine; lometrexol; lonidamine; losoxantrone; lovastatin; loxoribine; lurtotecan; lutetium texaphyrin; lysofylline; lytic peptides; maitansine; mannostatin A; marimastat; masoprocol; maspin; matrilysin inhibitors; matrix metalloproteinase inhibitors; menogaril; merbarone; meterelin; methioninase; metoclopramide; MIF inhibitor; mifepristone; miltefosine; mirimostim; mismatched double stranded RNA; mitoguazone; mitolactol; mitomycin analogues; mitonafide; mitotoxin fibroblast growth factor-saporin; mitoxantrone; mofarotene; molgramostim; monoclonal antibody, human chorionic gonadotrophin; monophosphoryl lipid A+myobacterium cell wall sk; mopidamol; multiple drug resistance gene inhibitor; multiple tumor suppressor 1-based therapy; mustard anticancer agent; mycaperoxide B; mycobacterial cell wall extract; myriaporone; N-acetyldinaline; N-substituted benzamides; nafarelin; nagrestip; naloxone+pentazocine; napavin; naphterpin; nartograstim; nedaplatin; nemorubicin; neridronic acid; neutral endopeptidase; nilutamide; nisamycin; nitric oxide modulators; nitroxide antioxidant; nitrullyn; O6-benzylguanine; octreotide; okicenone; oligonucleotides; onapristone; ondansetron; ondansetron; oracin; oral cytokine inducer; ormaplatin; osaterone; oxaliplatin; oxaunomycin; palauamine; palmitoylrhizoxin; pamidronic acid; panaxytriol; panomifene; parabactin; pazelliptine; pegaspargase; peldesine; pentosan polysulfate sodium; pentostatin; pentrozole; perflubron; perfosfamide; perillyl alcohol; phenazinomycin; phenylacetate; phosphatase inhibitors; picibanil; pilocarpine hydrochloride; pirarubicin; piritrexim; placetin A; placetin B; plasminogen activator inhibitor; platinum complex; platinum compounds; platinum-triamine complex; porfimer sodium; porfiromycin; prednisone; propyl bis-acridone; prostaglandin J2; proteasome inhibitors; protein A-based immune modulator; protein kinase C inhibitor; protein kinase C inhibitors, microalgal; protein tyrosine phosphatase inhibitors; purine nucleoside phosphorylase inhibitors; purpurins; pyrazoloacridine; pyridoxylated hemoglobin polyoxyethylerie conjugate; raf antagonists; raltitrexed; ramosetron; ras farnesyl protein transferase inhibitors; ras inhibitors; ras-GAP inhibitor; retelliptine demethylated; rhenium Re 186 etidronate; rhizoxin; ribozymes; RII retinamide; rogletimide; rohitukine; romurtide; roquinimex; rubiginone B 1; ruboxyl; safingol; saintopin; SarCNU; sarcophytol A; sargramostim; Sdi 1 mimetics; semustine; senescence derived inhibitor 1; sense oligonucleotides; signal transduction inhibitors; signal transduction modulators; single chain antigen-binding protein; sizofuran; sobuzoxane; sodium borocaptate; sodium phenylacetate; solverol; somatomedin binding protein; sonermin; sparfosic acid; spicamycin D; spiromustine; splenopentin; spongistatin 1; squalamine; stem cell inhibitor; stemcell division inhibitors; stipiamide; stromelysin inhibitors; sulfinosine; superactive vasoactive intestinal peptide antagonist; suradista; suramin; swainsonine; synthetic glycosaminoglycans; tallimustine; tamoxifen methiodide; tauromustine; tazarotene; tecogalan sodium; tegafur; tellurapyrylium; telomerase inhibitors; temoporfin; temozolomide; teniposide; tetrachlorodecaoxide; tetrazomine; thaliblastine; thiocoraline; thrombopoietin; thrombopoietin mimetic; thymalfasin; thymopoietin receptor agonist; thymotrinan; thyroid stimulating hormone; tin ethyl etiopurpurin; tirapazamine; titanocene bichloride; topsentin; toremifene; totipotent stem cell factor; translation inhibitors; tretinoin; triacetyluridine; triciribine; trimetrexate; triptorelin; tropisetron; turosteride; tyrosine kinase inhibitors; tyrphostins; UBC inhibitors; ubenimex; urogenital sinus-derived growth inhibitory factor; urokinase receptor antagonists; vapreotide; variolin B; vector system, erythrocyte gene therapy; velaresol; veramine; verdins; verteporfin; vinorelbine; vinxaltine; vitaxin; vorozole; zanoterone; zeniplatin; zilascorb; zinostatin stimalamer, Adriamycin, Dactinomycin, Bleomycin, Vinblastine, Cisplatin, acivicin; aclarubicin; acodazole hydrochloride; acronine; adozelesin; aldesleukin; altretamine; ambomycin; ametantrone acetate; aminoglutethimide; amsacrine; anastrozole; anthramycin; asparaginase; asperlin; azacitidine; azetepa; azotomycin; batimastat; benzodepa; bicalutamide; bisantrene hydrochloride; bisnafide dimesylate; bizelesin; bleomycin sulfate; brequinar sodium; bropirimine; busulfan; cactinomycin; calusterone; caracemide; carbetimer; carboplatin; carmustine; carubicin hydrochloride; carzelesin; cedefingol; chlorambucil; cirolemycin; cladribine; crisnatol mesylate; cyclophosphamide; cytarabine; dacarbazine; daunorubicin hydrochloride; decitabine; dexormaplatin; dezaguanine; dezaguanine mesylate; diaziquone; doxorubicin; doxorubicin hydrochloride; droloxifene; droloxifene citrate; dromostanolone propionate; duazomycin; edatrexate; eflornithine hydrochloride; elsamitrucin; enloplatin; enpromate; epipropidine; epirubicin hydrochloride; erbulozole; esorubicin hydrochloride; estramustine; estramustine phosphate sodium; etanidazole; etoposide; etoposide phosphate; etoprine; fadrozole hydrochloride; fazarabine; fenretinide; floxuridine; fludarabine phosphate; fluorouracil; fluorocitabine; fosquidone; fostriecin sodium; gemcitabine; gemcitabine hydrochloride; hydroxyurea; idarubicin hydrochloride; ifosfamide; iimofosine; interleukin (including recombinant interleukin II, or $rIL_2$), interferon alfa-2a; interferon alfa-2b; interferon alfa-n1; interferon alfa-n3; interferon beta-1a; interferon gamma-1b; iproplatin; irinotecan hydrochloride; lanreotide acetate; letrozole; leuprolide acetate; liarozole hydrochloride; lometrexol sodium; lomustine; losoxantrone hydrochloride; masoprocol; maytansine; mechlorethamine hydrochloride; megestrol acetate; melengestrol acetate; melphalan; menogaril; mercaptopurine; methotrexate; methotrexate sodium; metoprine; meturedepa; mitindomide; mitocarcin; mitocromin; mitogillin; mitomalcin; mitomycin; mitosper; mitotane; mitoxantrone hydrochloride; mycophenolic acid; nocodazole; nogalamycin; ormaplatin; oxisuran; pegaspargase; peliomycin; pentamustine; peplomycin sulfate; perfosfamide; pipobroman; piposulfan; piroxantrone hydrochloride; plicamycin; plomestane; porfimer sodium; porfiromycin; prednimustine; procarbazine hydrochloride; puromycin; puromycin hydrochloride; pyrazofurin; riboprine; rogletimide; safingol; safingol hydrochloride; semustine; simtrazene; sparfosate sodium; sparsomycin; spirogermanium hydrochloride; spiromustine; spiroplatin; streptonigrin; streptozocin; sulofenur; talisomycin; tecogalan sodium; tegafur; teloxantrone hydrochloride; temoporfin; teniposide; teroxirone; testolactone; thiamiprine; thioguanine; thiotepa; tiazofurin; tirapazamine; toremifene citrate; trestolone acetate; triciribine phosphate; trimetrexate; trimetrexate glucuronate; triptorelin; tubulozole hydrochloride; uracil mustard; uredepa; vapreotide; verteporfin; vinblastine sulfate; vincristine sulfate; vindesine; vindesine sulfate; vinepidine sulfate; vinglycinate sulfate; vinleurosine sulfate; vinorelbine tartrate; vinrosidine sulfate; vinzolidine sulfate; vorozole; zeniplatin; zinostatin; zorubicin hydrochloride, agents that arrest cells in the G2-M phases and/or modulate the formation or stability of microtubules, (e.g. Taxol™ (i.e. paclitaxel), Taxotere™, compounds comprising the taxane skeleton, Erbulozole (i.e.

R-55104), Dolastatin 10 (i.e. DLS-10 and NSC-376128), mivobulin isethionate (i.e. as CI-980), vincristine, NSC-639829, Discodermolide (i.e. as NVP-XX-A-296), ABT-751 (Abbott, i.e. E-7010), Altorhyrtins (e.g. Altorhyrtin A and Altorhyrtin C), Spongistatins (e.g. Spongistatin 1, Spongistatin 2, Spongistatin 3, Spongistatin 4, Spongistatin 5, Spongistatin 6, Spongistatin 7, Spongistatin 8, and Spongistatin 9), Cemadotin hydrochloride (i.e. LU-103793 and NSC-D-669356), Epothilones (e.g. Epothilone A, Epothilone B, Epothilone C (i.e. desoxyepothilone A or dEpoA), Epothilone D (i.e. KOS-862, dEpoB, and desoxyepothilone B), Epothilone E, Epothilone F, Epothilone B N-oxide, Epothilone A N-oxide, 16-aza-epothilone B, 21-aminoepothilone B (i.e. BMS-310705), 21-hydroxyepothilone D (i.e. Desoxyepothilone F and dEpoF), 26-fluoroepothilone, Auristatin PE (i.e. NSC-654663), Soblidotin (i.e. TZT-1027), Vincristine sulfate, Cryptophycin 52 (i.e. LY-355703), Vitilevuamide, Tubulysin A, Canadensol, Centaureidin (i.e. NSC-106969), Oncocidin A1 (i.e. BTO-956 and DIME), Fijianolide B, Laulimalide, Narcosine (also known as NSC-5366), Nascapine, Hemiasterlin, Vanadocene acetylacetonate, Monsatrol, lnanocine (i.e. NSC-698666), Eleutherobins (such as Desmethyleleutherobin, Desaetyleleutherobin, Isoeleutherobin A, and Z-Eleutherobin), Caribaeoside, Caribaeolin, Halichondrin B, Diazonamide A, Taccalonolide A, Diozostatin, (−)-Phenylahistin (i.e. NSCL-96F037), Myoseverin B, Resverastatin phosphate sodium, steroids (e.g., dexamethasone), finasteride, aromatase inhibitors, gonadotropin-releasing hormone agonists (GnRH) such as goserelin or leuprolide, adrenocorticosteroids (e.g., prednisone), progestins (e.g., hydroxyprogesterone caproate, megestrol acetate, medroxyprogesterone acetate), estrogens (e.g., diethylstilbestrol, ethinyl estradiol), antiestrogen (e.g., tamoxifen), androgens (e.g., testosterone propionate, fluoxymesterone), antiandrogen (e.g., flutamide), immunostimulants (e.g., Bacillus Calmette-Guérin (BCG), levamisole, interleukin-2, alpha-interferon, etc.), monoclonal antibodies (e.g., anti-CD20, anti-HER2, anti-CD52, anti-HLA-DR, and anti-VEGF monoclonal antibodies), immunotoxins (e.g., anti-CD33 monoclonal antibody-calicheamicin conjugate, anti-CD22 monoclonal antibody-pseudomonas exotoxin conjugate, etc.), radioimmunotherapy (e.g., anti-CD20 monoclonal antibody conjugated to $^{111}$In, $^{90}$Y or $^{131}$I, etc.), triptolide, homoharringtonine, dactinomycin, doxorubicin, epirubicin, topotecan, itraconazole, vindesine, cerivastatin, vincristine, deoxyadenosine, sertraline, pitavastatin, irinotecan, clofazimine, 5-nonyloxytryptamine, vemurafenib, dabrafenib, erlotinib, gefitinib, EGFR inhibitors, epidermal growth factor receptor (EGFR)-targeted therapy or therapeutic (e.g. gefitinib (Iressa™), erlotinib (Tarceva™), cetuximab (Erbitux™), lapatinib (Tykerb™), panitumumab (Vectibix™), vandetanib (Caprelsa™) afatinib/BIBW2992, CI-1033/canertinib, neratinib/HKI-272, CP-724714, TAK-285, AST-1306, ARRY334543, ARRY-380, AG-1478, dacomitinib/PF299804, OSI-420/desmethyl erlotinib, AZD8931, AEE788, pelitinib/EKB-569, CUDC-101, WZ8040, WZ4002, WZ3146, AG-490, XL647, PD153035, BMS-599626), sorafenib, imatinib, sunitinib, dasatinib, hormonal therapies, or the like.

EMBODIMENTS

Embodiment 1. A neural stem cell comprising an exogenous nucleic acid, wherein the exogenous nucleic acid comprises a neural stem cell-loading sequence bonded to an immunostimulatory sequence via a linking group.

Embodiment 2. The neural stem cell of Embodiment 1, wherein the neural stem cell is a human leukocyte antigen II-negative neural stem cell.

Embodiment 3. The neural stem cell of Embodiment 1, wherein the neural stem cell is a HB1.F3.CD21 neural stem cell.

Embodiment 4. The neural stem cell of any one of Embodiments 1 to 3, wherein the neural stem cell is allogeneic.

Embodiment 5. The neural stem cell of any one of Embodiments 1 to 3, wherein the neural stem cell is autologous.

Embodiment 6. The neural stem cell of any one of Embodiments 1 to 5, wherein the exogenous nucleic acid comprises less than 1,500 base pairs.

Embodiment 7. The neural stem cell of Embodiment 6, wherein the exogenous nucleic acid comprises from about 5 base pairs to about 1,000 base pairs.

Embodiment 8. The neural stem cell of Embodiment 7, wherein the exogenous nucleic acid comprises from about 10 base pairs to about 500 base pairs.

Embodiment 9. The neural stem cell of any one of Embodiments 1 to 8, wherein the neural stem cell-loading sequence comprises a Toll-like receptor 3-binding nucleic acid sequence, a Toll-like receptor 9-binding nucleic acid sequence, or a combination thereof.

Embodiment 10. The neural stem cell of Embodiment 9, wherein the neural stem cell-loading sequence comprises a Toll-like receptor 9-binding nucleic acid sequence.

Embodiment 11. The neural stem cell of Embodiment 10, wherein the Toll-like receptor 9-binding nucleic acid sequence comprises a CpG oligodeoxynucleotide (ODN).

Embodiment 12. The neural stem cell of Embodiment 11, wherein the CpG ODN is a CpG-A ODN, a CpG-B ODN, a CpG-C ODN, or a combination of two or more thereof.

Embodiment 13. The neural stem cell of Embodiment 11, wherein the CpG ODN is CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, CpG ODN D19, or a combination of two or more thereof.

Embodiment 14. The neural stem cell of Embodiment 9, wherein the neural stem cell-loading sequence comprises a Toll-like receptor 3-binding nucleic acid sequence.

Embodiment 15. The neural stem cell of Embodiment 14, wherein the Toll-like receptor 3-binding nucleic acid sequence comprises dsRNA, polyinosine-polycytidylic acid, or a combination thereof.

Embodiment 16. The neural stem cell of any one of Embodiments 1 to 15, wherein the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence.

Embodiment 17. The neural stem cell of any one of Embodiments 1 to 15, wherein the immunostimulatory sequence comprises a STAT3-inhibiting nucleic acid sequence, a STAT4-inhibiting nucleic acid sequence, a STAT5A-inhibiting nucleic acid sequence, a STAT5B-inhibiting nucleic acid sequence, a STAT6-inhibiting nucleic acid sequence, or a combination of two or more thereof.

Embodiment 18. The neural stem cell of Embodiment 17, wherein the immunostimulatory sequence comprises a STAT3-inhibiting nucleic acid sequence.

Embodiment 19. The neural stem cell of Embodiment 18, wherein the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:35, or a combination of two or more thereof.

Embodiment 20. The neural stem cell of Embodiment 16, wherein the Toll like receptor 7/8-activating nucleic acid sequence comprises ssRNA, thymidine homopolymer oligodeoxynucleotide, guanosine, or an analog of any of the foregoing.

Embodiment 21. The neural stem cell of Embodiment 16, wherein the STING receptor-activating nucleic acid sequence comprises a cGAMP, a c-di-CMP, a c-di-AMP, a c-AIMP, or an analog of any of the foregoing.

Embodiment 22. The neural stem cell of Embodiment 16, wherein the RIG-1 receptor-activating nucleic acid sequence comprises dsRNA, polyinosinic:polycytidylic acid, or an analog of any of the foregoing.

Embodiment 23. The neural stem cell of any one of Embodiments 1 to 8, wherein the exogenous nucleic acid comprises a Toll-like receptor 9-binding nucleic acid sequence covalently bonded to a STAT3-inhibiting nucleic acid sequence via a linking group.

Embodiment 24. The neural stem cell of Embodiment 23, wherein the Toll-like receptor 9-binding nucleic acid sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19; and wherein the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35.

Embodiment 25. The neural stem cell of any one of Embodiments 1 to 24, wherein the linking group comprises a bond, a nucleic acid sequence, a DNA sequence, substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, or a combination of two or more thereof.

Embodiment 26. The neural stem cell of Embodiment 25, wherein the linking group comprises a bond, a nucleic acid sequence, substituted or unsubstituted alkylene, or substituted or unsubstituted heteroalkylene.

Embodiment 27. The neural stem cell of Embodiment 26, wherein the linking group comprises a substituted 6 to 60 membered heteroalkylene.

Embodiment 28. The neural stem cell of Embodiment 27, wherein the linking group comprises a substituted 18 to 42 membered heteroalkylene; wherein the heteroalkylene comprises an oxygen atom, a phosphorous atom, or a combination thereof; and wherein the substituents are independently selected from the group consisting of =O, —OH, and —O⁻.

Embodiment 29. The neural stem cell of Embodiment 26, wherein the linking group comprises a substituted heteroalkylene of the formula:

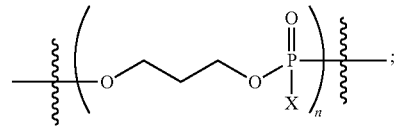

wherein each X is independently —OH or —O⁻, and n is an integer from 1 to 10.

Embodiment 30. The neural stem cell of Embodiment 25, wherein n is 5.

Embodiment 31. The neural stem cell of any one of Embodiments 1 to 8, wherein the exogenous nucleic acid comprises SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:33, or SEQ ID NO:35.

Embodiment 32. The neural stem cell of any one of Embodiments 1 to 31, wherein the exogenous nucleic acid further comprises a detectable moiety.

Embodiment 33. The neural stem cell of Embodiment 32, wherein the detectable moiety is an enzyme, biotin, digoxigenin, a paramagnetic molecule, a contrast agent, gadolinium, a radioisotope, radionuclide, fluorodeoxyglucose, barium sulfate, thorium dioxide, gold, a fluorophore, a hapten, a protein, a fluorescent moiety, or a combination of two or more thereof.

Embodiment 34. The neural stem cell of any one of Embodiments 1 to 33, wherein the neural stem cell comprises a vesicle, and wherein the exogenous nucleic acid is encapsulated within the vesicle.

Embodiment 35. A pharmaceutical composition comprising the neural stem cell of any one of Embodiments 1 to 34 and a pharmaceutically acceptable excipient.

Embodiment 36. A method of treating cancer in a patient in need thereof, the method comprising administering to the patient an effective amount of the neural stem cell of any one of Embodiments 1 to 34, or the pharmaceutical composition of Embodiment 35.

Embodiment 37. The method of Embodiment 36, wherein the cancer is breast cancer, prostate cancer, leukemia, or lymphoma.

Embodiment 38. The method of Embodiment 36, wherein the cancer is breast cancer, prostate cancer, acute myeloid leukemia, or B cell lymphoma.

Embodiment 39. The method of Embodiment 36, wherein the cancer is glioma.

Embodiment 40. The method of Embodiment 39, wherein the glioma is astrocytoma, ependymoma, oligodendroglioma, mixed glioma, or optic pathway glioma.

Embodiment 41. The method of Embodiment 39, wherein the glioma is astrocytoma, anaplastic astrocytoma, glioblastoma, anaplastic ependymoma, myxopapillary ependymoma, subependymoma, oligodendroglioma, anaplastic oligodendroglioma, anaplastic oligoastrocytoma, Embodiment 42. A method of treating neurodegenerative disease in a patient in need thereof, the method comprising administering to the patient an effective amount of the neural stem cell of any one of Embodiments 1 to 34, or the pharmaceutical composition of Embodiment 35.

Embodiment 43. The method of Embodiment 42, wherein the neurodegenerative disease is dementia, Alzheimer's disease, Huntington's disease, Parkinson's disease, amyotrophic lateral sclerosis, or multiple sclerosis.

Embodiment 44. The method of Embodiment 42, wherein the neurodegenerative disease is stroke, traumatic brain injury, or traumatic spinal cord injury.

Embodiment 45. A method of treating an inflammatory disease in a patient in need thereof, the method comprising administering to the patient an effective amount of the neural stem cell of any one of Embodiments 1 to 34, or the pharmaceutical composition of Embodiment 35.

Embodiment 46. The method of Embodiment 45, wherein the inflammatory disease is enterocolitis.

Embodiment 47. The method of any one of Embodiments 36 to 46, further comprising administering to the patient an effective amount of an OX40 antibody.

Embodiment 48. A process for producing the neural stem cell of any one of Embodiments 1 to 34, the process comprising contacting the neural stem cell with the exogenous nucleic acid for a time sufficient for the neural stem cell to uptake the exogenous nucleic acid.

Embodiment 49. The process of Embodiment 48, further comprising isolating a vesicle from the neural stem cell, wherein the vesicle comprises the exogenous nucleic acid.

Embodiments V1-V47

Embodiment V1. A vesicle comprising an exogenous nucleic acid, wherein the exogenous nucleic acid comprises a neural stem cell-loading sequence bonded to an immunostimulatory sequence via a linking group.

Embodiment V2. The vesicle of Embodiment V1, wherein the vesicle is encapsulated within a neural stem cell; and wherein the neural stem cell is a human leukocyte antigen II-negative neural stem cell.

Embodiment V3. The vesicle of Embodiment V2, wherein the neural stem cell is a HB1.F3.CD21 neural stem cell.

Embodiment V4. The vesicle of Embodiment V2 or V3, wherein the neural stem cell is allogeneic.

Embodiment V5. The vesicle of Embodiment V2 or V3, wherein the neural stem cell is autologous.

Embodiment V6. The vesicle of any one of Embodiments V1 to V5, wherein the exogenous nucleic acid comprises less than 1,500 base pairs.

Embodiment V7. The vesicle of Embodiment V6, wherein the exogenous nucleic acid comprises from about 5 base pairs to about 1,000 base pairs.

Embodiment V8. The vesicle of Embodiment V7, wherein the exogenous nucleic acid comprises from about 10 base pairs to about 500 base pairs.

Embodiment V9. The vesicle of any one of Embodiments V1 to V8, wherein the neural stem cell-loading sequence comprises a Toll-like receptor 3-binding nucleic acid sequence, a Toll-like receptor 9-binding nucleic acid sequence, or a combination thereof.

Embodiment V10. The vesicle of Embodiment V9, wherein the neural stem cell-loading sequence comprises a Toll-like receptor 9-binding nucleic acid sequence.

Embodiment V11. The vesicle of Embodiment V10, wherein the Toll-like receptor 9-binding nucleic acid sequence comprises a CpG oligodeoxynucleotide (ODN).

Embodiment V12. The vesicle of Embodiment V11, wherein the CpG ODN is a CpG-A ODN, a CpG-B ODN, a CpG-C ODN, or a combination of two or more thereof.

Embodiment V13. The vesicle of Embodiment V11, wherein the CpG ODN is CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, CpG ODN D19, or a combination of two or more thereof.

Embodiment V14. The vesicle of Embodiment V9, wherein the neural stem cell-loading sequence comprises a Toll-like receptor 3-binding nucleic acid sequence.

Embodiment V15. The vesicle of Embodiment V14, wherein the Toll-like receptor 3-binding nucleic acid sequence comprises dsRNA, polyinosine-polycytidylic acid, or a combination thereof.

Embodiment V16. The vesicle of any one of Embodiments V1 to V15, wherein the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence.

Embodiment V17. The vesicle of any one of Embodiments V1 to V15, wherein the immunostimulatory sequence comprises a STAT3-inhibiting nucleic acid sequence, a STAT4-inhibiting nucleic acid sequence, a STAT5A-inhibiting nucleic acid sequence, a STAT5B-inhibiting nucleic acid sequence, a STAT6-inhibiting nucleic acid sequence, or a combination of two or more thereof.

Embodiment V18. The vesicle of Embodiment V17, wherein the immunostimulatory sequence comprises a STAT3-inhibiting nucleic acid sequence.

Embodiment V19. The vesicle of Embodiment V18, wherein the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:35, or a combination of two or more thereof.

Embodiment V20. The vesicle of Embodiment V16, wherein the Toll like receptor 7/8-activating nucleic acid sequence comprises ssRNA, thymidine homopolymer oligodeoxynucleotide, guanosine, or an analog of any of the foregoing.

Embodiment V21. The vesicle of Embodiment V16, wherein the STING receptor-activating nucleic acid sequence comprises a cGAMP, a c-di-CMP, a c-di-AMP, a c-AIMP, or an analog of any of the foregoing.

Embodiment V22. The vesicle of Embodiment V16, wherein the RIG-1 receptor-activating nucleic acid sequence comprises dsRNA, polyinosinic:polycytidylic acid, or an analog of any of the foregoing.

Embodiment V23. The vesicle of any one of Embodiments V1 to V8, wherein the exogenous nucleic acid comprises a Toll-like receptor 9-binding nucleic acid sequence covalently bonded to a STAT3-inhibiting nucleic acid sequence via a linking group.

Embodiment V24. The vesicle of Embodiment V23, wherein the Toll-like receptor 9-binding nucleic acid sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19; and wherein the STAT3-inhibiting nucleic acid sequence comprises SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35.

Embodiment V25. The vesicle of any one of Embodiments V1 to V24, wherein the linking group comprises a bond, a nucleic acid sequence, a DNA sequence, substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, or a combination of two or more thereof.

Embodiment V26. The vesicle of Embodiment V25, wherein the linking group comprises a bond, a nucleic acid sequence, substituted or unsubstituted alkylene, or substituted or unsubstituted heteroalkylene.

Embodiment V27. The vesicle of Embodiment V26, wherein the linking group comprises a substituted 6 to 60 membered heteroalkylene.

Embodiment V28. The vesicle of Embodiment V27, wherein the linking group comprises a substituted 18 to 42 membered heteroalkylene; wherein the heteroalkylene comprises an oxygen atom, a phosphorous atom, or a combination thereof; and wherein the substituents are independently selected from the group consisting of =O, —OH, and —O⁻.

Embodiment V29. The vesicle of Embodiment V26, wherein the linking group comprises a substituted heteroalkylene of the formula:

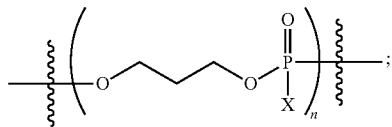

wherein each X is independently —OH or —O⁻, and n is an integer from 1 to 10.

Embodiment V30. The vesicle of Embodiment V25, wherein n is 5.

Embodiment V31. The vesicle of any one of Embodiments V1 to V8, wherein the exogenous nucleic acid comprises SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:33, or SEQ ID NO:35.

Embodiment V32. The vesicle of any one of Embodiments V1 to V31, wherein the exogenous nucleic acid further comprises a detectable moiety.

Embodiment V33. The vesicle of Embodiment V32, wherein the detectable moiety is an enzyme, biotin, digoxigenin, a paramagnetic molecule, a contrast agent, gadolinium, a radioisotope, radionuclide, fluorodeoxyglucose, barium sulfate, thorium dioxide, gold, a fluorophore, a hapten, a protein, a fluorescent moiety, or a combination of two or more thereof.

Embodiment V34. The vesicle of any one of Embodiments V1 to V33, wherein the neural stem cell comprises a vesicle, and wherein the exogenous nucleic acid is encapsulated within the vesicle.

Embodiment V35. A pharmaceutical composition comprising the vesicle of any one of Embodiments V1 to V34 and a pharmaceutically acceptable excipient.

Embodiment V36. A method of treating cancer in a patient in need thereof, the method comprising administering to the patient an effective amount of the vesicle of any one of Embodiments V1 to V34, or the pharmaceutical composition of Embodiment V35.

Embodiment V37. The method of Embodiment V36, wherein the cancer is breast cancer, prostate cancer, leukemia, or lymphoma.

Embodiment V38. The method of Embodiment V36, wherein the cancer is breast cancer, prostate cancer, acute myeloid leukemia, or B cell lymphoma.

Embodiment V39. The method of Embodiment V36, wherein the cancer is glioma.

Embodiment V40. The method of Embodiment V39, wherein the glioma is astrocytoma, ependymoma, oligodendroglioma, mixed glioma, or optic pathway glioma.

Embodiment V41. The method of Embodiment V39, wherein the glioma is astrocytoma, anaplastic astrocytoma, glioblastoma, anaplastic ependymoma, myxopapillary ependymoma, subependymoma, oligodendroglioma, anaplastic oligodendroglioma, anaplastic oligoastrocytoma, Embodiment V42. A method of treating neurodegenerative disease in a patient in need thereof, the method comprising administering to the patient an effective amount of the vesicle of any one of Embodiments V1 to V34, or the pharmaceutical composition of Embodiment 35.

Embodiment V43. The method of Embodiment V42, wherein the neurodegenerative disease is dementia, Alzheimer's disease, Huntington's disease, Parkinson's disease, amyotrophic lateral sclerosis, or multiple sclerosis.

Embodiment V44. The method of Embodiment V42, wherein the neurodegenerative disease is stroke, traumatic brain injury, or traumatic spinal cord injury.

Embodiment V45. A method of treating an inflammatory disease in a patient in need thereof, the method comprising administering to the patient an effective amount of the vesicle of any one of Embodiments V1 to V34, or the pharmaceutical composition of Embodiment V35.

Embodiment V46. The method of Embodiment V45, wherein the inflammatory disease is enterocolitis.

Embodiment V47. The method of any one of Embodiments V36 to V46, further comprising administering to the patient an effective amount of an OX40 antibody.

EXAMPLES

It is understood that the examples described herein are for illustrative purposes only and that various modifications or changes in light thereof will be suggested to persons skilled in the art and are to be included within the spirit and purview of this application and scope of the appended claims.

Example 1

Materials and Methods

Cell Lines. PBMCs from anonymous healthy donors were collected in accordance with the Declaration of Helsinki under IRB Protocol 13378 (City of Hope). Human U251, U87 and mouse GL261, RAW264.7 cells were purchased from American Type Culture Collection (ATCC), whereas RAW-Blue cells from Invitrogen (USA). HB1.F3 NSCs (passage 18-24) were provided by Dr. Karen Aboody (City of Hope) and was described before (Kim et al, Methods Mol Biol, 198:55-65 (2002)). Cells were cultured in DMEM supplemented with 10% fetal bovine serum (FBS).

CpG-STAT3ASO Design and Synthesis. SEQ ID NOS:12 and 13 (CpG-ODN conjugates) were synthesized in the DNA/RNA Synthesis Core (COH) by linking CpG-ODNs to STAT3 ASO similarly as described (Moreira et al. Clinical Can. Res., 24:5948-5962 (2018)). The resulting ODN conjugates are shown below (x—indicates a single C3 unit; asterisk—indicates 2'OMethylation; underline—indicates phosphorothioation site):

SEQ ID NO: 33: CpG-hSTAT3ASO-(CpGD19 ODN + human STAT3 ASO):
5' <u>GGTGCATCGATGCAGGGGGG</u>-xxxxx-C*A*G*C*A*GATCAAGTCCA*G*G*G*A* 3'

SEQ ID NO: 34: CpG-STAT3ASO (CpG1668 ODN + mouse STAT3 ASO):
5' <u>TCC ATG ACG TTC CTG ATG CT</u>-xxxxx-G*A*C*T*C*TTGCAGGAATC*G*G*C*T* 3'

Extracellular Vesicles Isolation. Cells were seeded in exosomes-free medium (DMEM, 10% FBS ultracentrifuged 110,000×g for 16 hours), 18 hours prior to treatment. Next day, medium was replaced and cells were treated with PBS or CpG-STAT3ASO. After 24 hour culture medium was centrifuged 2000×g for 30 min at 4° C. and filtered through 0.22 µm syringe filter (Millipore) followed by precipitation using Total Exosome Isolation Reagent (Invitrogen, USA) according to manufacturer's instruction. EVs' pellet was resuspended in PBS filtered through 0.22 µm syringe filter (Millipore), then immediately used for downstream applications or stored at 4° C. up to 1 week.

Nanoparticle Tracking Analysis. EVs' size measurement was carried out in 0.22 µm-filtered PBS. The concentration and size distribution profile of the isolated particles were evaluated using a NanoSight NS300 instrument (Malvern, Worcestershire, UK) and NTA 3.2 software. Videos were recorded at camera level 15. Samples were diluted 1:100 in PBS to achieve a measured particle concentration of 1-5×10$^8$/ml. For each sample, three 60 s videos were recorded and analyzed in the batch-processing mode.

Apoptosis Assay. NSCs were seeded on 24-well plates and treated with 0.5, 2 and 5 µM of CpG-STAT3ASO for 24 hours. Next day medium was changed, and cells were cultured for another 12 hours. Next, cells were stained with Annexin V and 7-AAD using APC Annexin V apoptosis detection kit I (BD Biosciences) according to manufacturer's instructions and analyzed using flow cytometry.

Migration Assay. NSCs were treated with indicated doses of CpG-STAT3ASO for 24 hours. Next, cells were seeded on gelatin-coated transwell inserts (Corning) in DMEM supplemented 0.5% BSA. The lower chamber were filled with DMEM 10% FBS, then cells were permitted to migrate for 18 hours. Next, cells were fixed in 4% paraformaldehyde and stained with 0.2% crystal violet. Images were acquired on Observer Z1 Live Cell (Zeiss), and the number of migrated cells was quantified using ImageJ (NIH), from at least 4 view fields.

Flow Cytometry. Mouse cells staining was performed using fluorochrome-labeled antibodies: major histocompatibility complex (WIC) class II, CD11b, CD11c, F4/80, Gr-1, CD40, CD80, CD86, after anti-FcγIII/IIR Block was used (eBioscience). Similarly, human peripheral blood mononuclear cells (PBMCs) were analyzed using the following antibodies: HLA-DR, CD1c, CD14, CD19 and CD303 (eBioscience). For EVs phenotyping, isolated vesicles were coupled with anti-CD63 beads (Invitrogen) according to manufacturer's instruction and stained with fluorochrome-labeled CD9, CD63 and CD81 antibodies (eBioscience). Fluorescence data was acquired on BD Attune NxT and an AccuriC6 Flow Cytometer (BD) and analyzed using FlowJo software (TreeStar).

Fluorescence Measurements. The molar concentration (for uptake experiments) and molecular mass of encapsulated CpG-STAT3ASO$^{Cy3}$ were estimated using measurement of wave length at 545/575 nm on Cytation 5 (BioTek). Standard curve with serial dilutions of CpG-STAT3ASO$^{Cy3}$ was prepared to calculate given results. EV(PBS) served as blank control for background subtraction.

Confocal Microscopy. NSCs were seeded on 18-wells Chamber Slides (Lab-Tek) and allowed to attach overnight. Next day cells were incubated with indicated dose of CpG-STAT3ASO$^{Cy3}$ for indicated time. After washing, cells were fixed in 4% paraformaldehyde (EMS), permeabilized with Triton-X and incubated with primary antibody (Rab27A D7Z9Q, Cell Signaling) for 18 h. Next day, cells were decorated with AF488-conjugated secondary antibody, stained with Hoechst and mounted in Vectashield Hard-Set medium (Vector Laboratories). Slides were visualized on an LSM880 confocal microscope (Zeiss) and analyzed using LSM ImageBrowser (Zeiss).

Electron Microscopy. Specimens at an optimal concentration were placed onto 300-mesh carbon-formvar-coated grids and allowed to absorb to the formvar for a minimum of 1 min. Grids were rinsed with double-distilled water and stained for contrast using 1% uranyl acetate. The samples were viewed with an FEI Tecnai T12 transmission electron microscope at 120 keV, and images were taken with a Gatan Ultrascan 2K charge-coupled device (CCD) camera.

Quantitative Real-Time PCR. Total RNA was extracted from cells using Maxwell system (Promega) and then transcribed to cDNAs using iScript cDNA Synthesis kit (Bio-Rad). The qPCR was carried out using specific primers for IL12A, STAT3, UBQ, and ACTB using CFX96 Real-Time PCR Detection System (Bio-Rad).

DCs Differentiation From PBMCs. Human monocytes were isolated from PBMCs using negative selection kit. The isolated cells were cultured in RPMI supplemented with 10% FBS in a presence of IL-4 (50 ng/ml) and GM-CSF (100 ng/ml) (Peprotech) for 6 days. Next, cells were seeded on 12-well plate and treated with EV(PBS) and EV(CpG-hSTAT3ASO) or EV(CpG-hSTAT3ASO$^{Cy3}$) respectively for 24 hours. Uptake was assessed by flow cytometry and IL12A mRNA level was measured using qPCR.

NF-κB-Dependent Secreted Alkaline Phosphatase (SEAP) Reporter Assay. RAW-Blue cells carrying a SEAP reporter construct inducible by NF-κB were purchased from InvivoGen (San Diego, CA). Cells were incubated with indicated doses of EV(PBS) or EV(CpG-mSTAT3ASO) respectively for 24 hours. Next, cell supernatant was collected for SEAP assay according to manufacturer's protocol using Quanti-Blue SEAP detection medium.

BMDM Activation. Bone marrow cells from age, gender and weight matched WT C57BL/6 mice were collected and treated with differentiation medium (RPMI, 20% FBS, 30% LCCM) for 7 days. The BMM medium was resupplied on day 4. The differentiated cells were plated in triplicate in 12-well plates at a concentration of 2×10$^6$ cells/ml in BMM medium (RPMI, 10% FBS, 5% LCCM). On day 7, medium was replaced for RPMI 10% FBS and cells were treated with indicated doses of EV(PBS) or EV(CpG-STAT3ASO) respectively for 24 h. Next, cells were gently detached on ice, washed and stained for flow analysis, or collected for qPCR analysis of STAT3 expression.

Statistics. One- or two-way ANOVA followed by Bonferroni post-test were applied to assess differences between multiple groups. Statistically significant P values were indicated in figures as follows: *, P<0.001; , P<0.01 and *, P<0.05. Data were analyzed using Prism7 software (GraphPad).

Figure 1B:
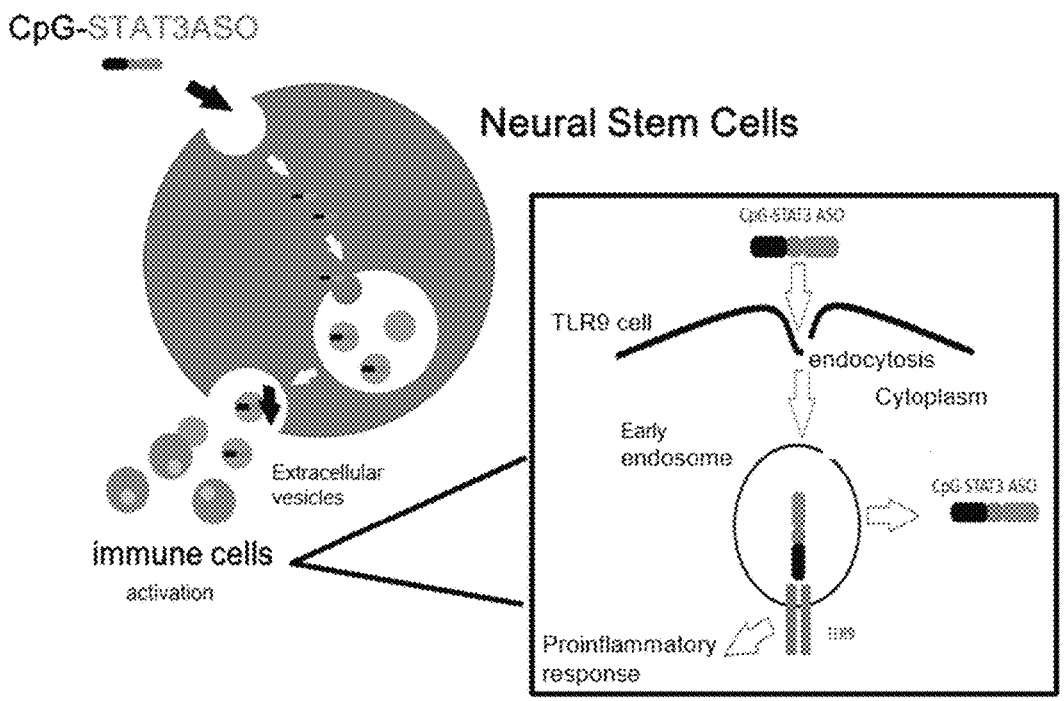

Neural Stem Cell Targeted Delivery of Exosomes (Extracellular Vesicles) Containing Therapeutic Agents Human Neural Stem Cells HB1F3.CD (NSCs) can uptake CpG-STAT3 antisense oligonucleotides (ASOs) into their internal cellular intracellular space, and package the ASOs into vesicles when injected into a tissue culture dish and/or animal subject and/or human patient (FIGS. 1A-1B). The NSCs can move from the injection site to primary and metastatic tumor site(s) and discharge the vesicles as Extracellular Vesicles (EVs also known as Exosomes) into extracellular space. The EVs will enter tumor cells and release ASOs into tumor cell intracellular space. The ASOs are functional, inhibit STAT3, induce OX40 expression (which may be combined with OX40 antibody treatment), and lead to tumor cell growth inhibition and tumor killing. The target tumor may be 4T1 breast cancer cells. The composition and related compositions and method and related methods may be applied to any solid tumor and/or tumor metastasis to limit tumor growth, induce tumor regression, and/or induce tumor killing effects thereby increasing long term survival with minimal side effects of the tumor host animal subject or human patient. The inventors observed additional tumor infiltrating lymphocytes producing additional systemic antitumor effects.

Additional details are provided below regarding ASO loaded EVs, which the inventors now extend to precision targeted delivery by NSCs. Oligonucleotide therapeutics (ONTs) can overcome limitations of small molecule inhibitors in targeting of many undruggable transcription factors, such as Signal Transducer and Activator of Transcription 3 (STAT3). However, targeted delivery and short circulatory half-live are still major hurdles in their clinical application. The inventors previously described an original strategy for cell selective delivery of STAT3 inhibitors, in the form of siRNA or decoy DNA, to certain immune and cancer cells using conjugates with TLR9 ligands, CpG oligonucleotides (e.g., U.S. Pat. No. 9,976,147). The CpG-STAT3 inhibitors (CSIs) showed efficacy in systemic administration against hematological malignancies. To improve systemic delivery of CSIs into the microenvironment of solid tumors, such as bone-localized metastatic prostate cancer or glioblastoma (GBM), the inventors developed a method of encapsulation of CSIs into extracellular vesicles (EVs). The inventors tested several types of cells for EV-producing capacity, including macrophages, dendritic cells and various cancer cells. The unformulated CpG-STAT3ASO was quickly internalized by various TLR9+ cells but due to excellent stability (T1/2=102 h in human serum), it resisted lysosomal degradation. Instead, cells that internalized naked oligonucleotides were found secreting EV-encapsulated CpG-STAT3ASO for up to 3 days after the initial uptake. When optimal loading conditions were established, the EV(CpG-STAT3ASO) were routinely isolated by ultracentrifugation from cultured media, then fully characterized to assess: vesicle size using Nanosight measurements, the expression of membrane antigens by Western blotting and the loading efficiency using fluorescent assays and cytofluorometry. The inventors found that the isolated vesicles had an average diameter of 125 nm, were characterized by surface staining for $CD9^-CD63^+CD81^+$ and were successfully loaded with CpG-STAT3ASO within a range of 80-95%. Isolated fractions of EV(CpG-STAT3ASO) were able to transfer biologically active content into glioma target cells (U87, U251) as well as into immune cells (dendritic cells and macrophages). The encapsulation of CSIs did not prevent target gene silencing or TLR-dependent NF-κB activation. In biodistribution studies, EV-encapsulation improved delivery of fluorescently-labeled CpG-conjugates to target cells in various organs after intravenous injections into mice compared to equal amount of naked oligonucleotide. The inventors demonstrated the feasibility of using simple, spontaneous loading of TLR9-targeted oligonucleotides into EVs for improving delivery of ONTs to TLR9+ immune and cancer cells, with simultaneous preservation of biological activity of the encapsulated drug.

Example 2

Activation of Antitumor Immunity by Human Neural Stem Cell Mediated CPG-STAT3 Antisense Oligonucleotides and OX40 Antibodies in a Syngeneic Breast Cancer Mouse Model Breast cancer is the most common cancer among women in the United States. Patients diagnosed at advanced stages have limited treatment options, due in part to tumor cell immune tolerance caused by STAT3. Treatment with CpG-STAT3 antisense oligonucleotides (ASOs) inhibit STAT3 and trigger immunostimulation. The CpG moiety tethered to STAT3-ASO enables cellular uptake of the conjugate by immune cell expression of Toll-like receptor 9 (TLR9). The current study investigates the novel approach of delivering CpG-STAT3-ASOs in a clinically relevant neural stem cell (NSC) line (HB1.F3.CD21) to increase their tumor-targeted delivery and local retention at breast cancer sites. These NSCs have demonstrated tumor tropism to invasive tumors including brain, ovarian, and breast cancers.

Figure 3:
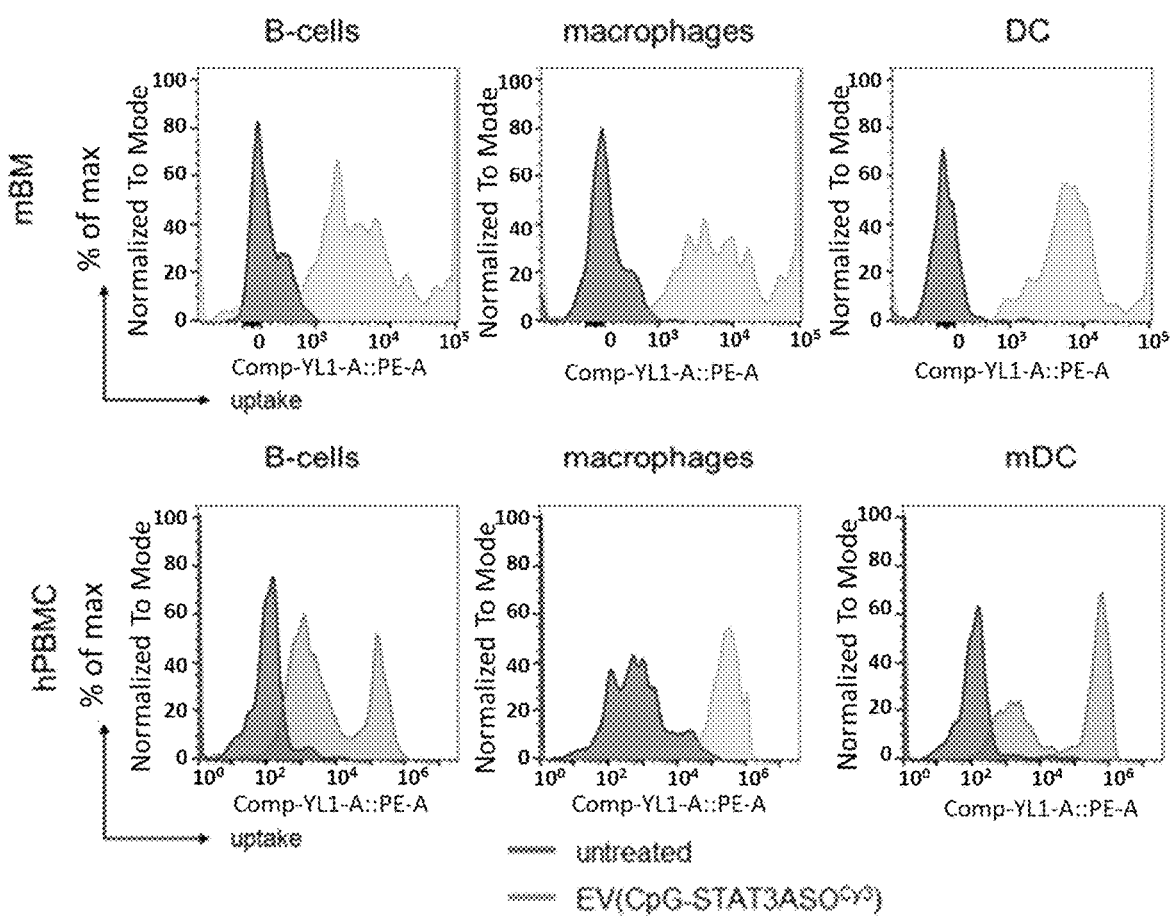
FIG. 3 show flow cytometry analyses of EV-encapsulated CpG-STAT3 ASO$^{Cy3}$ uptake by human or mouse DC, macrophages or B-cells after 24 hour incubation.

In vitro studies showed rapid uptake of CpG-STAT3 ASOs by NSCs through scavenger receptor-mediated endocytosis, which did not affect the construct or its efficacy (FIG. 3).

Figure 4:
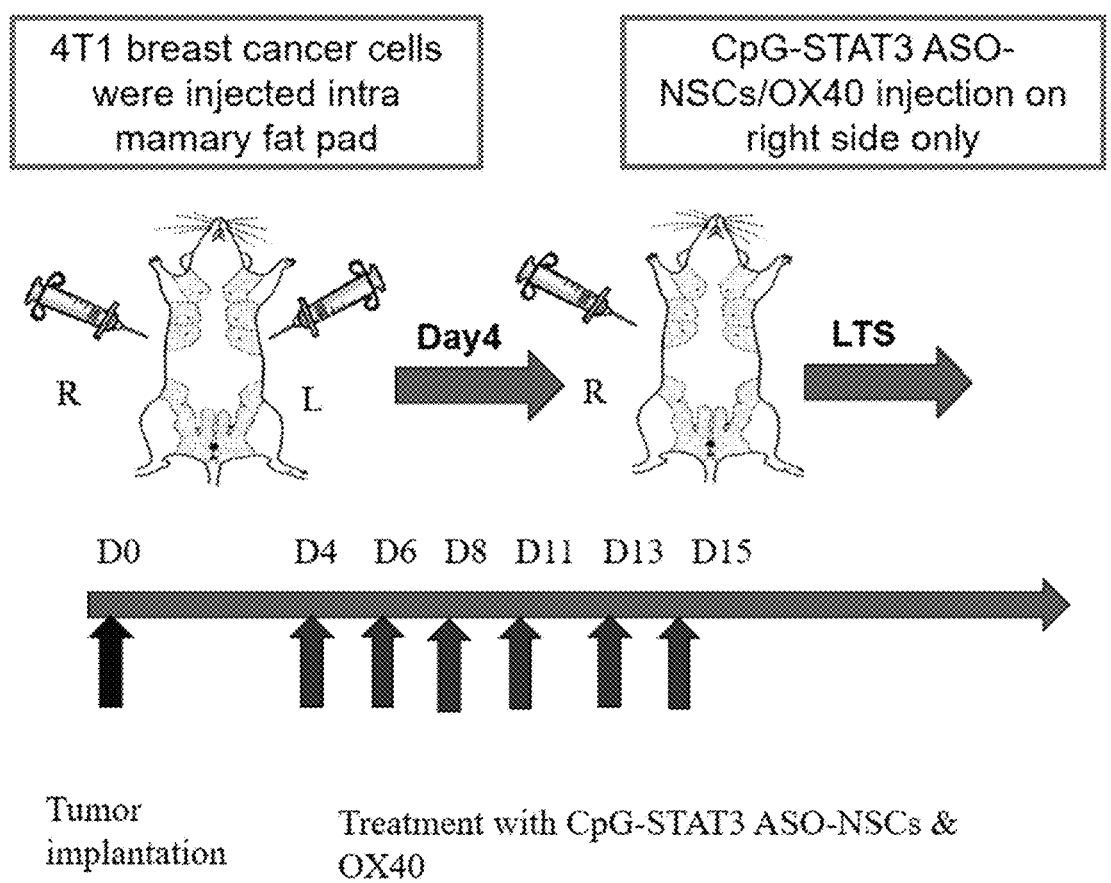
FIG. 4 illustrates an experimental paradigm for CpG-STAT3 ASO-NSCs treatment in orthotopic syngeneic immunocompetent breast cancer mouse model. n=5/group.
Figure 5A:
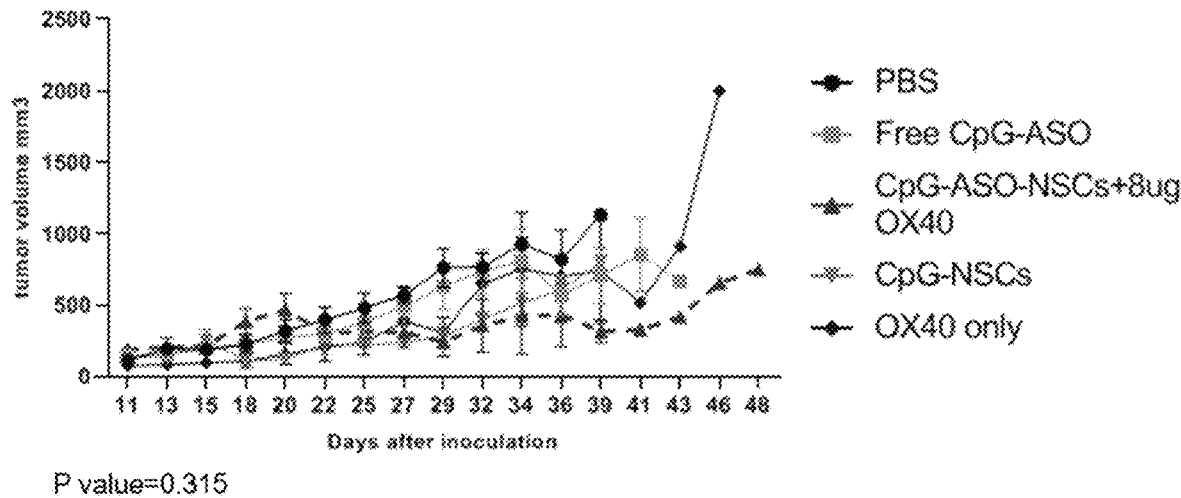
FIGS. 5A-5D are graphs showing tumor volume in right-treated and left-untreated sides of the mammary fat pad. PBS, 1 ug CpG-STAT3 ASO, 8 ug OX40, $6.6 \times 10^6$ cells of CpG-STAT3 ASO-NSCs, n=5/group.
Figure 5B:
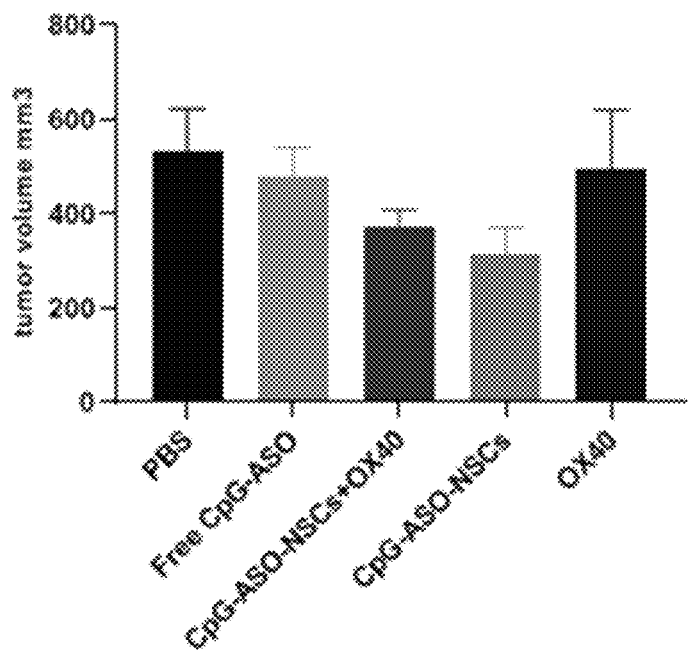
Figure 5C:
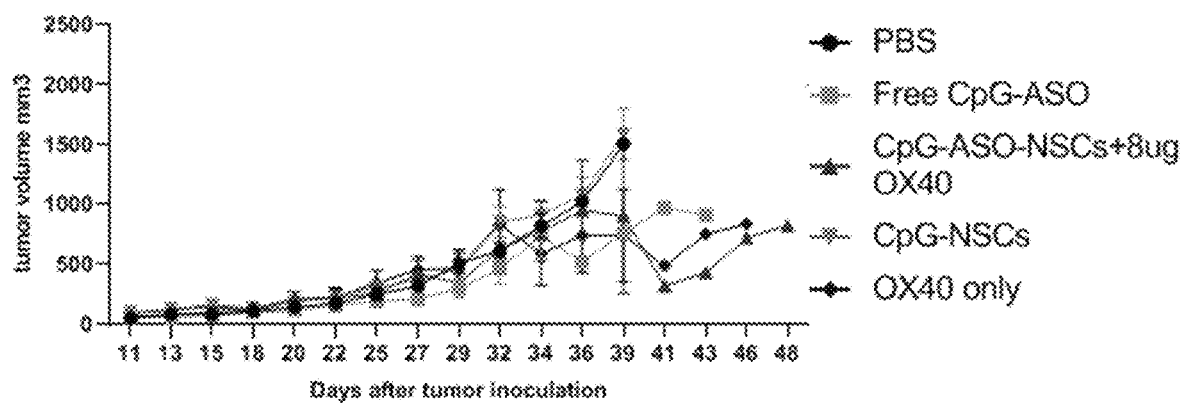
Figure 5D:
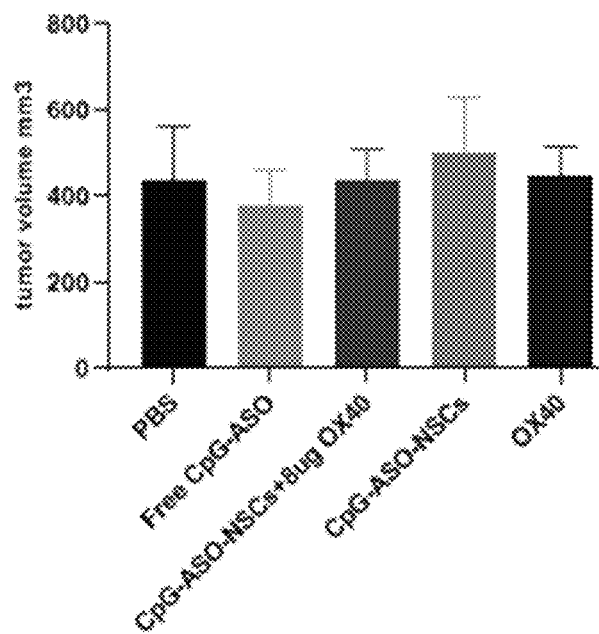

The inventors hypothesized that following intra-tumoral administration of CpG-STAT3 ASO-NSCs in an immunocompetent breast cancer mouse model, the construct would distribute through tumor cells, attracting tumor-infiltrating lymphocytes, and generate a systemic anti-tumor effect. Following uptake, NSCs continuously released extracellular vesicles (EVs) containing the CpG-STAT3 ASOs (CpG-STAT3 ASO-NSCs) for 2-3 days in an in vivo immunocompetent mouse model of breast cancer, in which tumors were established in left and right mammary fat pads (FIG. 4).

When NSC-delivered versus free CpG-STAT3 ASO was administered intratumorally, the inventors observed an enhanced distribution of CpG-STAT3-ASOs in the tumor microenvironment, attracting more tumor infiltrating lymphocytes and generating a systemic anti-tumor effect.

Moreover, because TLR9 activation induces the expression of the costimulatory receptor OX40 on T-cells, inventors theorized that the addition of OX40 agonist antibodies (Abs) would lead to further anti-tumor activity in treated mice. For these in vivo experiments, the inventors developed an orthotopic, immunocompetent breast cancer model by injecting female BALB/c mice with syngeneic 4T1 breast tumor cells in the left and right intra-mammary fat pads. Treatment began four days after tumor implantation and was given only to the right side tumor, and consisted of 3 intra-tumoral injections of PBS, free CpG-STAT3 ASOs, or CpG-STAT3 ASO-NSCs every other day, alone or in combination with OX40 agonist Abs. Caliper measurements of both left and right tumors were recorded every other day, and mice were euthanized once the largest diameter of either tumor reached 1.5 mm (in compliance with AAALAC euthanasia criteria).

Figure 6:
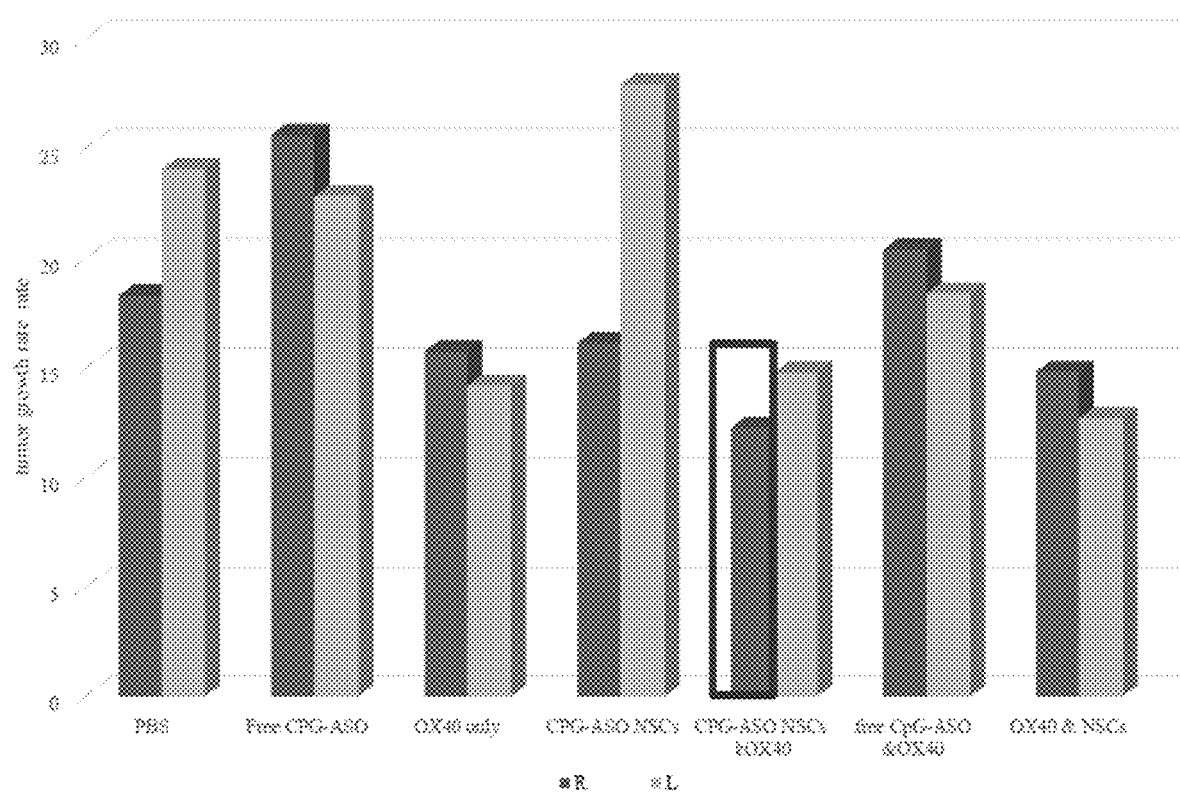
FIG. 6 is a bar graph illustrating the difference in the tumor growth rate in right-treated side and left-untreated side of the mammary fat pad among all experiment groups. Data from left to right show treatment with PBS, Free CpG-ASO; CpG-ASO-NSCs+OX40; CpG-ASO-NSCs; and OX40.
Figure 7:
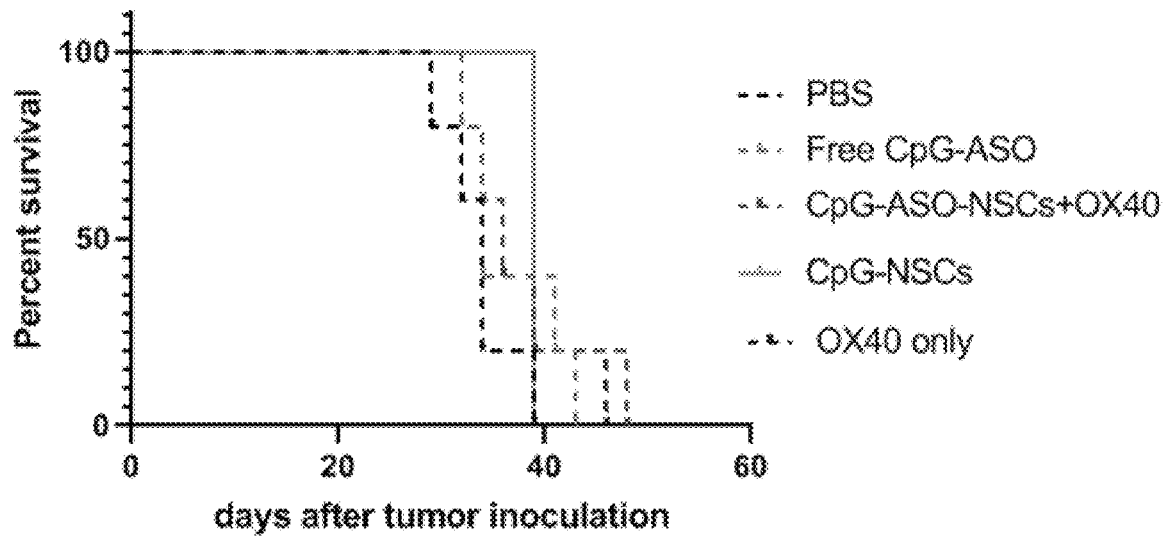
FIG. 7 is a graph showing the difference in the survival among all experiment groups P value=0.44.
Figure 8A:
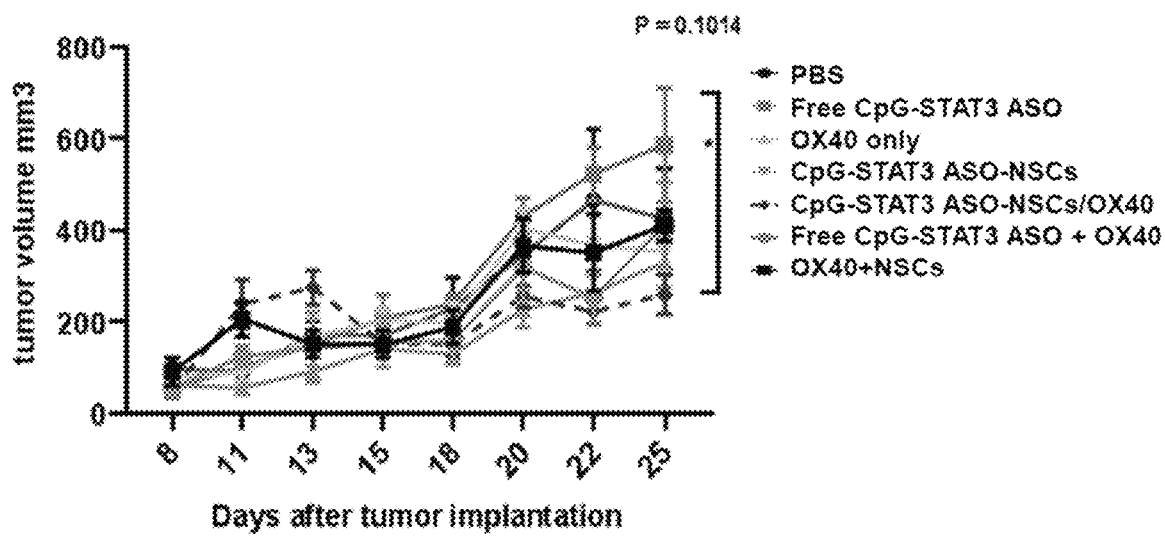
FIGS. 8A-8D are graphs showing tumor volume in right-treated (FIGS. 8A-8B) and left-untreated (FIGS. 8C-8D) sides of the mammary fat pad. 20 ul PBS, 75 ng CpG-STAT3 ASO, 8 ug OX40, 5E5 cells of NSCs and 5E5 CpG-STAT3 ASO-NSCs (n=6/group).
Figure 8B:
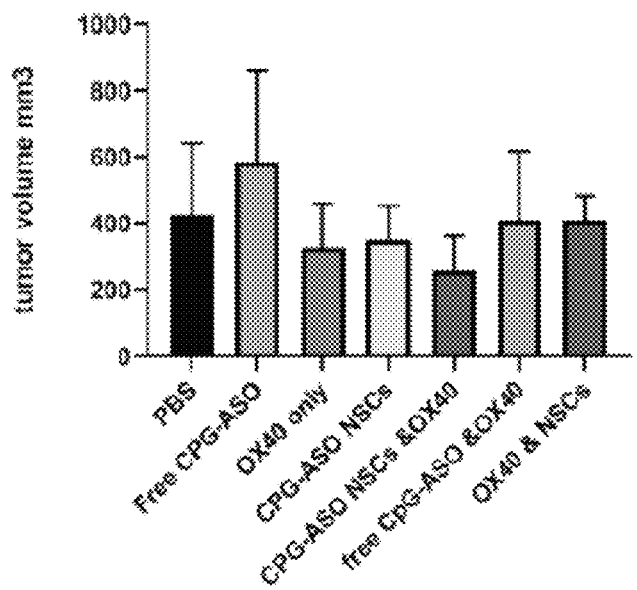
Figure 8C:
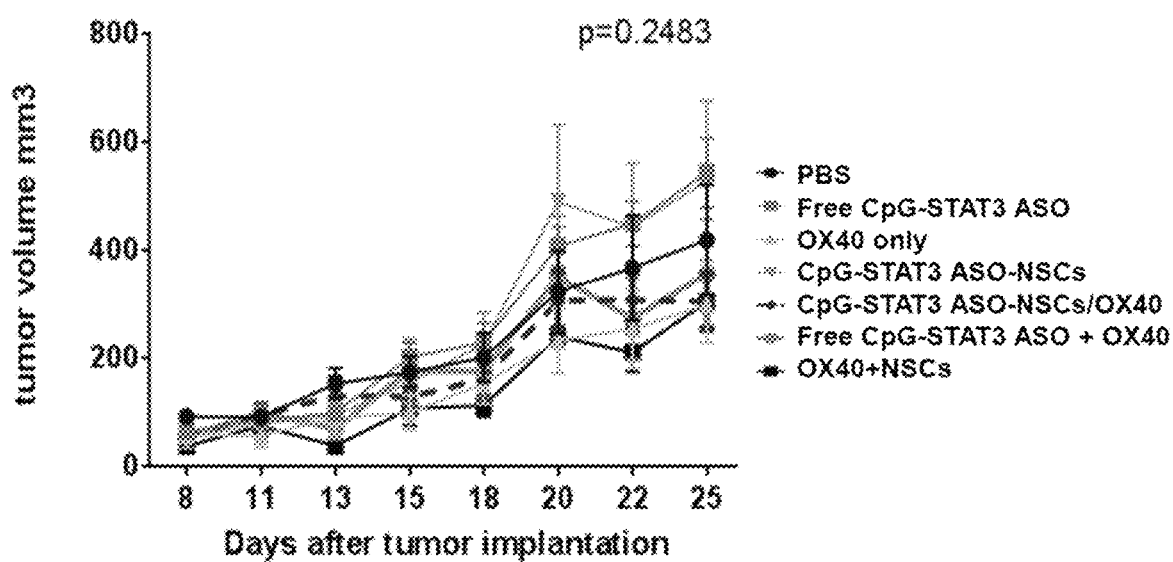
Figure 8D:
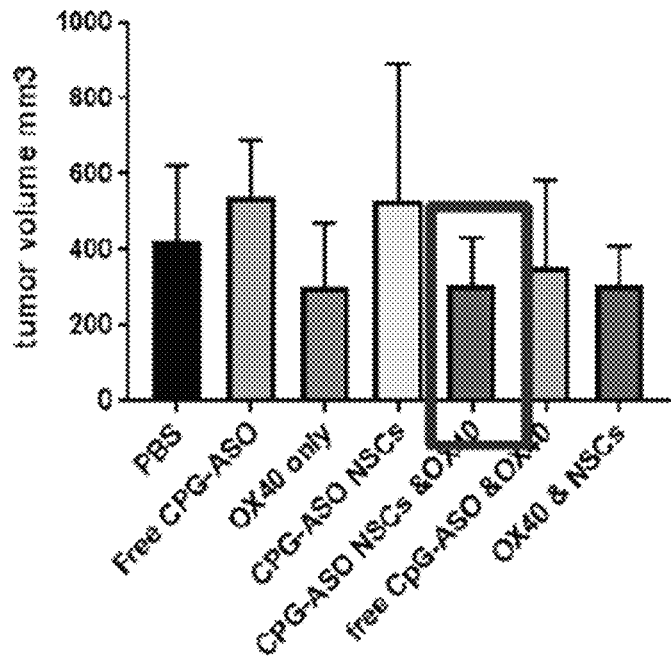

Resulting data indicated that CpG-STAT3 ASO-NSCs/ OX40 agonist Ab combination therapy suppressed tumor growth, represented by reduced volume of both the treated right side and non-treated left side tumors (FIG. 6), and resulted in extended survival. This resulted in reduced volume of both the injected and non-injected tumor (FIG. 6), and extended long term survival. The CpG-STAT3ASO molecules trigger Toll-like Receptor 9 (TLR9) activity while eliminating STAT3 signaling in the tumor residing immune cells. CpG-STAT3 antisense oligonucleotide NSCs combined with OX40 remarkably reduced the least tumor growth among other groups. These data demonstrate that this combined treatment approach will be able to overcome immune tolerance and induce a systemic anti-tumor immune response in patients with advanced breast cancer.

Example 3

Figure 9A:
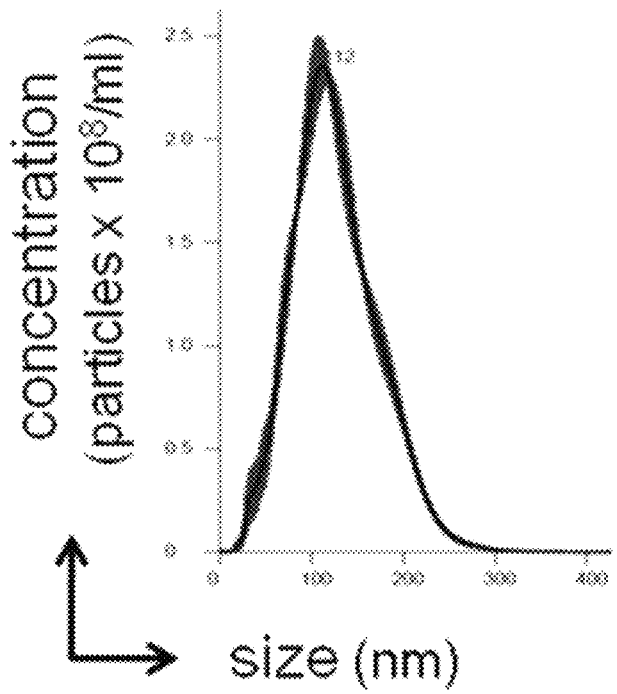
FIGS. 9A-9F show the results of the experiments described herein.
Figure 9B:
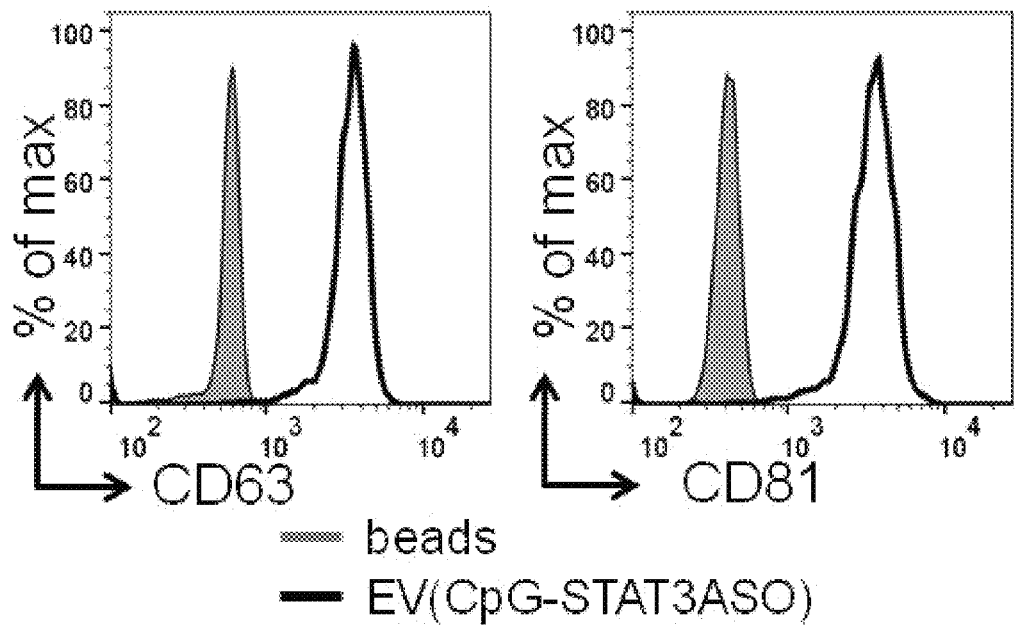
Figure 9C:
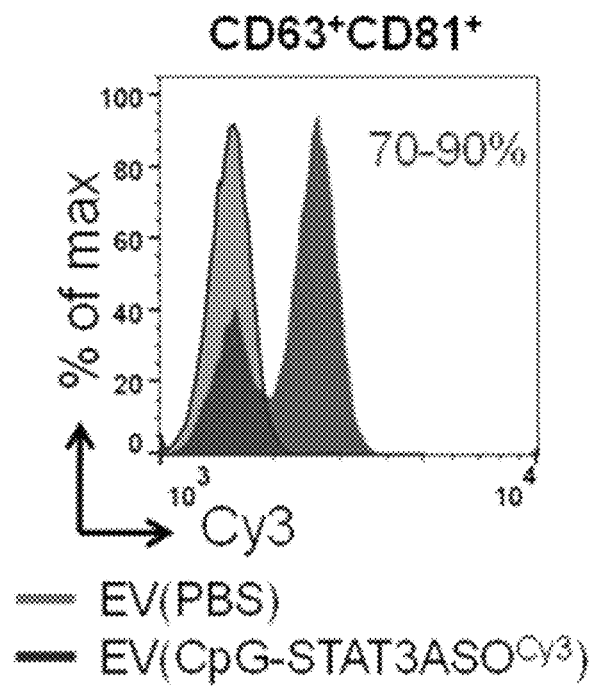
Figure 9D:
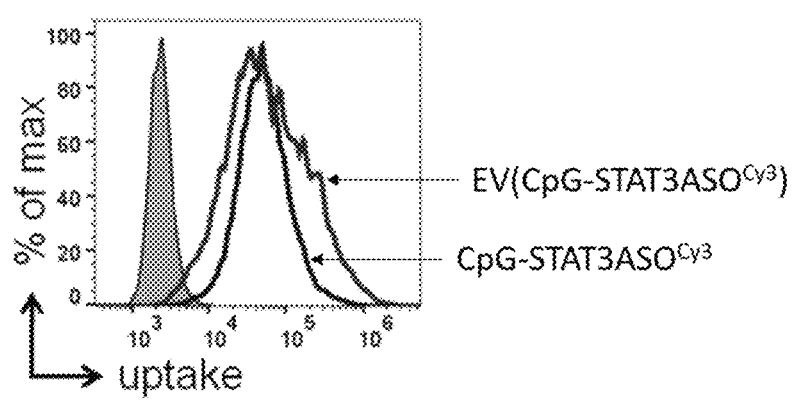
Figure 9E:
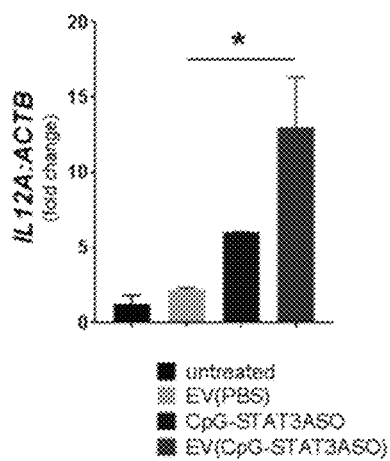
Figure 9F:
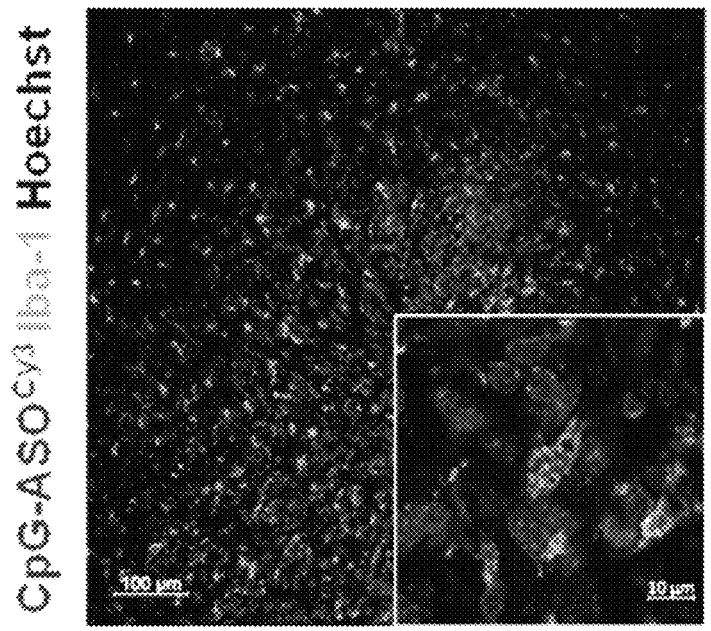
Figure 10E:
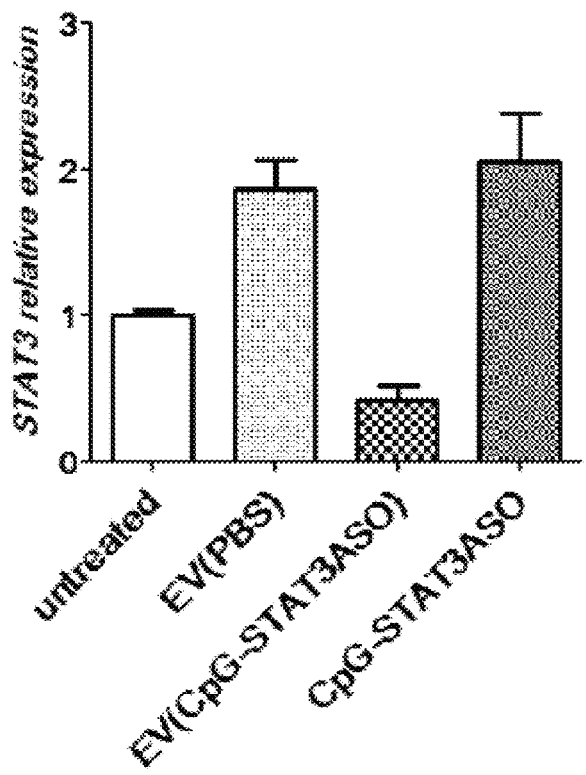
Figure 10F:
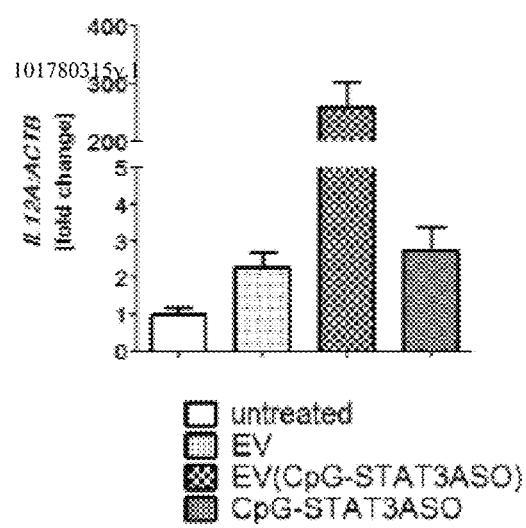
Figure 10G:
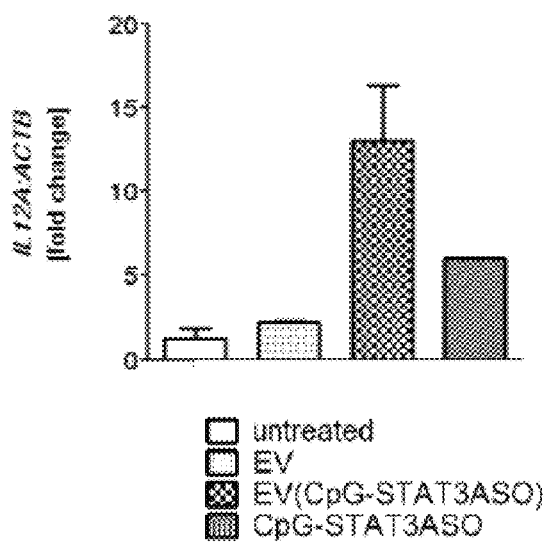

Immunotherapy for Malignant Glioma Using a Combination of Neural Stem Cells and CpG-STAT3 Antisense Oligonucleotides Neural stem cells (NSCs) hold great promise for brain tumor therapy due to their inherent tumor-tropic, non-immunogenic properties, which makes them an ideal vehicle to deliver therapeutic payloads, such as enzyme-prodrugs or antibodies, selectively to tumor foci. NSCs could also be utilized as carriers for the intracranial delivery of synthetic oligonucleotide therapeutics (ONTs), improving and extending the kinetics of ONT penetration into the MG microenvironment. NSCs are known to secrete large amounts of extracellular vesicles (EVs), particularly exosomes (FIG. 9A), which can transfer endogenous miRNAs as well as antigenic peptides. The inventors have established that NSCs can rapidly internalize chemically modified and nuclease-resistant CpG-STAT3 antisense oligonucleotides (ASO) through scavenger receptor-mediated endocytosis. Following the CpG-STAT3ASO uptake, NSCs secrete up to 90% of the $CD63^+CD81^+$ exosomes containing these oligonucleotides (FIG. 9B-9C). The encapsulation of CpG-STAT3ASO did not prevent potently immunostimulatory effect of CpG/TLR9-activation on target immune cells, such as dendritic cells (FIG. 9D). Preliminary experiments in vivo using intracranial GL261 glioma tumors demonstrated that local injection of NSC loaded with CpG-STAT3ASO$^{Cy3}$ results in transfer of the Cy3-labeled oligonucleotide to microglia cells infiltrating tumors (FIG. 9E). Thus, the combination of NSCs with CpG-STAT3ASO loading provide a new immunotherapeutic strategy to disrupt immunosuppressive tumor microenvironment, while delivering direct cytotoxicity to MG cells.

The inventors will further characterize NSC-derived exosomes before and after loading with CpG-STAT3ASO, focusing on the protein composition of the vesicle membrane and the oligonucleotide content. The inventors will also compare the effect of CpG-STAT3ASO/exosomes on the viability and tumorigenic potential of primary and established $TLR9^+$ MG cells as well as on the tolerogenic functions of macrophages derived from MG tumors.

Evaluate efficacy and safety of the combination treatment using CpG-STAT3ASO-loaded NSCs injected into orthotopic MG models in vivo. The antitumor efficacy of NSCs before and after loading with CpG-STAT3ASO, will be assessed in syngeneic MG models in mice. First, inventors will assess biodistribution and kinetics of CpG-STAT3ASO release from NSCs after ICT or ICV injections. The inventors will also verify target gene knockdown and immunostimulatory effects of such strategy. Finally, the inventors will compare the efficacy of the CpG-STAT3ASO and NSCs alone, and when combined, in inhibiting MG growth and generating long-term and tumor antigen-specific antitumor immune responses.

Malignant gliomas (MG) are rapidly fatal despite multi-modal treatment. Therapeutic resistance of MG is a consequence of both intrinsic cancer cell properties and protective influences of the tumor microenvironment. The inventors pioneered the use of human NSC as drug delivery vehicles to MG based on their inherent tumor tropism. See, e.g., Zhao et al, Molecular cancer research: MCR, 6:1819-1829 (2008); Ziu et al, Journal of Neuro-Oncology, 79:125-133 (2006); Schmidt et al, Neoplasia, 7:623-629 (2005). NSC-mediated enzyme prodrug therapy has the potential to maximize the distribution of therapeutic enzymes within the tumor environment, localizing conversion of prodrug to active drug at the tumor sites and thus decrease off-target toxicities. See, e.g., Aboody et al, Science Translational Medicine, 5:184ra159 (2013); Metz et al, Stem Cells Translational Medicine, 2:983-992 (2013). The recent first-in-human study demonstrated initial safety and proof of concept regarding the ability of NSCs to target brain tumors and locally produce chemotherapy. See, e.g., Portnow et al, Clinical cancer research: an official journal of the American Association for Cancer Research, 23:2951-2960 (2017). Therefore, NSC-prodrug therapy can be further enhanced by combination with the immune-potentiating strategy based on the use CpG-STAT3 inhibitory oligonucleotides. In MG potential targets for CpG-STAT3 inhibitors are dysfunctional myeloid cells, such as tumor-associated microglia/ macrophages or myeloid-derived suppressor cells (MDSCs). See, e.g., da Fonseca et al, Clin Dev Immunol, 2013:264124 (2013); Pyonteck et al, Nature medicine, 19:1264-1272 (2013); Zhang et al, Glia, 57:1458-1467 (2009); Hossain, et al, Clinical cancer research: an official journal of the American Association for Cancer Research, 21:283-293 (2015); Vasquez-Dunddel et al, J Clin Invest, 123:1580-1589 (2013). Targeting MDSCs using TLR9-mediated delivery of STAT3 inhibitors can alleviate their immunosuppressive functions without the risk associated with antibody-mediated cell depletion. See, e.g., Won et al, Journal of leukocyte biology, 102:423-436 (2017). These studies will provide proof-of-concept data leading to a detailed preclinical studies on NSC/CpG-STAT3ASO combination to enable clinical translation of this strategy to MG immunotherapy.

The inventors' innovation is based on the concept of combining an oligonucleotide-based (CpG-STAT3ASO) and cellular biologic reagents into a single immunotherapeutic approach for malignant glioma. The bi-functional CpG-STAT3ASO molecules trigger Toll-like Receptor 9 (TLR9) activity while eliminating STAT3 signaling, which constrains the immunostimulatory effects within the tumor-associated immune cells. See, e.g., Kortylewski et al, Nat Biotechnol, 27:925-932 (2009); Zhang et al, Blood, 121: 1304-1315 (2013); Gao et al, Cancer research, 73:7211-7221 (2013); Hossain et al, Blood, 123:15-25 (2014). This strategy eliminates the major obstacle in targeting the "undruggable" STAT3 transcription factor by using cell-specific CpG-mediated delivery of STAT3 inhibitors without the need for transfection. When used as a single agent in unformulated form, the chemically-stabilized CpG-STAT3ASO are highly resistant to serum and intracellular nuclease. Thus, following uptake by target cells, the completely functional oligonucleotide can be found in extracellular vesicles (EVs). This is a simple and new method for encapsulating oligonucleotides in EVs that avoids common problems related to damage and aggregation of vesicles during electroporation or transfection. See, e.g., Liang et al, International journal of nanomedicine, 13:585-599 (2018); Didiot et al, Molecular therapy: the journal of the American Society of Gene Therapy, 24:1836-1847 (2016). Finally, loading CpG-STAT3ASO into EVs by NSCs creates an opportunity for enhancing this clinically-relevant cellular strategy by providing immunostimulatory effects. The simplicity of combining both approaches and potential therapeutic benefits underscore translational potential for treatment of malignant glioma.

The exosomes isolation will be performed using standard ultracentrifugation. Inventors will use previously established multi-parametric flow cytometry for the assessment of immune activation in the tumor microenvironment (Iba1, CD11b, CD11c, CD40/80/86, F4/80, MHC-II, STAT3P). The biodistribution studies will also use immunofluorescent microscopy and flow cytometry. Finally, the animal studies will use standard methodology. Inventors plan to use 8 mice of both sexes per experimental group which based on previous studies guarantees sufficient statistical power to detect therapeutic effects of tested reagents.

Example 4

Cancer Immunotherapy Using Neural Stem Cells for Tumor-Targeted Delivery of CpG-STAT3 Antisense Oligonucleotides Via Exosomes The efficient penetration into brain tumors remains a challenge for many drugs, including emerging oligonucleotide therapeutics, such as antisense molecules. Neural stem cells (NSCs) hold great promise for brain and ovarian cancer therapy due to their inherent tumor-tropic, non-immunogenic properties, which makes them an ideal vehicle to deliver therapeutic payloads selectively to hypoxic tumor areas. NSCs could also be utilized as carriers for the intracranial delivery of synthetic oligonucleotide therapeutics (ONTs), potentially improving and extending the kinetics of ONT penetration into the tumor microenvironment. NSCs are known to secrete large amounts of extracellular vesicles (EVs), particularly exosomes. Here we demonstrate the use of clinically safe neural stem cells (NSCs) for the targeted delivery of immunostimulatory CpG-STAT3ASO to treat cancer. As demonstrated in vitro, NSCs can rapidly internalize chemically modified and nuclease-resistant CpG-STAT3 antisense oligonucleotides (ASO) through scavenger receptor-mediated endocytosis. Following the oligonucleotide uptake, NSCs continuously release extracellular vesicles, such as CD63+CD81+ exosomes containing CpG-STAT3ASO over several days. The EVs loaded with CpG-STAT3ASO showed enhanced immunostimulatory properties compared to EVs derived from untreated NSCs when incubated with cultured human dendritic cells or mouse macrophages. We demonstrated in vivo that intracranial injection of NSCs ex vivo loaded with CpG-STAT3ASO$^C_{y3}$ resulted in transfer of the fluorescently-labeled oligonucleotides into microglia cells infiltrating GL261 glioma tumors. Furthermore, CpG-STAT3ASO-loaded NSCs induced immune activation of glioma-associated myeloid cells such as microglia and macrophages. The repeated treatment using oligonucleotide-loaded NSCs inhibited growth of GL261 glioma and also in ID8 tumors in mice after intratumoral or intraperitoneal injections, respectively. These results demonstrate the combination of clinically-relevant cellular strategy with tolerance-breaking oligonucleotides for a two-pronged therapeutic effect against advanced solid tumors.

Signaling transducer and activator of transcription 3 (STAT3) has been identified as a key target for cancer immunotherapy, since it is constitutively activated in tumor and promotes the expansion of suppressor cells and the immunosuppression of antitumor immunity (1,2). Currently STAT3 inhibitors or analogs have been widely used to downregulate tumorigenic activity and inhibit tumor growth (3). In parallel, oligonucleotide (ODN)-based therapeutics, especially CpG ODN, have showed marked efficacy in potentiating immune responses in cancer immunotherapy (4). Of note, administration of a "two-prong" construct, CpG ODN (adjuvant domain) conjugated with STAT3 antisense oligonucleotides (ASO) or siRNA (STAT3 inhibition domain), has resulted in significant therapeutic benefits in prostate cancer and B cell lymphoma (5,6). However, the major challenges that hinder the advancement of ODN-based therapeutics in clinical settings are the vulnerability of ODN in circulation and the lack of efficient targeted delivery. Since chemically or metabolically-stabilized ODNs have been well studied and developed (7), optimizing the efficiency of therapeutic delivery may be the key to improving the efficacy of STAT3-mediated immunotherapy.

Exosomes are secreted by cells through endosomal pathway or budding of cell membrane, and they play a key role in intercellular communication by shuttling biomolecules, such as proteins, lipids, mRNAs and miRNAs, between cells (8-11). In particular, increasing evidence suggests that tumor-derived exosomes play a pivotal role in promoting tumorigenesis by mediating metastasis and immune responses (12,13). Recent studies have revealed that tumor exosomes are involved in organotropic metastasis, and metastatic melanomas evade immunosurveillance and systemically suppress the immune system by secreting exosomes intrinsically loaded with surface marker PD-L1 (14, 15). In addition, tumor-derived exosomes expressing surface marker Hsp72 counteracted immune surveillance through mediating the function of myeloid-derived suppressor cells (MDSCs) in a STAT3-depent manner (16). Moreover, with a size range of 40-200 nm, exosomes have been emerging as promising carriers for drug delivery system and been extensively studied in cancer immunotherapy (17-20). In a glioblastoma study, exosomes-encapsulated curcumin inhibitor was targeted to microglia cells via intranasal route and subsequently inhibited tumor progression in mice (21). Notably, therapeutic exosomes derived from dendritic cells have been engineered to specifically deliver siRNA to mouse brain, resulting in remarkable BACE1 gene knockdown (22). The similar approach is also proved successful in another study which suggested the enhanced targeting of oncogene KrasG12D in pancreatic cancer by engineered exosomes (23). Interestingly, Mooney et al showed that immunizing mice with adjuvant-loaded exosomes derived from cancer cells could induce potent antigen-specific antitumor immune response (24).

As neural stem cells (NSCs) were clinically safe and able to migrate to hypoxia area in brain tumors (25), the inventors utilized NSCs for cancer treatment by generating exosomes loaded with CpG-STAT3 ASO constructs. The inventors isolated exosomes from CpG-STAT3 ASO treated NSCs following the criteria as previously described (26-28), and subsequently characterized these exosomes and evaluated their bioactivities in vitro and the efficacy of CpG-STAT3 ASO treated NSCs in vivo. The results demonstrated that NSCs-derived exosome showed marked enhancement in STAT3 suppression compared to naked CpG-STAT3 ASO in equivalent dosage in vitro, while intratumoral administration of CpG-STAT3 ASO treated NSCs in mice engrafted with GL261 tumor led to significant inhibition of tumor growth relative to parental construct and NSCs sham. Overall, this study demonstrates the feasibility of clinical translation of "NSCs and CpG-STAT3 ASO" combined strategy, which will induce potent antitumor response while minimize systemic pharmacological toxicity in advanced solid tumors.

Materials and Methods

Cell culture. PBMCs from anonymous healthy donors were collected in accordance with the Declaration of Helsinki under the institutional review board (IRB) protocol 13378 (City of Hope). Human U251 and mouse GL261 glioma cells and RAW264.7 macrophages were from American Type Culture Collection (ATCC, Manassas, VA, USA), whereas RAW-Blue cells were purchased from Invivogen (San Diego, CA). HB1.F3 NSCs (passage 18-24) were provided by Dr. Karen Aboody and previously characterized for clinical use (29), (25), (30). The HB1.F3 cells were derived from telencephalon of a human fetus of 15 week of gestation and were immortalized using a retrovirus encoding v-myc gene as described before (31). Cells were cultured in DMEM supplemented with 10% fetal bovine serum (FBS). All tested cells were cultured for less than 6 months before experiments and tested bimonthly from mycoplasma infections.

Generation of mo-DC and BMM. For the generation of human monocyte-derived DCs (mo-DC), PBMCs were cultured for 6 days in RPMI1640 medium with 10% FBS in a presence of 100 ng/ml GM-CSF and 50 ng/ml IL-4 (Peprotech). Next, cells were seeded on 12-well plate and treated with EV(PBS) and EV(CpG-STAT3ASO) or EV(CpG-STAT3ASO$^{Cy3}$) respectively for 24 h before further studies. For generation of the bone marrow-derived macrophages (BMM), bone-marrow cells from C57BL/6 mice were plated at $2'10^6$ cells/ml in triplicates in RPMI1640, 20% FBS supplemented with 50 ng/ml M-CSF. The medium was replaced on day 4 and the culture was continued until day 7.

Oligonucleotide design and synthesis. The human and mouse specific CpG-STAT3ASO conjugates were synthesized in the DNA/RNA Synthesis Core (COH) by linking CpG-ODNs to STAT3 ASO as previously described (5) and shown below (x, indicates a single C3 unit; underline indicates 2'O methylation; asterisk indicates phosphorothioation site). For internalization studies, oligonucleotides were labeled on 3' ends using Cy3 fluorochrome.

tions or stored at 4° C. for up to one week. The concentration and size distribution profile of the isolated EVs were evaluated using a NanoSight NS300 instrument and NTA 3.2 software. Videos were recorded at camera level 15. Samples were diluted 1:100 in PBS to achieve a concentration of $1\text{-}5\times10^8$ particles/ml. For each sample, three 60 second recordings were analyzed in the batch-processing mode. The molar concentrations of the encapsulated oligonucleotide were estimated using spectrophotometric measurements at 545/575 nm on Cytation5 (BioTek) in relation to the standard curve based on serial dilutions of CpG-STAT3ASO$_{Cy3}$ using non-loaded EVs as a blank control for background subtraction.

Confocal microscopy. NSCs were seeded on 18-wells Chamber Slides (Lab-Tek) and allowed to attach overnight. Next day cells were incubated with indicated dose of CpG-STAT3ASO$_{Cy3}$ for indicated time. After washing, cells were fixed in 4% paraformaldehyde (EMS), permeabilized with Triton-X, blocked with 5% normal serum and incubated with primary antibodies (CD63, Abcam; Rab27A, Cell Signaling) for 18 h. For tissue sections, PFA-fixed tumors were impregnated with 30% sucrose then cut into 10 μm sections using a cryostat followed by the incubation with Iba-1 antibody (Abcam). Next, samples were labeled with Alexa Fluor 488-conjugated secondary antibody, stained with Hoechst33342 and mounted in Vectashield Hard-Set medium (Vector Laboratories). Slides were visualized on an LSM880 confocal microscope (Zeiss) and analyzed using LSM ImageBrowser (Zeiss).

Electron microscopy. The EVs were placed onto 300-mesh carbon-formvar-coated grids and allowed to absorb to the formvar for a minimum of 1 min. Grids were rinsed with double-distilled water and stained for contrast using 1% uranyl acetate. The samples were viewed with an FEI Tecnai T12 transmission electron microscope at 120 keV, and images were taken with a Gatan Ultrascan 2K charge-coupled device (CCD) camera.

Flow cytometry. Mouse cells staining was performed using fluorochrome-labeled antibodies: major histocompatibility complex (MHC) class II, CD11b, F4/80, Gr-1, CD40, CD45, CD80, CD86 (eBioscience). Unspecific binding was blocked with anti-FcγIII/IIR (eBioscience). For viability assessment, cells were stained using APC Annexin V apoptosis detection kit I (BD Biosciences). For EVs phenotyping, isolated vesicles were incubated with anti-CD63 beads (Invitrogen) according to manufacturer's instruction, then stained with fluorochrome-labeled CD9, CD63 and CD81

```
SEQ ID NO: 33: human CpG-STAT3ASO-(CpG-D19 ODN + human STAT3 ASO):
5' G*G*TGCATCGATGCAG*G*G*G*G-xxxxx-
C*A*G*C*A*G*A*T*C*A*A*G*T*C*C*A*G*G*G*A 3'.

SEQ ID NO: 34: mouse CpG-STAT3ASO-(CpG1668 ODN + mouse STAT3 ASO):
5' T*C*C*A*T*G*A*C*G*T*T*C*C*T*G*A*T*G* C*T-xxxxx-
G*A*C*T*C*T*T*G*C*A*G*G*A*A*T*C*G*G*C*T 3'
```

NSC loading and isolation of extracellular vesicles. Neural stem cells were cultured for 18 h in DMEM with exosome-free 10% FBS (exosomes removed by 16 h ultra-centrifugation at 110,000×g). Next day, cells were incubated with or without 0.5-5 μM CpG-STAT3ASO. After 24 h culture medium was briefly centrifuged 2000×g, filtered through 0.22 μm filter (Millipore) followed by EV isolation using Total Exosome Isolation Reagent (Invitrogen) according to manufacturer's instruction. EVs pellets were resuspended in filtered PBS, then used for downstream applicaantibodies (eBioscience). Fluorescence data was acquired on Attune NxT Flow Cytometer (Invitrogen) and analyzed using FlowJo software (TreeStar).

Migration assay. NSCs were treated with indicated doses of CpG-STAT3ASO for 24 h. Next, cells were seeded on gelatin-coated transwell inserts (Corning) in DMEM supplemented 0.5% BSA. The lower chamber was filled with DMEM 10% FBS, then cells were permitted to migrate for 18 h. Next, cells were fixed in 4% paraformaldehyde and stained with 0.2% crystal violet. Images were acquired on Observer Z1 Live Cell (Zeiss), and the number of migrated cells was quantified using ImageJ (NIH), from at least 4 view fields.

Quantitative real-time PCR. Total RNA was extracted from cultured or in vivo grown tumor cells using Maxwell system (Promega, Madison, WI) and then transcribed into cDNAs using iScript cDNA Synthesis kit (Bio-Rad, Hercules, CA). The qPCR was carried out using specific primers for IL12A, STAT3, ACTB and UBQ using CFX96 Real-Time PCR Detection System (Bio-Rad), as previously described (5).

Glioblastoma mouse models. C57BL/6 mice, aged between 6-8 weeks, were purchased from the Jackson Laboratory (Bar Harbor, ME). Mouse care and experimental procedures were performed under pathogen-free conditions in accordance with established institutional guidance and approved protocols from Institutional Animal Care and Use Committees. For assessment of NSCs/EVs delivery and activity in brain TME, $1 \times 10^5$ GL261 were injected intracranially (IC) into frontal lobe. After 7 days, mice were treated intracranially (caudal-lateral to tumor) with Sham (4 µl), CpG-STAT3ASO alone (75 ng/4 µl Sham), NSCs alone and NSCs loaded with 204 of CpG-STAT3ASO or CpG-STAT3ASO$^C_{y3}$ (NSC+CpG-STAT3ASO or NSC+CpG-STAT3ASO$^C_{y3}$ respectively; $5 \times 10^5$ cells/4 µl Sham) for indicated time. Single cell suspension was prepared using Brain Dissociation Kit (Miltenyi Biotec), according to manufacturer's instructions, then analyzed using flow cytometry. For tumor growth experiments, $5 \times 10^5$ GL261 cells were injected subcutaneously (SC). When tumors reached ~50 mm$^3$ size, mice were treated intratumorally (IT) with PBS, $1 \times 10^6$ cells NSCs alone [$1 \times 10^6$ cells], $1 \times 10^6$ cells NSCs treated with 2 µM of CpG-STAT3ASO (NSC+CpG-STAT3ASO) or equivalent 2 ug CpG-STAT3ASO alone. Tumor size was measured every other day for indicated time period.

Statistics. Unpaired t test was used to calculate two-tailed P value to estimate statistical significance of differences between two treatment groups. One- or two-way ANOVA followed by Bonferroni post-test were applied to assess the differences between multiple groups or in tumor growth kinetics experiments. Statistically significant P values were indicated in figures as follows: *, $P<0.001$; , $P<0.01$ and *, $P<0.05$. Data were analyzed using Prism software v. 6.01 (GraphPad).

Results

Figure 12B:
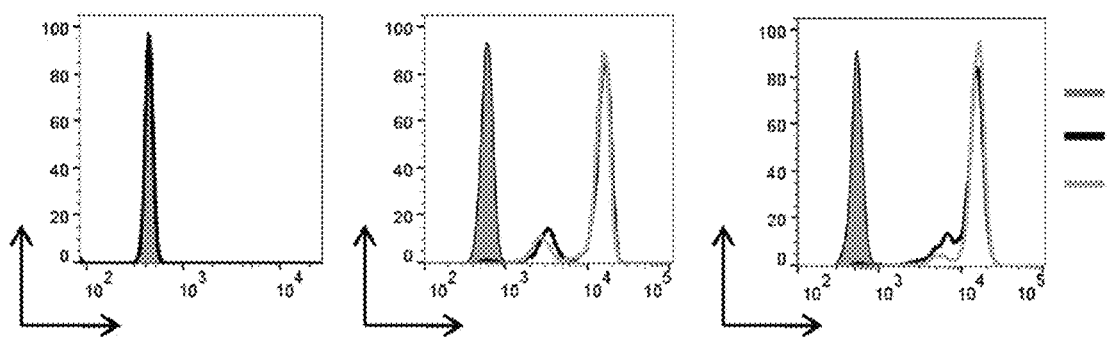
Figure 12C:
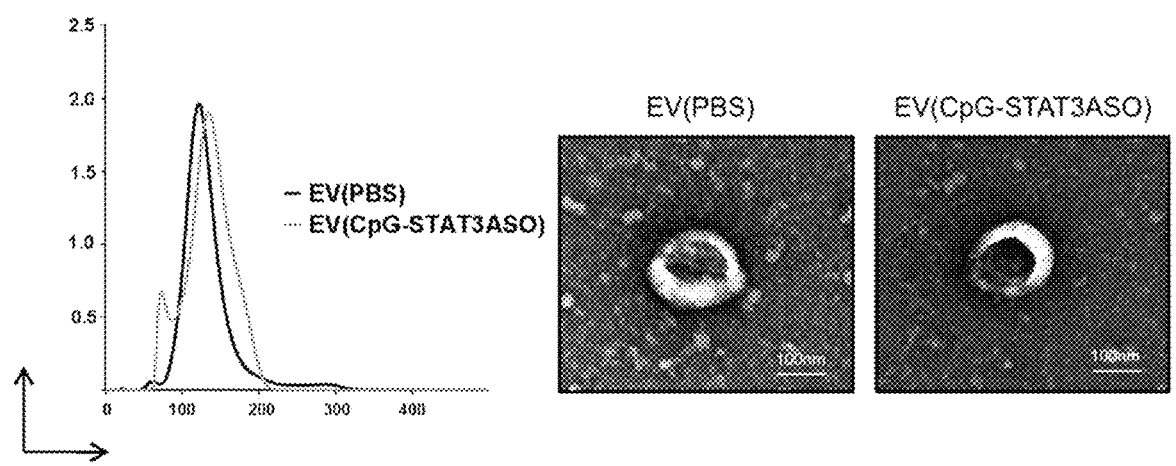
Figure 17:
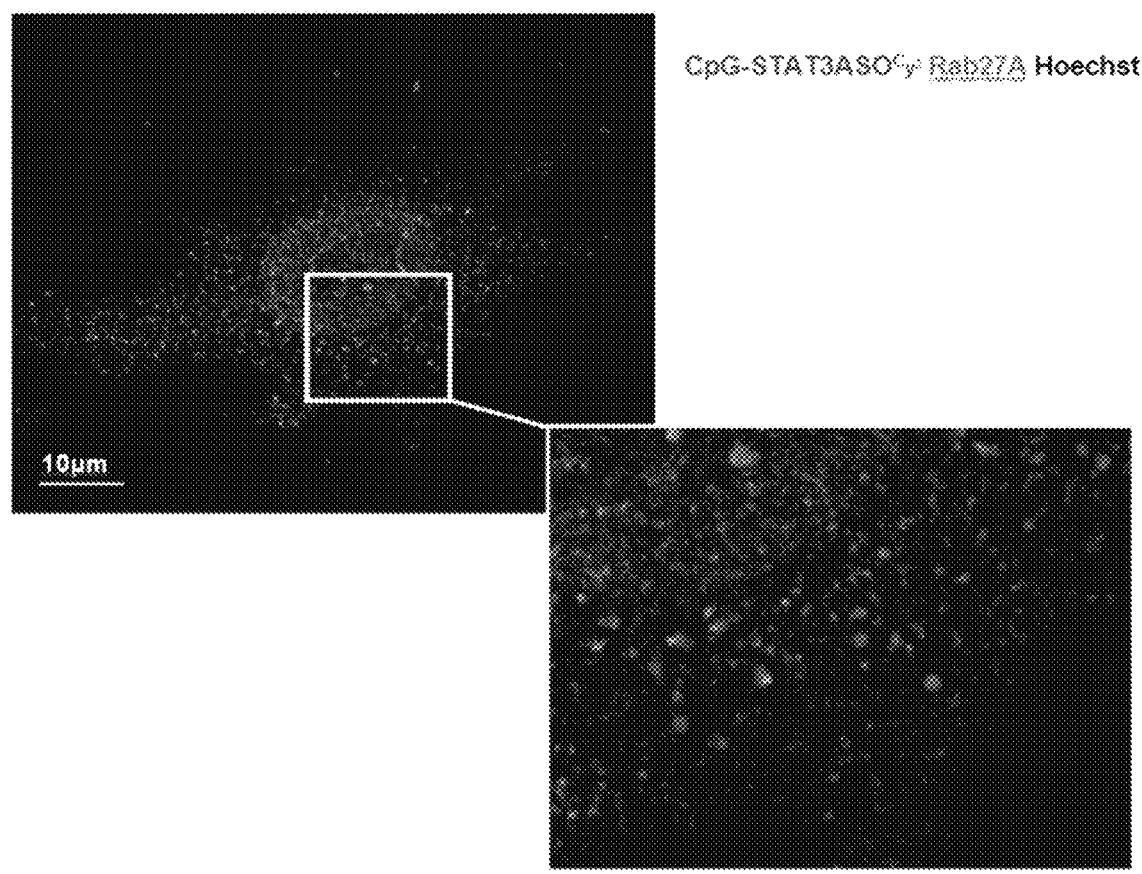
FIG. 17 shows CpG-STAT3ASO$^{C}_{y3}$ indicates co-localization with Rab27A. NSCs were treated with 250 nM of CpG-STAT3ASO$_{y3}$ for 24 h. Next, cells were fixed and stained with anti-Rab27A antibody. Image was acquired using Zeiss LSM confocal microscope. Shown are representative images, scale bar=10 μm.

NSCs encapsulated CpG-STAT3ASO into extracellular vesicles. The inventors previously describe the mechanism of CpG-STAT3ASO uptake and internalization by various cancer cells (5). Here, the inventors first showed that NSCs increasingly internalized CpG-STAT3ASO within 24 h incubation by quantifying the fluorescence intensity of Cy3-labeled CpG-STAT3 ASO using flow cytometry (FIG. 12A, left panel). Confocal imaging also indicated that the internalized Cy3-labeled CpG-STAT3ASO colocalized with cellular vesicles stained with CD63 in NSCs (FIG. 12A, right panel). Additionally, internalized CpG-STAT3ASO showed colocalization with Rab27A (FIG. 17), indicating involvement in EVs' loading machinery (32, 33). To further identify extracellular vesicles isolated from NSCs, expression of surface antigens CD9, CD63 and CD81 specific for exosomes immunoprecipitated on CD63 beads was assessed by flow cytometry (FIG. 12B). Compared to PBS treatment, administration of CpG-STAT3ASO to NSCs did not compromise the expression of exosomal markers CD63 and CD81, evidenced by almost identical profiles in flow cytometry. To characterize exosomes secreted by NSCs, the size of exosomes was determined by NanoSight NS300 and TEM, ranging from 100-200 nm (FIG. 12C). Exosomes isolated from NSCs treated with PBS or CpG-STAT3ASO showed comparable diameter, indicating that treatment of CpG-STAT3ASO did not dramatically alternate the size of EVs. Altogether, these results demonstrate the ability of NSCs to encapsulate CpG-STAT3ASO into extracellular vesicles.

Figure 13A:
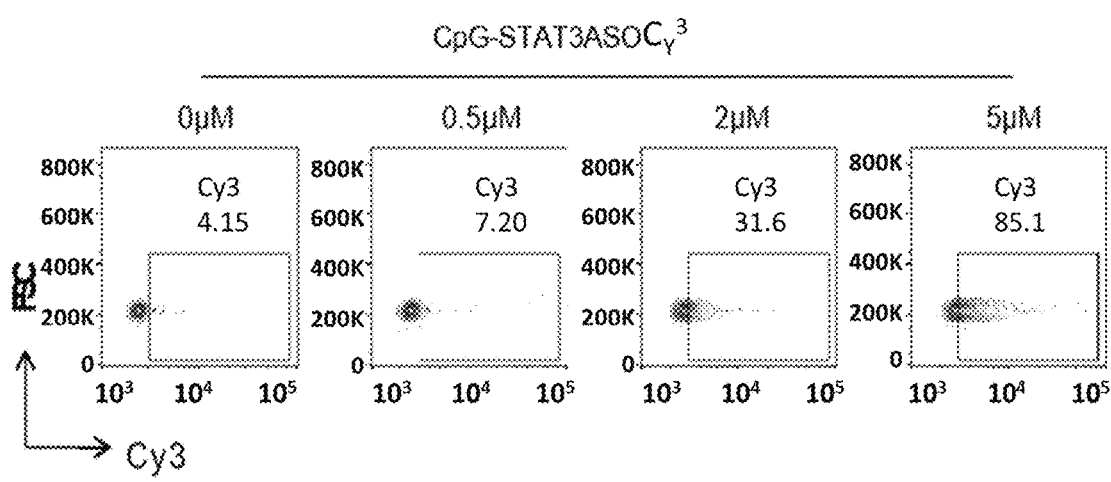
FIGS. 13A-13C show CpG-STAT3ASO loading efficiency is proportional to ODNs concentration.
Figure 13B:
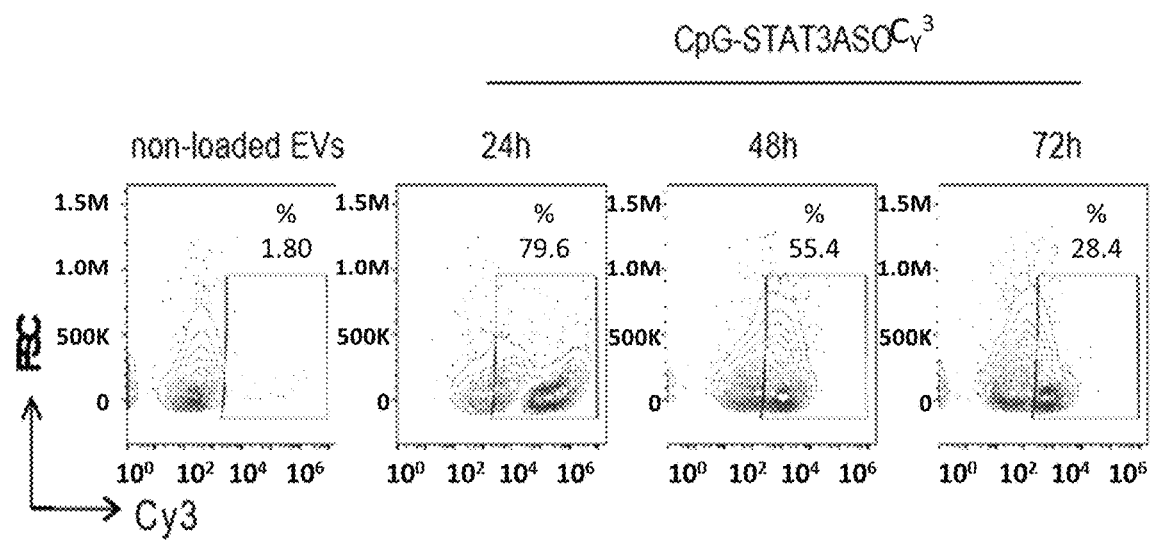
Figure 13C:
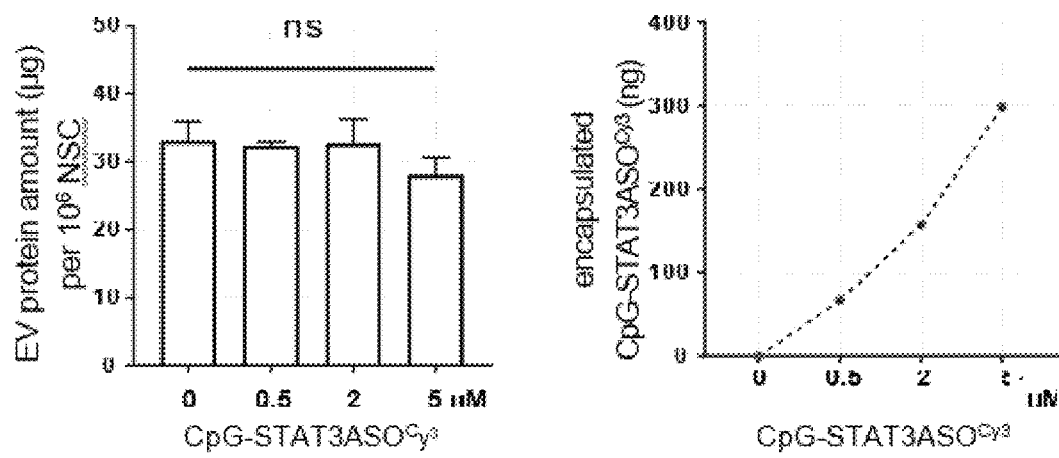
Figure 20A:
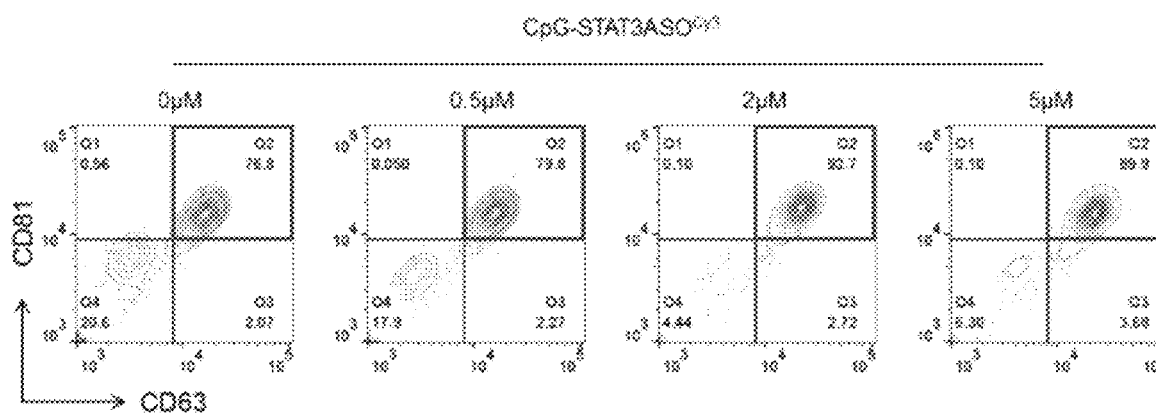
FIGS. 20A-20B show Gating strategy for flow cytometry.
Figure 20B:
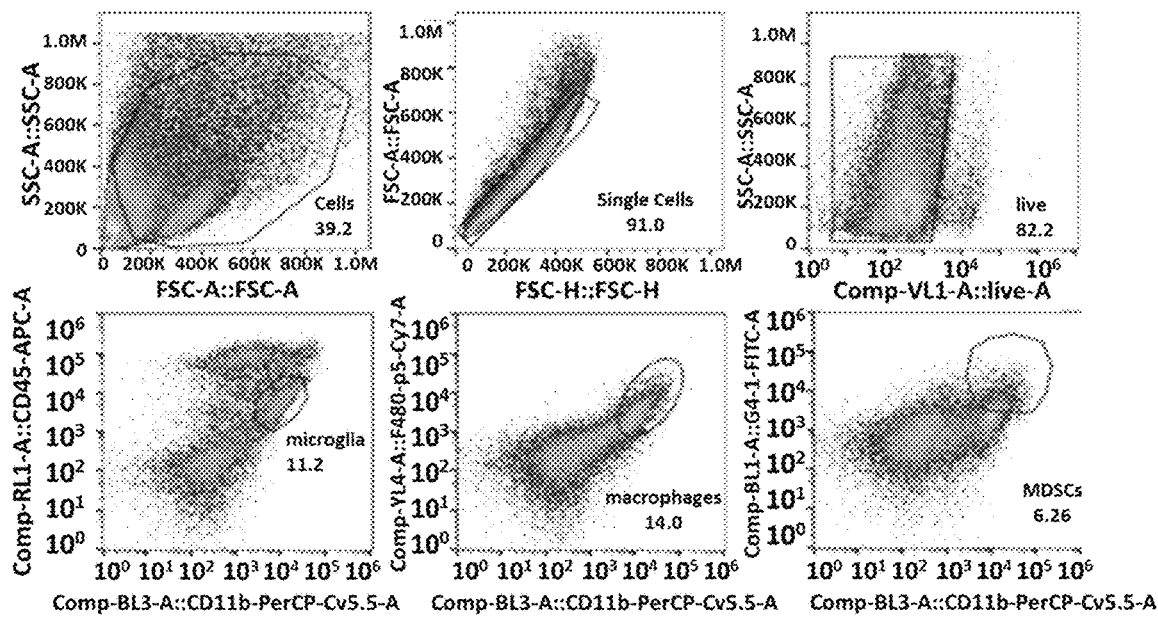

CpG-STAT3ASO encapsulation follows time and dose-dependency. It is well established that genetic engineering of mesenchymal stem cells (MSC) enables production of exosomes loaded with nucleic acids, such as miRNA and siRNA (34). The inventors sought to investigate the kinetics of CpG-STAT3ASO encapsulation by NSCs. First, CpG-STAT3ASO-loaded exosomes within CD63$^+$CD81$^+$ vesicles population was confirmed by flow cytometry (FIG. 20A). Afterwards, the loading efficiency was determined by varying the concentration of CpG-STAT3ASO from 0 to 5 uM and the time of treatment from 24 h to 72 h. As shown in FIG. 13A, the loading efficiency was proportional to the dose of CpG-STAT3ASO to treat NSCs, while it was not linearly correlated with incubation time, and primed at 24 h treatment. Notably, CpG-STAT3ASO treated NSCs produced encapsulated EVs up to 3 days, as demonstrated in FIG. 20B. The kinetics of EVs encapsulation indicated gradual reduction in percentage of Cy3 positive vesicles, from around 80% after 24 h, through about 50% after 48 h to about 30% after 72 h, respectively. To determine the concentration of CpG-STAT3ASO encapsulated in exosomes, the protein content of NSC-derived exosomes was first determined by bicinchoninic acid assay (BCA assay) after treatment of the indicated concentration of Cy3-labeled CpG-STAT3ASO. The administration amount of CpG-STAT3ASO did not alter total protein content of exosomes secreted by NSCs (FIG. 13C, left panel), while it determined the amount of CpG-STAT3ASO loaded into exosomes (FIG. 13C, right panel). By quantifying and normalizing the fluorescence intensity of Cy3, the inventors generated the correlation of exosomes protein amount produced by 10$^6$ NSC cells and CpG-STAT3ASO concentration used for loading. Overall, these findings confirm that EVs' loading kinetics provided a time frame facilitating therapeutic use of CpG-STAT3ASO-loaded NSCs.

Figure 18A:
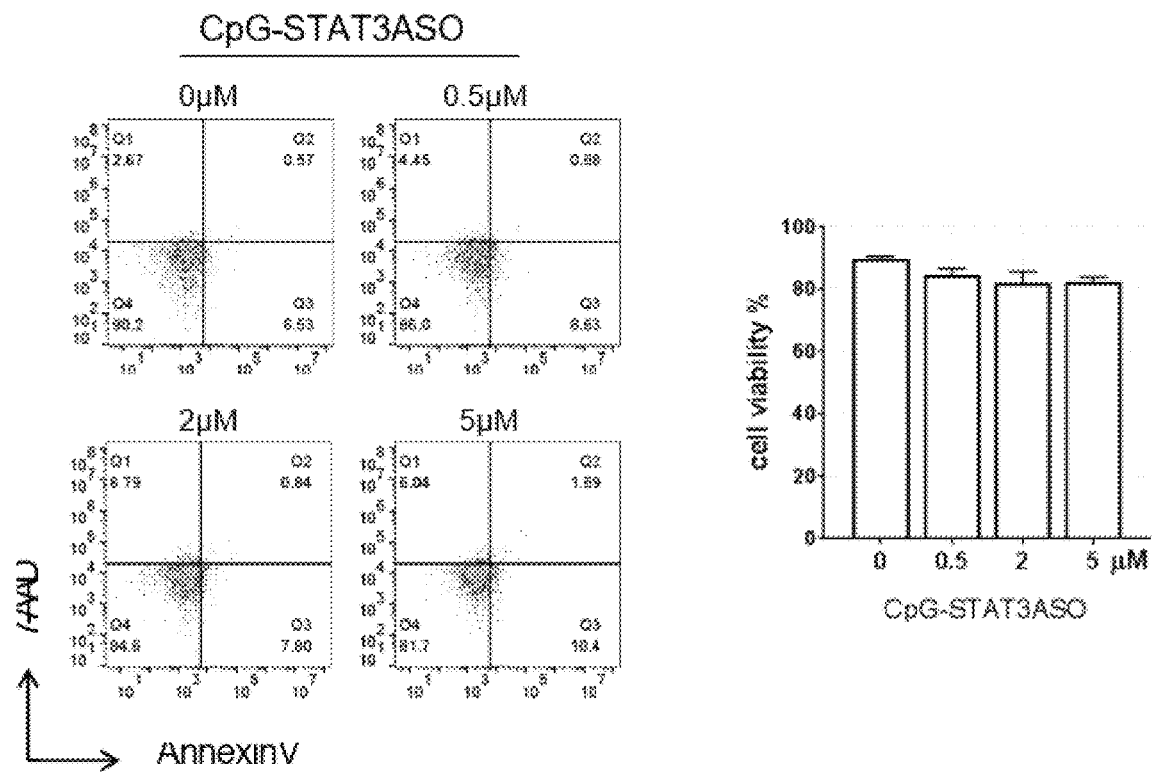
FIGS. 18A-18B show Treatment of NSCs with CpG-STAT3ASO does not affect cell viability but influences cells migration.
Figure 18B:
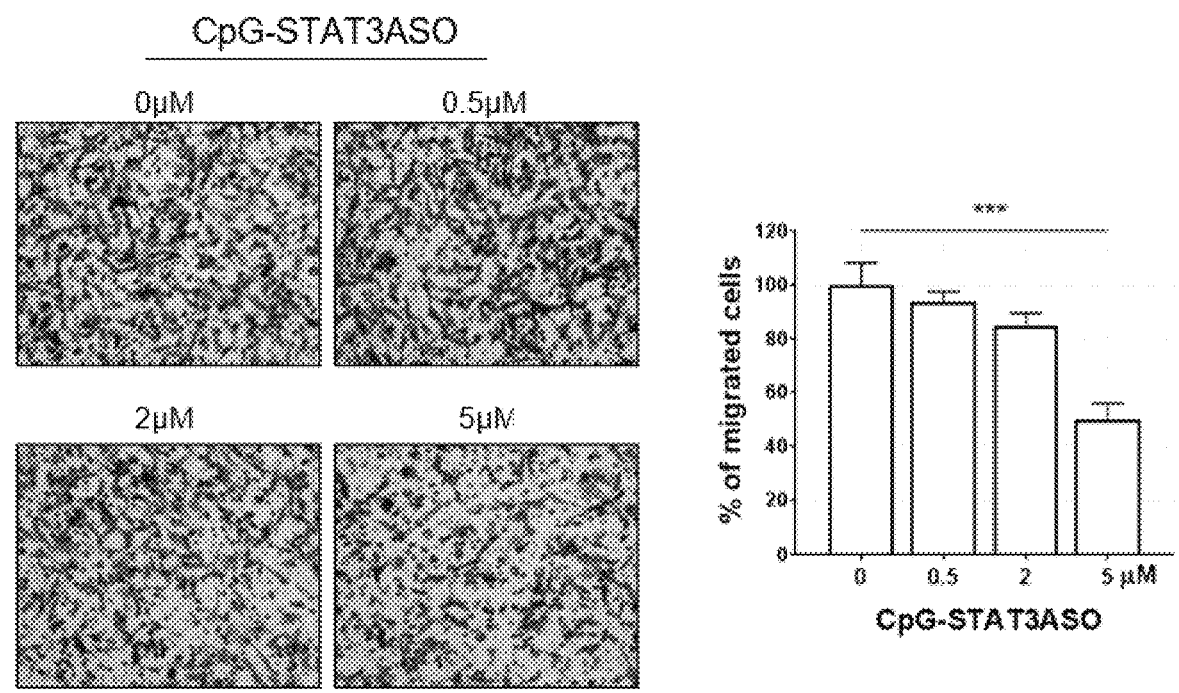

NSCs loading with CpG-STAT3ASO does not affect cells' viability, but can reduce migration capacity. NSCs migration capacity and cells viability remain major concern regarding brain delivery (29). To determine the impact of CpG-STAT3ASO on NSCs, the cellular viability was assessed by quantifying the percentage of 7-AAD+Annexin V$^+$ NSCs treated with different concentration of CpG-STAT3ASO. The flow cytometry data indicated that CpG-STAT3ASO, up to 5 uM, did not cause significant apoptosis or cell death to NSCs after 24 h (FIG. 18A). However, using transwell migration assay, it was found that approximately 50% NSCs migrated when treated with 5 uM CpG-STAT3ASO for 24 h (FIG. 18B), implying a side effect of high-dose CpG-STAT3ASO on NSCs. Given these data, the inventors used 2 µM of CpG-STAT3ASO for NSCs loading for future experiments, including animal experiments.

Figure 14A:
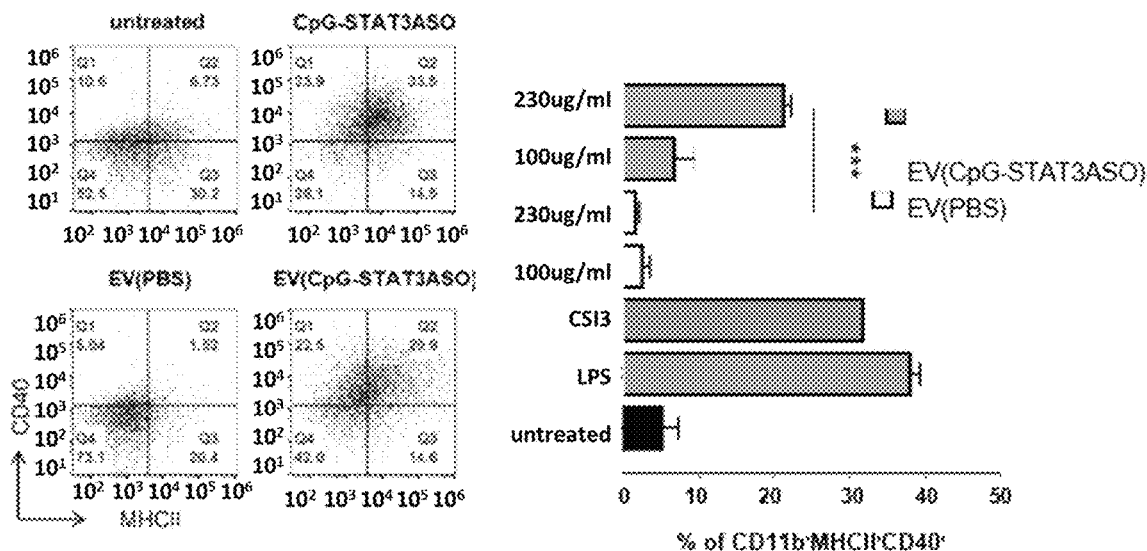
FIGS. 14A-14C show NSC-derived EV(CpG-STAT3ASO) exhibit immunomodulatory properties.
Figure 14B:
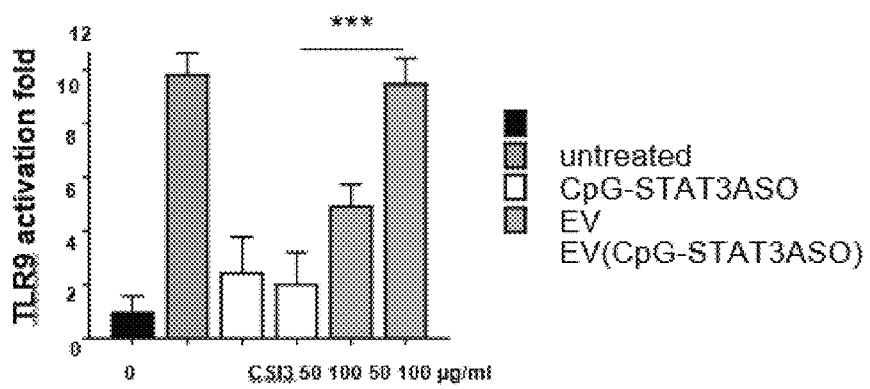
Figure 14C:
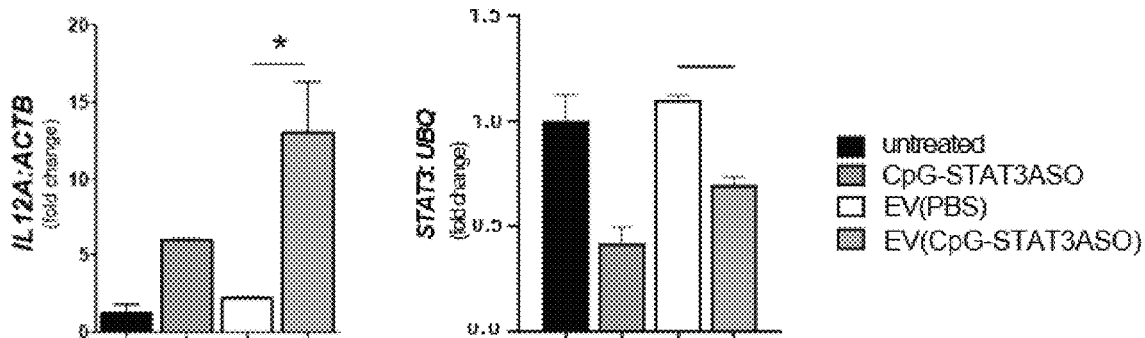

EV-encapsulated CpG-STAT3ASO retain immunomodulatory potential. Unformulated CpG-STAT3 inhibitors have been shown to trigger APCs maturation and antigen presentation (5, 35-37), yet their functionality has never been tested while encapsulated into exosomes. To evaluate the efficacy of NSC-derived EV-encapsulated CpG-STAT3ASO, mouse bone marrow derived-macrophages (BMM) were treated with indicated does of EVs derived from NSCs treated with PBS (EV(PBS)) and CpG-STAT3ASO (EV(CpG-STAT3ASO) for 24 h. BMM treatment with EV(CpG-STAT3ASO) indicated around 20% increase in the population of activated and maturated CD11b$^+$CD40$^+$MHC$^{hi}$ macrophage, comparing to EV(PBS) (FIG. 14A). Intriguingly, treatment with EV(PBS) appeared to inhibit macrophage activation, suggesting immunosuppressive properties of NSCs-derived EVs, similarly as reported previously (38-40). In addition, RawBlue reporter cells treated with EV(CpG-STAT3ASO) for 24 h, could induce nearly 10-fold increase of TLR9 activation (FIG. 14B), proving that exosomal content remains functional intracellularly. To further illustrate efficacy of EV(CpG-STAT3ASO), monocyte-derived dendritic cells (mo-DC) differentiated from human monocytes were treated with naked CpG-STAT3ASO, and exosomes encapsulated CpG-STAT3ASO (EV(CpG-STAT3ASO)) for 24 h. Next, the mRNA level of IL-12 and STAT3 were determined by qPCR separately. Of note, compared to untreated group, EV(CpG-STAT3ASO) demonstrated marked bioactivity in vitro, characterized by significant increase of IL-12 and inhibition of STAT3 in mo-DC (FIG. 14C). Altogether, these experiments demonstrated that the encapsulation does not affect immunomodulatory potential of CpG-STAT3ASO.

Figure 15A:
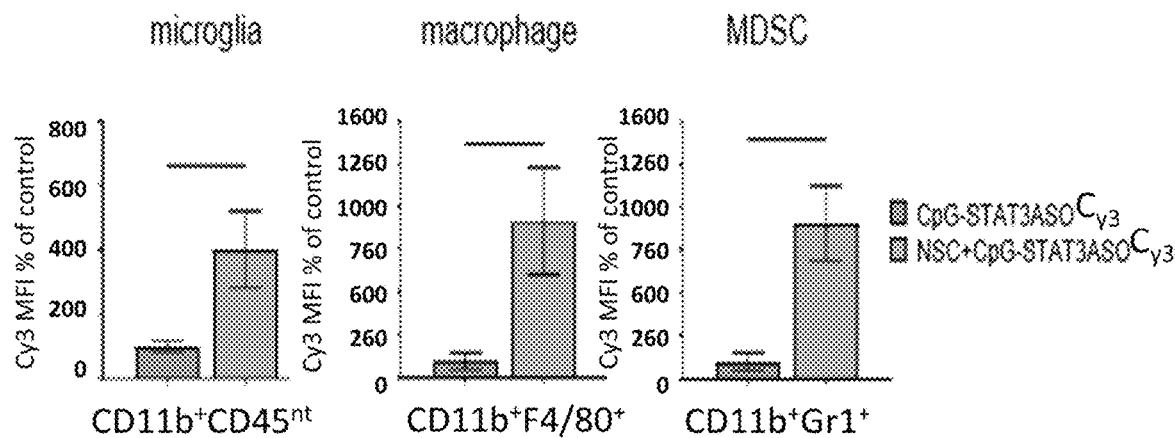
FIGS. 15A-15C show EV-encapsulated CpG-STAT3ASO targets and activates immune cells.
Figure 15B:
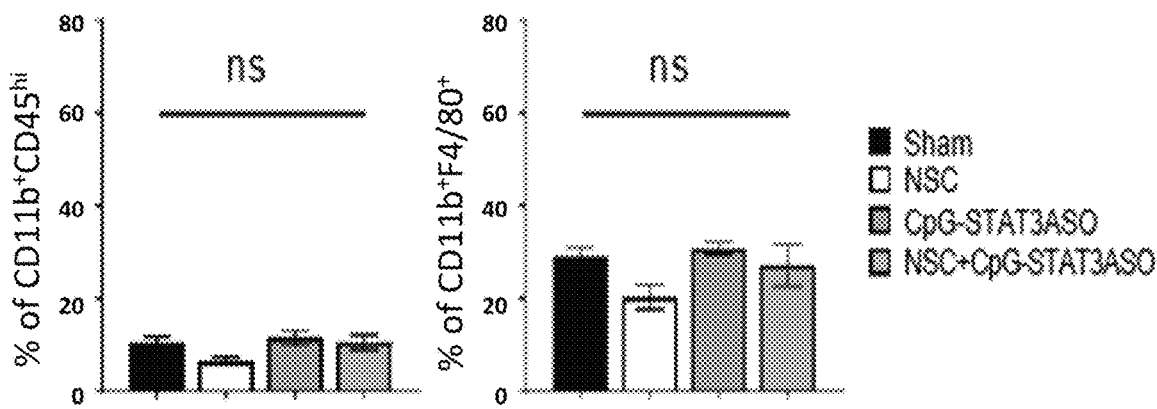
Figure 15C:
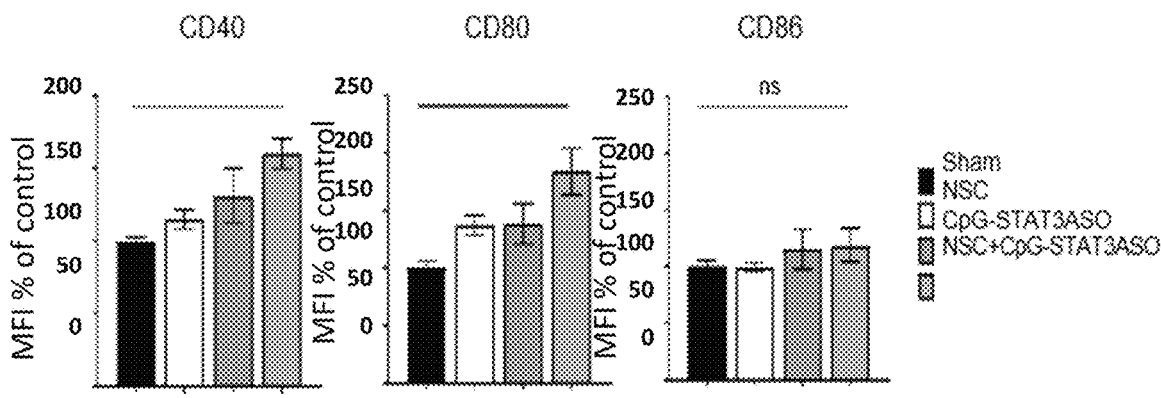
Figure 19:
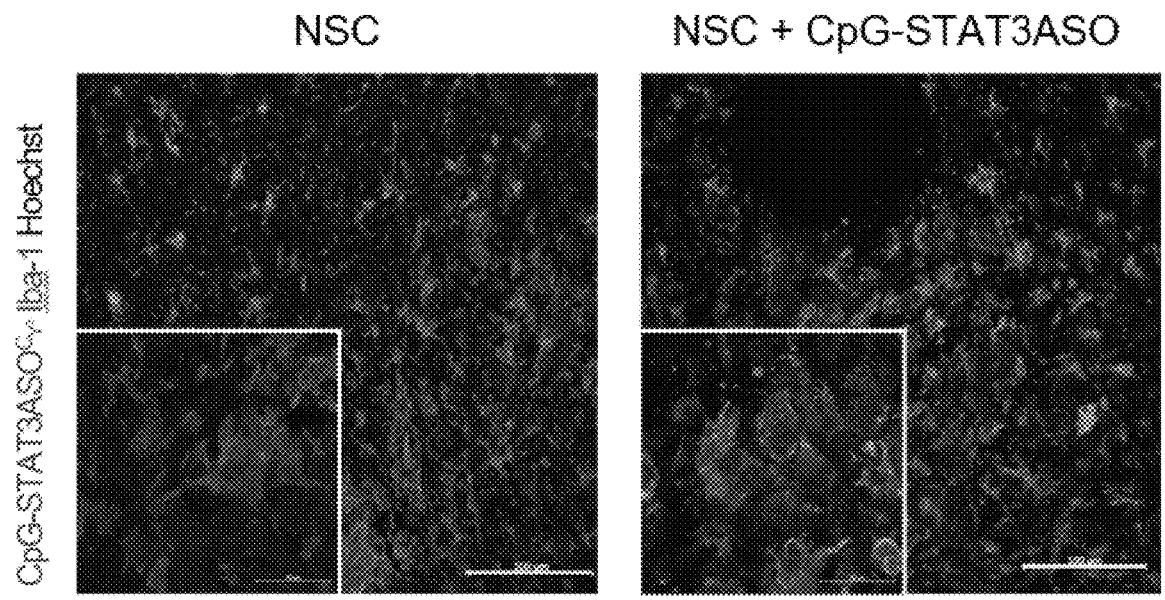
FIG. 19 shows CpG-STAT3ASO-loaded NSC deliver oligonucleotide to GL261 glioma-associated macrophages. NSCs preloaded for 24 h with CpG-STAT3ASO$_{y3}$ were injected intracranially to syngeneic GL261 glioma tumors. After 24 h mice were euthanized, and whole-brain sections were subsequently stained for microglia cells marker (Iba-1) and images were acquired on Zeiss LSM confocal microscope. Shown are representative images for each group (n=4). Scale bar=100 μm.

NSCs deliver EV(CpG-STAT3ASO) to glioblastoma tumor microenvironment. Glioblastoma therapy remains very challenging due to limited access to tumor microenvironment. NSCs have been shown to effectively migrate and deliver an active cargo to the brain site (25,30). To explore the application of EV(CpG-STAT3ASO) in vivo, NSCs pretreated with Cy3-labeled CpG-STAT3ASO were injected intracranially to syngeneic GL261 glioma tumors. After 24 h, single cell suspension was subjected to flow cytometry. As a result, intracranial treatment with NSCs pretreated with CpG-STAT3ASO$_{y3}$ (NSC+CpG-STAT3ASO$_{y3}$) showed significant increase in Cy3 fluorescence intensity in all analyzed cell populations. Effective delivery to microglia cells in brain TME was also confirmed with immunofluorescence analysis, indicating that CpG-STAT3ASO$^C_{y3}$ colocalizes with Iba-1 positive cells, 24 h after treatment with pre-loaded-NSCs (FIG. 19). The estimation of CpG-STAT3ASO amount produced by NSCs is variable and depends on the time, thus naked CpG-STAT3ASO was used primarily as a positive control, rather than as a comparison. Nevertheless, the inventors attempted to estimate that 1×10$^6$ NSC treated with 2 µM CpG-STAT3ASO produce about 150 ng of EV(CpG-STAT3ASO$^C_{y3}$), as indicated in FIG. 13C right panel. It is the best estimation that could have used for the sake of comparison. As a result, treatment with NSC+CpG-STAT3ASO$^C_{y3}$ resulted in Cy3 signal average 4 times higher in microglia (CD11b$^+$CD45$^{hi}$), 9 times higher in macrophages (CD11b$^+$F4/80$^+$) and MDSC (CD11b$^+$Gr1$^+$), compared to CpG-STAT3ASO$^C_{y3}$ alone (FIG. 15A). Interestingly, treatment did not affect the composition of TME, as the percentage of microglia and macrophage populations did not change (FIG. 15B). However, analysis of macrophage maturation markers revealed, that the NSC+CpG-STAT3ASO treatment manifested in 60% increase of CD40 and 80% of CD80 co-stimulatory molecules (FIG. 15D). CD86 expression remained without significant changes. These results demonstrated that CpG-STAT3ASO-loaded NSCs can be used for glioblastoma immunotherapy.

Figure 16:
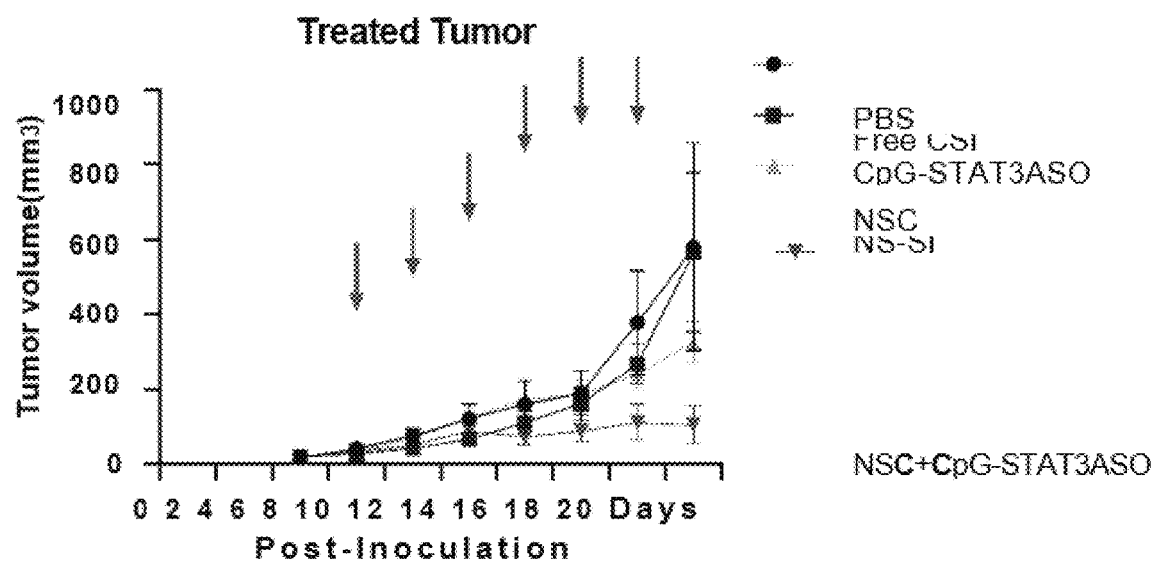
FIG. 16 shows CpG-STAT3ASO-loaded NSCs inhibit growth of GL261 tumors in vivo. Mice with established tumors were treated using every other day intratumoral injections of 10$^6$ NSCs alone, 10$^6$ NSCs loaded with CpG-STAT3ASO, equivalent amount of CpG-STAT3ASO alone (0.05 mg/kg, 20' lower than normal effective dose) or PBS. Tumor growth were measured using caliper; shown are means±SEM (n=5).

NSC+CpG-STAT3ASO induces regression of syngeneic glioblastoma. TLR9 triggering with simultaneous STAT3 inhibition exerts a potent anti-tumor response in numerous cancer, including acute myeloid leukemia (AML)(41), B cell lymphoma (BCL)(6) and prostate cancer (5). Thus, the inventors assessed the antitumor efficacy of CpG-STAT3ASO-loaded NSCs in comparison to naked oligonucleotides or NSCs alone in the mouse GL261 glioma model in mice. Mice with established tumors were treated using every other day intratumoral injections of 10$^6$ NSCs alone, 10$^6$ NSCs loaded with CpG-STAT3ASO, equivalent amount of CpG-STAT3ASO alone (0.05 mg/kg, 20× lower than normal effective dose) or PBS. As shown in FIG. 16, the CpG-STAT3ASO-loaded NSCs significantly inhibited GL261 tumor growth while control treatments, including low dose of naked CpG-STAT3ASO failed to control tumor progression.

References for Example 4 (1) Gabrilovich D I. Myeloid-Derived Suppressor Cells. Cancer Immunol Res. 2017; 5:3-8. (2) Wang T, Niu G, Kortylewski M, Burdelya L, Shain K, Zhang S, et al. Regulation of the innate and adaptive immune responses by Stat-3 signaling in tumor cells. Nat Med. 2004; 10:48-54. (3) Kortylewski M, Swiderski P, Herrmann A, Wang L, Kowolik C, Kujawski M, et al. In vivo delivery of siRNA to immune cells by conjugation to a TLR9 agonist enhances antitumor immune responses. Nat Biotechnol. 2009; 27:925-32. (4) Liu H, Moynihan K D, Zheng Y, Szeto G L, Li A V, Huang B, et al. Structure-based programming of lymph-node targeting in molecular vaccines. Nature. 2014; 507:519-22. (5) Moreira D, Adamus T, Zhao X, Su Y-L, Zhang Z, White S V, et al. STAT3 Inhibition Combined with CpG Immunostimulation Activates Antitumor Immunity to Eradicate Genetically Distinct Castration-Resistant Prostate Cancers. Clin Cancer Res. 2018; 24:5948-62. (6) Zhao X, Zhang Z, Moreira D, Su Y-L, Won H, Adamus T, et al. B Cell Lymphoma Immunotherapy Using TLR9-Targeted Oligonucleotide STAT3 Inhibitors. Mol Ther. 2018; 26:695-707. (7) Khvorova A, Watts J K. The chemical evolution of oligonucleotide therapies of clinical utility. Nat Biotechnol. 2017; 35:238-48. (8) Tkach M, Théry C. Communication by extracellular vesicles: where we are and where we need to go. Cell. 2016; 164:1226-32. (9) Janas T, Janas M M, Sapoń K, Janas T. Mechanisms of RNA loading into exosomes. FEBS Lett. 2015; 589:1391-8. (10) Lotvall J, Hill A F, Hochberg F, Buzás E I, Di Vizio D, Gardiner C, et al. Minimal experimental requirements for definition of extracellular vesicles and their functions: a position statement from the International Society for Extracellular Vesicles. J Extracell Vesicles. 2014; 3:26913. (11) Wiklander O P B, Nordin J Z, O'Loughlin A, Gustafsson Y, Corso G, Mäger I, et al. Extracellular vesicle in vivo biodistribution is determined by cell source, route of administration and targeting. J Extracell Vesicles. 2015; 4:26316. (12) Xu R, Rai A, Chen M, Suwakulsiri W, Greening D W, Simpson R J. Extracellular vesicles in cancer—implications for future improvements in cancer care. Nat Rev Clin Oncol. 2018; 15:617-38. (13) Kalluri R. The biology and function of exosomes in cancer. J Clin Invest. 2016. (14) Chen G, Huang A C, Zhang W, Zhang G, Wu M, Xu W, et al. Exosomal PD-L1 contributes to immunosuppression and is associated with anti-PD-1 response. Nature. 2018; 560:382-6. (15) Hoshino A, Costa-Silva B, Shen T-L, Rodrigues G, Hashimoto A, Tesic Mark M, et al. Tumour exosome integrins determine organotropic metastasis. Nature. 2015; 527: 329-35. (16) Chalmin F, Ladoire S, Mignot G, Vincent J, Bruchard M, Remy-Martin J-P, et al. Membrane-associated Hsp72 from tumor-derived exosomes mediates STAT3-dependent immunosuppressive function of mouse and human myeloid-derived suppressor cells. J Clin Invest. 2010; 120: 457-71. (17) Ferguson S W, Nguyen J. Exosomes as therapeutics: The implications of molecular composition and exosomal heterogeneity. J Control Release. 2016; 228:179-

90. (18) Bell B M, Kirk I D, Hiltbrunner S, Gabrielsson S, Bultema J J. Designer exosomes as next-generation cancer immunotherapy. Nanomedicine. 2016; 12:163-9. (19) Yuan D, Zhao Y, Banks W A, Bullock K M, Haney M, Batrakova E, et al. Macrophage exosomes as natural nanocarriers for protein delivery to inflamed brain. Biomaterials. 2017; 142: 1-12. (20) Tominaga N, Yoshioka Y, Ochiya T. A novel platform for cancer therapy using extracellular vesicles. Adv Drug Deliv Rev. 2015; 95:50-5. (21) Zhuang X, Xiang X, Grizzle W, Sun D, Zhang S, Axtell R C, et al. Treatment of brain inflammatory diseases by delivering exosome encapsulated anti-inflammatory drugs from the nasal region to the brain. Mol Ther. 2011; 19:1769-79. (22) Alvarez-Erviti L, Seow Y, Yin H, Betts C, Lakhal S, Wood M J A. Delivery of siRNA to the mouse brain by systemic injection of targeted exosomes. Nat Biotechnol. 2011; 29:341-5. (23) Kamerkar S, LeBleu V S, Sugimoto H, Yang S, Ruivo C F, Melo S A, et al. Exosomes facilitate therapeutic targeting of oncogenic KRAS in pancreatic cancer. Nature. 2017; 546:498-503. (24) Cheung A S, Koshy S T, Stafford A G, Bastings M M C, Mooney D J. Adjuvant-Loaded Subcellular Vesicles Derived From Disrupted Cancer Cells for Cancer Vaccination. Small. 2016; 12:2321-33. (25) Aboody K S, Brown A, Rainov N G, Bower K A, Liu S, Yang W, et al. Neural stem cells display extensive tropism for pathology in adult brain: evidence from intracranial gliomas. Proc Natl Acad Sci USA. 2000; 97:12846-51. (26) Taylor D D, Shah S. Methods of isolating extracellular vesicles impact down-stream analyses of their cargoes. Methods. 2015; 87:3-10. (27) Mateescu B, Kowal E J K, van Balkom B W M, Bartel S, Bhattacharyya S N, Buzás E I, et al. Obstacles and opportunities in the functional analysis of extracellular vesicle RNA—an ISEV position paper. J Extracell Vesicles. 2017; 6:1286095. (28) Kooijmans S A A, Stremersch S, Braeckmans K, de Smedt S C, Hendrix A, Wood M J A, et al. Electroporation-induced siRNA precipitation obscures the efficiency of siRNA loading into extracellular vesicles. J Control Release. 2013; 172:229-38. (29) Aboody K S, Najbauer J, Metz M Z, D'Apuzzo M, Gutova M, Annala A J, et al. Neural stem cell-mediated enzyme/prodrug therapy for glioma: preclinical studies. Sci Transl Med. 2013; 5:184ra59. (30) Barish M E, Herrmann K, Tang Y, Argalian Herculian S, Metz M, Aramburo S, et al. Human neural stem cell biodistribution and predicted tumor coverage by a diffusible therapeutic in a mouse glioma model. Stem Cells Transl Med. 2017; 6:1522-32. (31) Zhao D, Najbauer J, Garcia E, Metz M Z, Gutova M, Glackin C A, et al. Neural stem cell tropism to glioma: critical role of tumor hypoxia. Mol Cancer Res. 2008; 6:1819-29. (32) Pfeffer S R. Two Rabs for exosome release. Nat Cell Biol. 2010; 12:3-4. (33) Ostrowski M, Carmo N B, Krumeich S, Fanget I, Raposo G, Savina A, et al. Rab27a and Rab27b control different steps of the exosome secretion pathway. Nat Cell Biol. 2010; 12:19-30; sup pp 1. (34) Vakhshiteh F, Atyabi F, Ostad S N. Mesenchymal stem cell exosomes: a two-edged sword in cancer therapy. Int J Nanomedicine. 2019; 14:2847-59. (35) Zhang Q, Hossain D M S, Nechaev S, Kozlowska A, Zhang W, Liu Y, et al. TLR9-mediated siRNA delivery for targeting of normal and malignant human hematopoietic cells in vivo. Blood. 2013; 121:1304-15. (36) Hossain D M S, Dos Santos C, Zhang Q, Kozlowska A, Liu H, Gao C, et al. Leukemia cell-targeted STAT3 silencing and TLR9 triggering generate systemic antitumor immunity. Blood. 2014; 123:15-25. (37) Zhang Q, Hossain D M S, Duttagupta P, Moreira D, Zhao X, Won H, et al. Serum-resistant CpG-STAT3 decoy for targeting survival and immune checkpoint signaling in acute myeloid leukemia. Blood. 2016; 127:1687-700. (38) Cosenza S, Toupet K, Maumus M, Luz-Crawford P, Blanc-Brude O, Jorgensen C, et al. Mesenchymal stem cells-derived exosomes are more immunosuppressive than microparticles in inflammatory arthritis. Theranostics. 2018; 8:1399-410. (39) Xie M, Xiong W, She Z, Wen Z, Abdirahman A S, Wan W, et al. Immunoregulatory Effects of Stem Cell-Derived Extracellular Vesicles on Immune Cells. Front Immunol. 2020; 11:13. (40) Harrell C R, Jovicic N, Djonov V, Arsenij evic N, Volarevic V. Mesenchymal Stem Cell-Derived Exosomes and Other Extracellular Vesicles as New Remedies in the Therapy of Inflammatory Diseases. Cells. 2019; 8. (41) Hossain D M S, Pal S K, Moreira D, Duttagupta P, Zhang Q, Won H, et al. TLR9-Targeted STAT3 Silencing Abrogates Immunosuppressive Activity of Myeloid-Derived Suppressor Cells from Prostate Cancer Patients. Clin Cancer Res. 2015; 21:3771-82.

While various embodiments and aspects of the present invention are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments of the invention described herein may be employed in practicing the invention.

Informal Sequence Listing

With respect to Tables 1 and 2, * phosphorothioation (one non-bridging oxygen on the 3' adjacent phosphate replaced with sulfur) nucleotides (for example GGGG is G*G*G*G in 5'-G*G*TGCATCGATGCAG G*G*G*G*G-3', where the asterisk (*) is placed between the bases (more accurately: nucleosides) and the phosphorothioated phosphate is also placed between bases); Bold: 2'OMe (2'-O-Methyl-nucleoside; Hydroxyl in 2'-position replaced with 2'-OMethyl) nucleotides; italicized: LNA-modified nucleotide, where LNA refers to locked nucleic acid. Each x is a C3 unit.

TABLE 1

| | Sequences* | SEQ ID NO: |
|---|---|---|
| CpG(A)-ODN-STAT3 ASO1 | 5' G*G*T GCA TCG ATG CAG G*G*G* G*G xxxxx CTA TTT GGA TGT CAGC 3' | 1 |
| CpG(A)-ODN-STAT3 ASO2 | 5' G*G*T GCA TCG ATG CAG G*G*G* G*G xxxxx CAGCAGATCAAGTCCAGGGA 3' | 2 |
| CpG(A)-ODN-STAT3 ASO3 | 5' G*G*T GCA TCG ATG CAG G*G*G* G*G xxxxx TTTTG CATGATGTAA CCACT 3' | 3 |
| CpG(A)-ODN-STAT3 ASO4 | 5' G*G*T GCA TCG ATG CAG G*G*G* G*G xxxxx ATC AAA GTC ATC CTG GAG 3' | 4 |

TABLE 1-continued

| | Sequences* | SEQ ID NO: |
|---|---|---|
| CpG(A)-ODN-STAT3 LNA ASO1 | 5' G*G*T GCA TCG ATG CAG G*G*G* G*G xxxxx GCA ACC TGA CTT TAGT 3' | 5 |
| CpG(A)-ODN-STAT3 LNA ASO2 | 5' G*G*T GCA TCG ATG CAG G*G*G* G*G xxxxx GAT TCT GCT AAT GACG 3' | 6 |
| CpG(A)-ODN-STAT3 LNA ASO3 | 5' G*G*T GCA TCG ATG CAG G*G*G* G*G xxxxx TGA CGG GTC TGA AGTT 3' | 7 |
| CpG(A)-ODN-STAT3 LNA ASO4 | 5' G*G*T GCA TCG ATG CAG G*G*G* G*G xxxxx AGA TAG CAG AAG TAGG 3' | 8 |
| CpG(A)-ODN-STAT3 LNA ASO5 | 5' G*G*T GCA TCG ATG CAG G*G*G* G*G xxxxx GTC AAT GCA CAC TTTA 3' | 9 |
| GpC(A)-ODN-STAT3 ASO1 | 5' G*G*T GCA TGC ATG CAG G*G*G* G*G xxxxx CTA TTT GGA TGT CAGC 3' | 10 |
| GpC(A)-ODN-STAT3 ASO2 | 5' G*G*T GCA TGC ATG CAG G*G*G* G*G xxxxx CAGCAGATCAAGTCCAGGGA 3' | 11 |
| GpC(A)-ODN-STAT3 ASO3 | 5' G*G*T GCA TGC ATG CAG G*G*G* G*G xxxxx TTTTG CATGATGTAA CCACT 3' | 12 |
| GpC(A)-ODN-STAT3 ASO4 | 5' G*G*T GCA TGC ATG CAG G*G*G* G*G xxxxx ATC AAA GTC ATC CTG GAG 3' | 13 |
| GpC(A)-ODN-STAT3 LNA ASO1 | 5' G*G*T GCA TGC ATG CAG G*G*G* G*G xxxxx GCA ACC TGA CTT TAGT 3' | 14 |
| GpC(A)-ODN-STAT3 LNA ASO2 | 5' G*G*T GCA TGC ATG CAG G*G*G* G*G xxxxx GAT TCT GCT AAT GACG 3' | 15 |
| GpC(A)-ODN-STAT3 LNA ASO3 | 5' G*G*T GCA TGC ATG CAG G*G*G* G*G xxxxx TGA CGG GTC TGA AGTT 3' | 16 |
| Human CpG-STAT3ASO- (CpG-D19 ODN + human STAT3 ASO targeting sequence) | 5' G*G*TGCATCGATGCAG*G*G*G*G-xxxxx- CAGCAGATCAAGTCCAGGGA 3' | 33 |
| Mouse CpG-STAT3ASO- (CpG1668 ODN + mouse STAT3 ASO targeting sequence) | 5' T*C*C*A*T*G*A*C*G*T*T*C*C*T*G*A*T*G* C*T-xxxxx-GAC TCT TGC AGG AAT CGGCT 3' | 34 |

TABLE 2

| SEQ ID NO: | STAT3 Antisense Oligonucleotide |
|---|---|
| 17 | CTA TTT GGA TGT CAGC |
| 18 | CAGCAGATCAAGTCCAGGGA |
| 19 | TTTTG CATGATGTAA CCACT |
| 20 | ATC AAA GTC ATC CTG GAG |
| 21 | GCA ACC TGA CTT TAGT |
| 22 | GAT TCT GCT AAT GACG |
| 23 | TGA CGG GTC TGA AGTT |
| 24 | AGA TAG CAG AAG TAGG |
| 25 | GTC AAT GCA CAC TTTA |
| 26 | CTA TTT GGA TGT CAGC |
| 27 | CAGCAGATCAAGTCCAGGGA |
| 28 | TTTTG CATGATGTAA CCACT |
| 29 | ATC AAA GTC ATC CTG GAG |
| 30 | GCA ACC TGA CTT TAGT |
| 31 | GAT TCT GCT AAT GACG |
| 32 | TGA CGG GTC TGA AGTT |
| 35 | GAC TCT TGC AGG AAT CGGCT |

What is claimed is:

1. A neural stem cell comprising an exogenous nucleic acid, wherein the exogenous nucleic acid comprises a neural stem cell-loading sequence bonded to an immunostimulatory sequence via a linking group.

2. The neural stem cell of claim 1, wherein the neural stem cell is a human leukocyte antigen II-negative neural stem cell.

3. The neural stem cell of claim 1, wherein the exogenous nucleic acid comprises from about 10 base pairs to about 500 base pairs.

4. The neural stem cell of claim 1, wherein the neural stem cell-loading sequence comprises a Toll-like receptor 3-binding nucleic acid sequence, a Toll-like receptor 9-binding nucleic acid sequence, or a combination thereof.

5. The neural stem cell of claim 4, wherein the Toll-like receptor 9-binding nucleic acid sequence comprises a CpG oligodeoxynucleotide (ODN) selected from the group consisting of a CpG-A ODN, a CpG-B ODN, and a CpG-C ODN; and wherein the Toll-like receptor 3-binding nucleic acid sequence comprises dsRNA, polyinosine-polycytidylic acid, or a combination thereof.

6. The neural stem cell of claim 1, wherein the neural stem cell-loading sequence comprises CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19.

7. The neural stem cell of claim 1, wherein the immunostimulatory sequence comprises a STAT-inhibiting nucleic acid sequence, a Toll like receptor 7/8-activating nucleic acid sequence, a STING receptor-activating nucleic acid sequence, or a RIG-1 receptor-activating nucleic acid sequence.

8. The neural stem cell of claim 7, wherein:
(i) the STAT-inhibiting nucleic acid sequence comprises a STAT3-inhibiting nucleic acid sequence, a STAT4-inhibiting nucleic acid sequence, a STAT5A-inhibiting nucleic acid sequence, a STAT5B-inhibiting nucleic acid sequence, a STAT6-inhibiting nucleic acid sequence, or a combination of two or more thereof;
(ii) the Toll like receptor 7/8-activating nucleic acid sequence comprises ssRNA, thymidine homopolymer oligodeoxynucleotide, guanosine, or an analog of any of the foregoing;
(iii) the STING receptor-activating nucleic acid sequence comprises a cGAMP, a c-di-CMP, a c-di-AMP, a c-AIMP, or an analog of any of the foregoing; and
(iv) the RIG-1 receptor-activating nucleic acid sequence comprises dsRNA, polyinosinic: polycytidylic acid, or an analog of any of the foregoing.

9. The neural stem cell of claim 1, wherein the immunostimulatory sequence comprises a STAT3-inhibiting nucleic acid sequence.

10. The neural stem cell of claim 9, wherein the STAT3-inhibiting nucleic acid sequence comprises a nucleic acid sequence having at least 90% sequence identity to SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:35, or a combination of two or more thereof.

11. The neural stem cell of claim 9, wherein the exogenous nucleic acid comprises a Toll-like receptor 9-binding nucleic acid sequence covalently bonded to the STAT3-inhibiting nucleic acid sequence via the linking group.

12. The neural stem cell of claim 1, wherein the neural stem cell-loading sequence is a nucleic acid sequence having at least 90% sequence identity to CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19; and wherein the immunostimulatory sequence is a nucleic acid sequence having at least 90% sequence identity to SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, or SEQ ID NO:35.

13. The neural stem cell of claim 1, wherein the linking group comprises a bond, a nucleic acid sequence, a DNA sequence, substituted or unsubstituted alkylene, substituted or unsubstituted heteroalkylene, substituted or unsubstituted cycloalkylene, substituted or unsubstituted heterocycloalkylene, substituted or unsubstituted arylene, substituted or unsubstituted heteroarylene, or a combination of two or more thereof.

14. The neural stem cell of claim 1, wherein the linking group comprises a substituted 6 to 60 membered heteroalkylene.

15. The neural stem cell of claim 1, wherein the linking group comprises a substituted heteroalkylene of the formula:

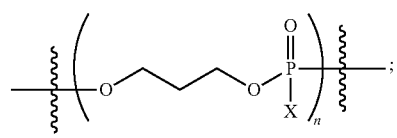

wherein each X is independently —OH or —O—, and n is an integer from 1 to 10.

16. The neural stem cell of claim 1, wherein the exogenous nucleic acid comprises a nucleic acid sequence having at least 90% sequence identity to SEQ ID NO:1, SEQ ID NO:2, SEQ ID NO:3, SEQ ID NO:4, SEQ ID NO:5, SEQ ID NO:6, SEQ ID NO:7, SEQ ID NO: 8, SEQ ID NO:9, SEQ ID NO: 10, SEQ ID NO:11, SEQ ID NO: 12, SEQ ID NO: 13, SEQ ID NO: 14, SEQ ID NO: 15, SEQ ID NO:16, SEQ ID NO:33, or SEQ ID NO:34.

17. The neural stem cell of claim 1, wherein the exogenous nucleic acid further comprises a detectable moiety selected from the group consisting of an enzyme, biotin, digoxigenin, a paramagnetic molecule, a contrast agent, gadolinium, a radioisotope, radionuclide, fluorodeoxyglucose, barium sulfate, thorium dioxide, gold, a fluorophore, a hapten, a protein, a fluorescent moiety, and a combination of two or more thereof.

18. A pharmaceutical composition comprising the neural stem cell of claim 1 and a pharmaceutically acceptable excipient.

19. A method of treating cancer, a neurodegenerative disease, an inflammatory disease, or a viral infection in a patient in need thereof, the method comprising administering to the patient an effective amount of the neural stem cell of claim 1.

20. A process for producing the neural stem cell of claim 1, the process comprising contacting the neural stem cell with the exogenous nucleic acid for a time sufficient for the neural stem cell to uptake the exogenous nucleic acid.

21. The neural stem cell of claim 1, wherein the neural stem cell-loading sequence is CpG ODN 1585, CpG ODN 2216, CpG ODN 2336, CpG ODN 1668, CpG ODN 1826, CpG ODN 2006, CpG ODN 2007, CpG ODN BW006, CpG ODN D-SL01, CpG ODN 2395, CpG ODN M362, CpG ODN D-SL03, or CpG ODN D19; and wherein the immunostimulatory sequence is a nucleic acid sequence set forth by SEQ ID NO:17, SEQ ID NO: 18, SEQ ID NO: 19, SEQ ID NO:20, SEQ ID NO:21, SEQ ID NO:22, SEQ ID NO:23, SEQ ID NO: 24, SEQ ID NO:25, SEQ ID NO:26, SEQ ID NO:27, SEQ ID NO:28, SEQ ID NO:29, SEQ ID NO: 30, SEQ ID NO:31, SEQ ID NO:32, or SEQ ID NO:35.

22. The neural stem cell of claim 1, wherein the neural stem cell comprises a vesicle encapsulated therein and wherein the exogenous nucleic acid is encapsulated within the vesicle.

23. The neural stem of claim 1, wherein the neural stem cell-loading sequence is a CpG oligodeoxynucleotide and the immunostimulatory sequence is a STAT3 antisense oligonucleotide.

* * * * *